United States Patent [19]

Tzikas

[11] Patent Number: 4,925,928
[45] Date of Patent: May 15, 1990

[54] REACTIVE DYES CONTAINING VINYSULFONYLALKLYLAMINO BOUND TO A BIS-(TRIAZINYLAMINO)-BENZENE GROUP

[75] Inventor: Athanassios Tzikas, Pratteln, Switzerland

[73] Assignee: Ciba-Geigy Corporation, Ardsley, N.Y.

[21] Appl. No.: 210,678

[22] Filed: Jun. 23, 1988

[51] Int. Cl.$^5$ .................. C09B 62/002; C09B 62/022; C09B 62/04; D06P 1/382
[52] U.S. Cl. ..................................... 534/618; 534/617; 534/622; 534/624; 534/629; 534/634; 534/641; 540/126; 544/181; 544/187; 544/209
[58] Field of Search ............... 534/622, 624, 634, 618, 534/617, 641; 540/126; 544/181, 187, 209

[56] References Cited

U.S. PATENT DOCUMENTS

| | | | |
|---|---|---|---|
| 3,223,470 | 12/1965 | Boedeker et al. | 534/630 X |
| 3,474,080 | 10/1969 | Parkers | 260/68.2 |
| 4,330,469 | 5/1982 | Gati et al. | 260/242.2 |
| 4,507,236 | 3/1985 | Seiler et al. | 534/634 |
| 4,754,023 | 6/1988 | Tzikas et al. | 534/618 |

FOREIGN PATENT DOCUMENTS

| | | | |
|---|---|---|---|
| 0179019 | 4/1986 | European Pat. Off. | 534/638 |
| 0214093 | 3/1987 | European Pat. Off. | 534/634 |
| 0221013 | 5/1987 | European Pat. Off. | 534/637 |
| 1439996 | 4/1966 | France | 534/634 |
| 2417532 | 9/1979 | France | 534/622 |
| 2026527B | 2/1980 | United Kingdom | 534/638 |
| 1576237 | 10/1980 | United Kingdom | 534/638 |

*Primary Examiner*—Floyd D. Higel
*Attorney, Agent, or Firm*—George R. Dohmann; Edward McC. Roberts

[57] ABSTRACT

Reactive dyes suitable in particular for dyeing or printing cellulose-containing fiber materials by the exhaust method or by continuous methods and, while giving a high dyeing yield, produce dyes and prints having good fastness properties; having the formula

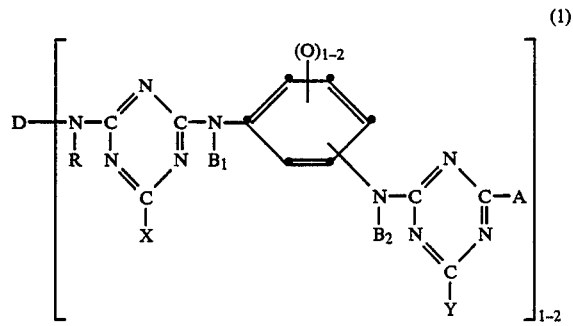

in which D is the radical or a monoazo, polyazo, metal complex azo, anthraquinone, phthalocyanine, formazan, azomethine, dioxazine, phenazine, stilbene, triphenylmethane, xanthene, thiozanthone, nitroaryl, naphthoquinone, pyrenequinone or perylenetetracarbimide dye, R, $B_1$ and $B_2$ are independently of each other hydrogen or alkyl which has 1 to 4 carbon atoms and which can be substituted by halogen, hydroxyl, cyano, $C_1$–$C_4$-alkoxy, $C_1$–$C_4$alkoxycarbonyl, carboxyl, sulfamoyl, sulfo or sulfato, X and Y independently of each other are fluorine, chlorine, bromine, sulfo $C_1$–$C_4$alkylsulfonyl or phenylsulfonyl, A is an amino substituent which contains at least one group of the formula

—SO$_2$—Z  (2)

z is β-sulfatoethyl, β-thiosulfatoethyl, β-phosphatoethyl, β-acyloxyethyl, β-haloethyl or vinyl, and Q is 1 or 2 substituents from the group consisting of hydrogen, $C_1$–$C_4$alkyl, (1), wherein D is phthalocyanine and Y is fluorine.

40 Claims, 1 Drawing Sheet

REACTIVE DYES CONTAINING VINYSULFONYLALKLYLAMINO BROUND TO A BIS-(TRIAZINYLAMINO)-BENZENE GROUP

The present application relates to novel improved reactive dyes which are suitable in particular for dyeing cellulose-containing fibre materials by the exhaust method or by continuous methods and which produce wet- and light-fast dyeings, to processes for preparing these dyes, and to the use thereof for dyeing or printing textile materials.

The invention provides reactive dyes of the formula

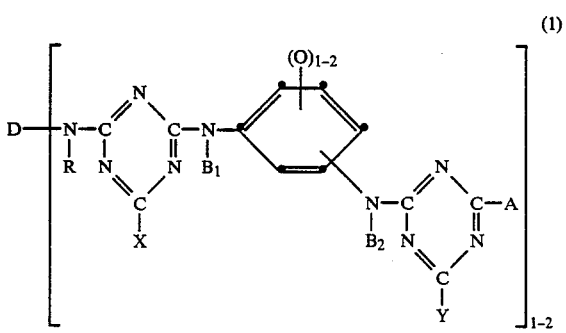

(1)

in which D is the radical of a monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye, R, $B_1$ and $B_2$ are independently of each other hydrogen or alkyl which has 1 to 4 carbon atoms and which can be substituted by halogen, hydroxyl, cyano, $C_{1-4}$alkoxy, $C_{1-4}$alkoxycarbonyl, carboxyl, sulfamoyl, sulfo or sulfato, X and Y are independently of each other fluorine, chlorine, bromine, sulfo, $C_1$–$C_4$alkylsulfonyl or phenylsulfonyl, A is an amino substituent which contains at least one group of the formula

 (2),

Z is $\beta$-sulfatoethyl, $\beta$-thiosulfatoethyl, $\beta$-phosphatoethyl, $\beta$-acyloxyethyl, $\beta$-haloethyl or vinyl, and Q is 1 or 2 substituents from the group consisting of hydrogen, $C_1$–$C_4$alkyl, $C_1$–$C_4$alkoxy, halogen, carboxyl or sulfo.

The radical D in the formula (1) can contain, bonded to its basic structure, the substituents customary with organic dyes.

Examples of further substituents in the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 8 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-$\beta$-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, such as methoxycarbonyl or ethoxycarbonyl, alkyl-sulfonyl having 1 to 4 carbon atoms such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, N-($\beta$-hydroxyethyl)sulfamoyl, N,N-di-($\beta$-hydroxyethyl)-sulfamoyl, N-phenylsulfamoyl, ureido, hydroxyl, carboxyl, sulfomethyl or sulfo. Preferably the radical D contains one or more sulfonic acid groups. Reactive dyes of the formula (1) in which D is the radical of an azo dye contain as substituents in particular methyl, ethyl, methoxy, ethoxy, acetylamino, benzoylamino, amino, chlorine, bromine, ureido, hydroxyl, carboxyl, sulfomethyl or sulfo.

An alkyl radical R or $B_1$ or $B_2$ is straight-chain or branched; it can be further substituted, for example by halogen, hydroxyl, cyano, $C_{1-4}$-alkoxy, $C_{1-4}$alkoxycarbonyl, carboxyl, sulfamoyl, sulfo or sulfato. Examples of R, $B_1$ and $B_2$ are the following radicals: methyl, ethyl, propyl, isopropyl, butyl, isobutyl, sec-butyl, tert-butyl, carboxymethyl, $\beta$-carboxyethyl, $\beta$-carboxypropyl, methoxycarbonylmethyl, ethoxycarbonylmethyl, $\beta$-methoxyethyl, $\beta$-ethoxyethyl, $\beta$-methoxypropyl, chloroethyl, $\gamma$-bromopropyl, $\beta$-hydroxyethyl, $\beta$-hydroxybutyl, $\beta$-cyanoethyl, sulfomethyl, $\beta$-sulfoethyl, aminosulfonylmethyl and $\beta$-sulfatoethyl. Preferably, R, $B_1$ and $B_2$ are each hydrogen, methyl or ethyl.

The substituents X and Y which are detachable as anions are each a halogen atom, such as fluorine, chlorine or bromine, a low molecular weight alkylsulfonyl group, such as methylsulfonyl or ethylsulfonyl, a phenylsulfonyl radical or a sulfo group. Preferably X and Y are fluorine or chlorine.

The amino substituent A is the radical of an aliphatic, aromatic or heterocyclic amine which contains at least one group of the formula (2).

The amino substituent A can also be the radical of a mixed aliphatic-aromatic, aliphatic-heterocyclic or aromatic-heterocyclic amine. Examples of A are: alkylamino, N,N-dialkylamino, cycloalkylamino, N,N-dicycloalkyl-amino, aralkylamino and arylamino groups, mixed substituted amino groups, such as N-alkyl-N-cyclohexylamino and N-alkyl-N-arylamino groups, amino groups which contain heterocyclic radicals which can have further fused-on carbocyclic rings, and also amino groups in which the amino nitrogen atom is a member of a N-heterocyclic ring which can contain further hetero atoms. A radical A of an aliphatic amine is preferably an alkylamino or N,N-dialkylamino group in which the alkyl chains can also be interrupted by other kinds of atoms or groups, such as —O—, —NH— or —CO—. The alkyl radicals can be straight-chain or branched, low molecular weight or high molecular weight, preference being given to alkyl radicals having 1 to 6 carbon atoms; suitable cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; and suitable amino groups in which the amino nitrogen atom is a member of a N-heterocyclic ring are preferably radicals of 6-membered N-heterocyclic compounds which can contain nitrogen, oxygen or sulfur as further hetero atoms. The abovementioned alkyl, cycloalkyl, aralkyl and aryl radicals, the heterocyclic radicals and the N-heterocyclic rings mandatorily contain at least one group of the formula (2), and they can also be further substituted, for example by: halogen, such as fluorine, chlorine and bromine, nitro, cyano, trifluoromethyl, sulfamoyl, carbamoyl, $C_1$-$C_4$alkyl, $C_1$-$C_4$alkoxy, acrylamino groups, such as acetylamino or benzoylamino, ureido, hydroxyl, carboxyl, sulfomethyl or sulfo.

A $\beta$-acyloxyethyl Z and a $\beta$-haloethyl Z are in particular the $\beta$-acetoxyethyl and $\beta$-chloroethyl radicals respectively.

Corresponding amino substituents A are for example: $\beta$-($\beta'$-chloroethylsulfonyl)ethylamino, bis-$\beta$-($\beta'$-chloroethylsulfonyl)ethylamino, $\beta$-[$\beta'$-($\beta''$-chloroethylsulfonyl)ethyloxy]ethylamino, 3- or 4-sulfatoethylsulfonylphenylamino, 3- or 4-vinylsulfonylphenylamino, 3- or 4-sulfatoethylsulfonylbenzylamino and 3- or 4-sulfatoethylsulfonylphenethylamino.

The substituent Q is for example hydrogen, methyl, ethyl, propyl, isopropyl, butyl, isobutyl, sec-butyl, tert-butyl, methoxy, ethoxy, propyloxy, isopropyloxy, butyloxy, isobutyloxy, sec-butyloxy, tert-butyloxy, fluorine, chlorine, bromine, carboxyl or sulfo. Preferably Q is a sulfo group and its index is 1.

The part of the formula (1) which is enclosed in square brackets is reactive radical which can be present in the molecule once or twice; the two possibilities are equally important. If a dye of the formula (1) contains two such moieties, they can be identical or different; preferably they are identical. The square bracket includes inter alia the amino substituent A which in turn has a reactive radical, namely the group —$SO_2$—Z; this reactive radical contains a leaving group, for example when Z is $\beta$-chloroethyl, or can become active in the manner of fibre-reactive groups, for example when Z is vinyl (for the fundamentals of reactive dye chemistry are Venkataraman, K.: The Chemistry of Synthetic Dyes. New York: Academic Press 1972; Vol. VI, Reactive Dyes).

Also possible are reactive dyes of the formula (1) in which the radical D includes a further reactive radical. The additional reactive radicals enclosed in D can be bonded to D via amino groups or in some other way, for example by a direct bond.

Preferred embodiments of the reactive dyes of the formula (1) are:

(a) reactive dyes of the formula (1) in which A is a radical of the formula

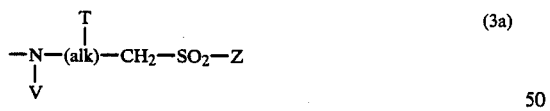 (3a)

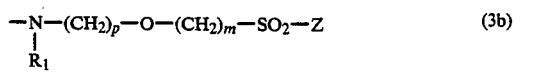 (3b)

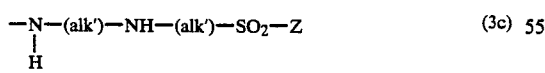 (3c)

or

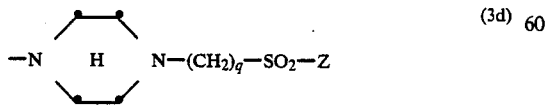 (3d)

Z is as defined under the formula (1), alk is an alkylene radical having 1 to 6 C atoms or branched isomers thereof, T is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical —$SO_2$—Z in which Z is as defined above, V is hydrogen or an alkyl radical having 1 to 4 C atoms which can be substituted by carboxyl or sulfo groups or by derivatives thereof, alkoxy groups having 1 or 2 C atoms, halogen or hydroxyl, or a radical

 (3e)

in which Z, alk and T are as defined above, $R_1$ is hydrogen or $C_1$-$C_6$alkyl, each alk' is independently either a polymethylene radical having 2 to 6 C atoms or a branched isomer thereof, and m is from 1 to 6, p is from 1 to 6 and q is from 1 to 6;

(b) reactive dyes of the formula (1) in which A is a radical of the formula

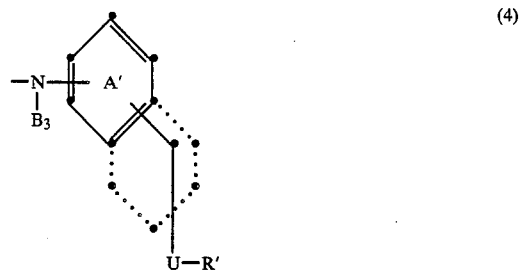 (4)

in which $B_3$ is hydrogen or alkyl having 1 to 4 carbon atoms which can be substituted by halogen, hydroxyl, cyano, $C_1$-$C_4$alkoxy, $C_1$-$C_4$alkoxycarbonyl, carboxyl, sulfamoyl, sulfo or sulfato, U is —CO— or —$SO_2$—, R' is a radical of the formula

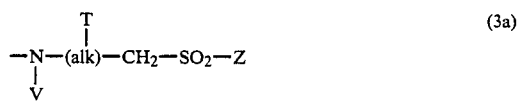 (3a)

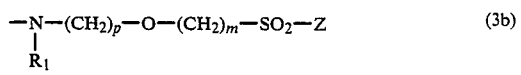 (3b)

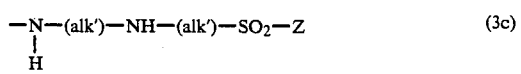 (3c)

or

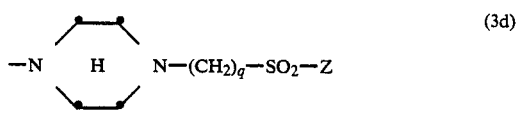 (3d)

Z is as defined under the formula (1), alk is an alkylene radical having 1 to 6 C atoms or branched isomers thereof, T is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical —$SO_2$—Z in which Z is as defined above, V is hydrogen or an alkyl radical having 1 to 4 C atoms which can be substituted by carboxyl or sulfo groups or by derivatives thereof, alkoxy groups having 1 to 2 C atoms, halogen or hydroxyl, or a radical

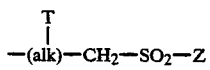    (3e)

in which Z, alk and T are as defined above, R₁ is hydrogen or C₁-C₆alkyl, each alk' is independently either a polymethylene radical having 2 to 6 C atoms or a branched isomer thereof, and m is from 1 to 6, p is from 1 to 6 and q is from 1 to 6, and if U is —SO₂—, V must not be hydrogen, and the benzene or naphthalene radical A' can contain further substituents;

(c) reactive dyes of the formula (1) in which A is a radical of the formula

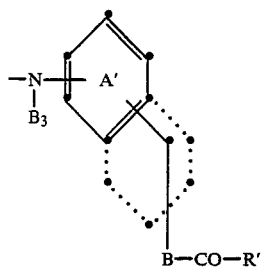    (5)

in which B₃ is hydrogen or alkyl having 1 to 4 carbon atoms which can be substituted by halogen, hydroxyl, cyano, C₁-C₄alkoxy, C₁-C₄alkoxycarbonyl, carboxyl, sulfamoyl, sulfo or sulfato, B is a radical —(CH₂)ₙ—O—(CH₂)ₙ or —NH—(CH₂)ₙ, n is 1 to 6, R' is a radical of the formula

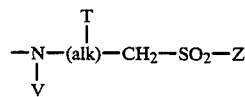    (3a)

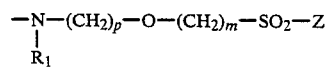    (3b)

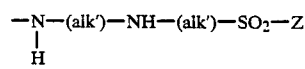    (3c)

or

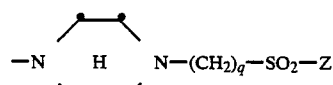    (3d)

Z is as defined under the formula (1), alk is an alkylene radical having 1 to 6 C atoms or branched isomers thereof, T is hydrogen, chlorine, bromine, fluorine, hydroxyl, sulfato, acyloxy having 1 to 4 C atoms, cyano, carboxyl, alkoxycarbonyl having 1 to 5 C atoms, carbamoyl or a radical —SO₂—Z in which Z is as defined above, V is hydrogen or an alkyl radical having 1 to 4 C atoms which can substituted by carboxyl or sulfo groups or by derivatives thereof, alkoxy groups having 1 or 2 C atoms, halogen or hydroxyl, or a radical

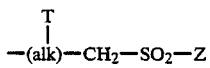    (3e)

in which Z, alk and T are as defined above, R₁ is hydrogen or C₁-C₆alkyl, each alk' is independently either a polymethylene radical having 2 to 6 C atoms or a branched isomer thereof, and m is from 1 to 6, p is from 1 to 6 and q is from 1 to 6, and the benzene or naphthalene radical A' can contain further substituents;

(d) reactive dyes of the formula (1) in which A is a radical of the formula

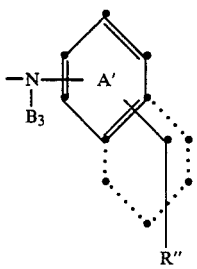    (6)

in which B₃ is hydrogen or alkyl having 1 to 4 carbon atoms which can be substituted by halogen, hydroxyl, cyano, C₁-C₄alkoxy, C₁-C₄alkoxycarbonyl, carboxyl, sulfamoyl, sulfo or sulfato, R" is a radical of the formula

    (2)

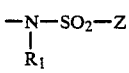    (2a)

or

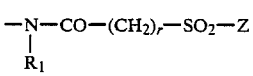    (2b)

Z is as defined under the formula (1), R₁ is hydrogen or C₁-C₆alkyl, and r is 3 to 5, and the benzene or naphthalene radical A' can contain further substituents;

(e) reactive dyes according to (a) in which A is a radical of the formula

—NHCH₂CH₂SO₂CH₂CH₂Cl    (7a)

    (7b)

—NHCH₂CH₂OCH₂CH₂SO₂CH₂CH₂Cl    (7c)
—NHCH₂CH₂SO₂CH=CH₂    (7d)

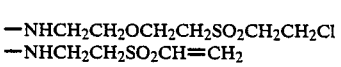    (7e)

—NHCH₂CH₂OCH₂CH₂SO₂CH=CH₂    (7f)
—NHCH₂CH₂NHCH₂CH₂SO₂CH=CH₂    (7g)

-continued $$-NHCH_2CH_2N\begin{matrix}CH_2CH_2SO_2CH=CH_2\\ \\ CH_2CH_2SO_2CH=CH_2\end{matrix} \quad (7h)$$

or $$-NHCH_2CH\begin{matrix}SO_2CH=CH_2\\ \\ CH_2CH_2CH_2SO_2CH=CH_2\end{matrix} \quad (7i)$$

(f) reactive dyes according to (b) in which A is a radical of the formula $$-N\underset{B_3}{\overset{R_2}{|}}\underset{}{\underset{}{\bigcirc}}-U-R' \quad (8)$$

and $R_2$ is hydrogen, $C_1$-$C_4$alkyl, $C_1$-$C_4$alkoxy, halogen, hydroxyl, carboxyl or sulfo, and $B_3$, U and R' are as defined under (b).

Explanations concerning (a) to (f):

The alkylene radical alk is preferably methylene, ethylene, methylmethylene, propylene or butylene. An acyloxy T is in particular acetyloxy, propionyloxy or butyryloxy, and an alkoxycarbonyl T is in particular methoxycarbonyl, ethoxycarbonyl or propyloxycarbonyl. An alkyl V can be in particular methyl, ethyl, propyl, isopropyl, butyl, isobutyl, sec-butyl or tert-butyl. Derivatives of carboxyl or sulfo are for example carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfamoyl, N,N-dimethylsulfamoyl, N,N-diethylsulfamoyl, methylsulfonyl, ethylsulfonyl and propylsulfonyl. The radical $R_1$ is for example methyl, ethyl, propyl, isopropyl, butyl, iso-butyl, sec-butyl, tert-butyl, pentyl or hexyl, or preferably hydrogen. The polymethylene radicals alk' are preferably ethylene, propylene or butylene. The indices m, p and q are independent of one another and preferably are 2, 3 or 4.

The alkyl $B_3$ is straight-chain or branched; it can be further substituted, for example by halogen, hydroxyl, cyano, $C_1$-$C_4$alkoxy, $C_1$-$C_4$alkoxycarbonyl, carboxyl, sulfamoyl, sulfo or sulfato. Examples of $B_3$ are the following radicals: methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, aminosulfonylmethyl and β-sulfatoethyl. Preferably, $B_3$ is hydrogen. The ring system labelled A' comprises a benzene or naphthalene nucleus.

Further possible substituents on the benzene or naphthalene radical A' are the same as those mentioned above in the description of the radical D.

The radical B contains 1 to 6, preferably 1 to 4, carbon atoms; examples of B are: methylene, ethylene, propylene, butylene, methyleneoxy, ethyleneoxy, propyleneoxy, butyleneoxy and ethyleneamino. If B is a radical $-O-(CH_2)_r$ or $-NH-(CH_2)_r$, B is bonded to the ring system A' by an oxygen atom or the -NH- group.

The index r is preferably =3.

The substituent $R_2$ is for example hydrogen, methyl, ethyl, propyl, isopropyl, butyl, isobutyl, sec-butyl, tert-butyl, methoxy, ethoxy, propyloxy, isopropyloxy, butyloxy, isobutyloxy, sec-butyloxy, tert-butyloxy, fluorine, chlorine, bromine, hydroxyl, carboxyl or sulfo.

Preference is further given to:

(g) reactive dyes of the formula (1) in which $B_1$ and $B_2$ are hydrogen and Q is sulfo;

(h) reactive dyes of the formula (1) in which X and Y are chlorine atoms;

(i) reactive dyes of the formula (1) in which R is hydrogen, methyl or ethyl;

(j) reactive dyes of the formula (1) in which D is the radical of a monoazo or disazo dye;

(k) reactive dyes of the formula (1) in which D is the radical of a metal complex azo or formazan dye;

(l) reactive dyes of the formula (1) in which D is the radical of an anthraquinone dye;

(m) reactive dyes of the formula (1) in which D is the radical of a phthalocyanine dye;

(n) reactive dyes of the formula (1) in which D is the radical of a dioxazine dye;

(o) reactive dyes according to (j), in which D is a monoazo or disazo dye radical of the formula $$D_1-N=N-(N-N=N)_s-K- \quad (9a),$$

$$-D_1-N=N-(N-N=N)_s-K \quad (9b),$$

or $$-D_1-N=N-(N-N=N)_s-K- \quad (9c),$$

or of a metal complex derived therefrom, $D_1$ is the radical of a diazo component of the benzene or naphthalene series, M is the radical of a middle component of the benzene or naphthalene series, and K is the radical of a coupling component of the benzene, naphthalene, pyrazolone, 6-hydroxy-2-pyridone or acetoacetarylamide series, where $D_1$, M and K can carry substituents customary with azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms, s is 0 or 1, and $D_1$, M and K together contain at least two sulfo groups, preferably three or four sulfo groups, (p) reactive dyes according to (j), in which D is a disazo dye radical of the formula $$D_1-N=N-K-N=N-D_2- \quad (10a),$$

or $$-D_1-N=N-K-N=N-D_2- \quad (10b),$$

$D_1$ and $D_2$ are independently of each other the radical of a diazo component of the benzene or naphthalene series, and K is the radical of a coupling component of the naphthalene series, where $D_1$, $D_2$ and K can carry substituents customary with azo dyes, in particular hydroxyl, amino, methyl, ethyl, methoxy or ethoxy groups, substituted or unsubstituted alkanoylamino groups having 2 to 4 C atoms, substituted or unsubstituted benzoylamino groups or halogen atoms, and $D_1$, $D_2$ and K together contain at least two sulfo groups, preferably three or four sulfo groups;

(q) reactive dyes according to (k), in which D is the radical of a 1:1 copper complex azo dye of the benzene or naphthalene series and the copper atom is bonded on each side to a metallizable group in orthoposition relative to the azo bridge;

(r) reactive dyes according to (k), in which D is the radical of a formazan dye of the formula

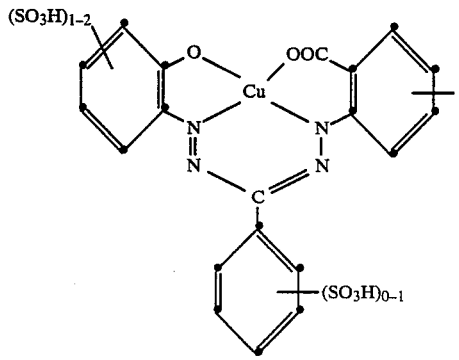

(IIa)

or

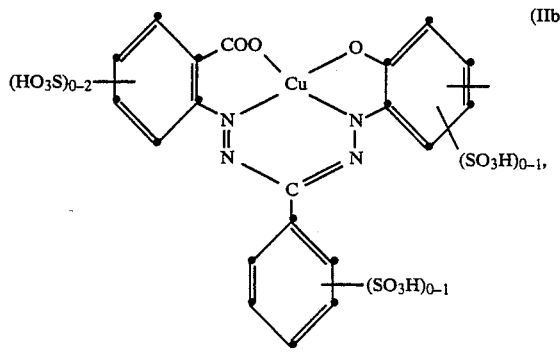

(IIb)

in which the benzene rings can be further substituted by alkyl having 1 to 4 C atoms, alkoxy having 1 to 4 C atoms, alkylsulfonyl having 1 to 4 C atoms, halogen or carboxyl;

(s) reactive dyes according to (1), in which D is the radical of an anthraquinone dye of the formula

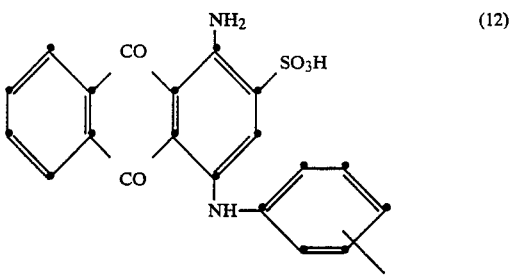

(12)

where the anthraquinone nucleus can be substituted by a further sulfo group and the phenylene radical by alkyl having 1 to 4 C atoms, alkoxy having 1 to 4 C atoms, halogen, carboxyl or sulfo, and the dye preferably contains at least 2 strongly water-solubilizing groups;

(t) reactive dyes according to (m), in which D is the radical of a phthalocyanine dye of the formula

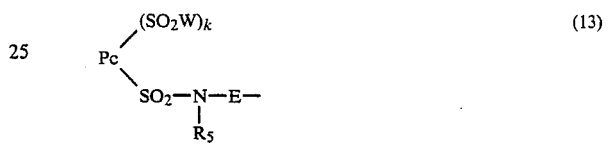

(13)

Pc is the radical of a copper- or nickel-phthalocyanine, W is —OH and/or —NR$_3$R$_4$, R$_3$ and R$_4$ are independently of each other hydrogen or alkyl which has 1 to 4 carbon atoms and can be substituted by hydroxyl or sulfo, R$_5$ is hydrogen or alkyl having 1 to 4 carbon atoms, E is a phenylene radical which can be substituted by alkyl having 1 to 4 C atoms, halogen, carboxyl or sulfo, or is an alkylene radical having 2 to 6 C atoms, preferably a sulfophenylene or ethylene radical, and k is 1 to 3;

(u) reactive dyes according to (n), in which D is the radical of a dioxazine dye of the formula

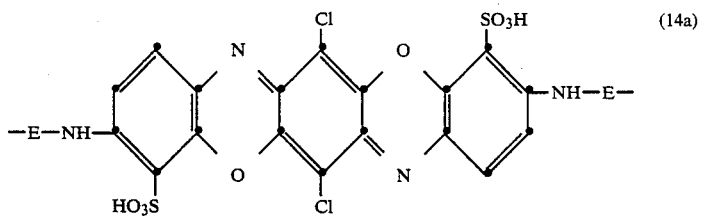

(14a)

or

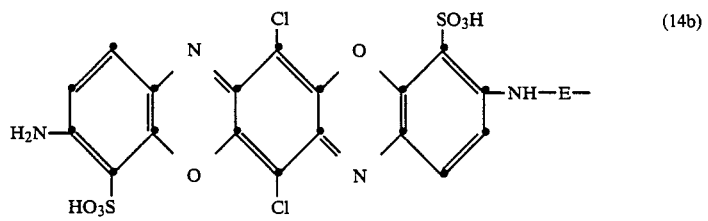

(14b)

in which E is a phenylene radical which can be substituted by alkyl having 1 to 4 C atoms, halogen, carboxyl or sulfo, or is an alkylene radical having 2 to 6 C atoms, and the outer benzene rings in the formulae (14a) and (14b) can be further substituted by alkyl having 1 to 4 C atoms, alkoxy having 1 to 4 C atoms, acetylamino, nitro, halogen, carboxyl or sulfo.

carboxyl and sulfo, and A is a radical of the formula (7a) to (7i).

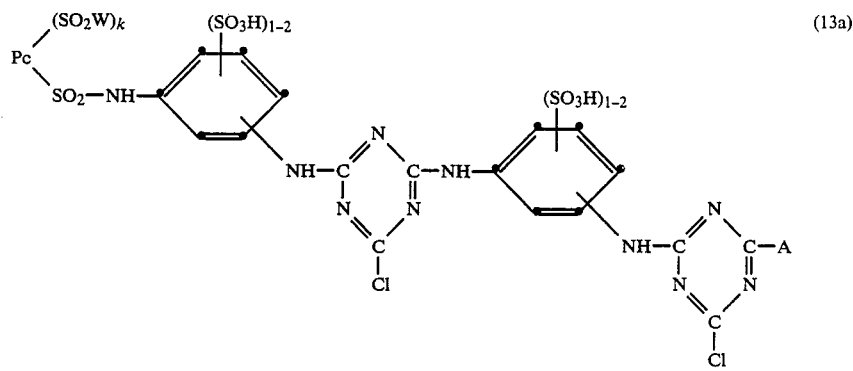

(13a)

Preference is further given to reactive dyes according to (o) or (p) and (r) to (u) of the following formulae (11b′), (12a), (13a), (14b′) and (15) to (30):

in which Pc is the radical of a copper phthalocyanine or nickel phthalocyanine, W is —OH and/or —NR$_3$R$_4$, R$_3$ and R$_4$ independently of each other are hydrogen or alkyl having 1 to 4 carbon atoms which can be substi-

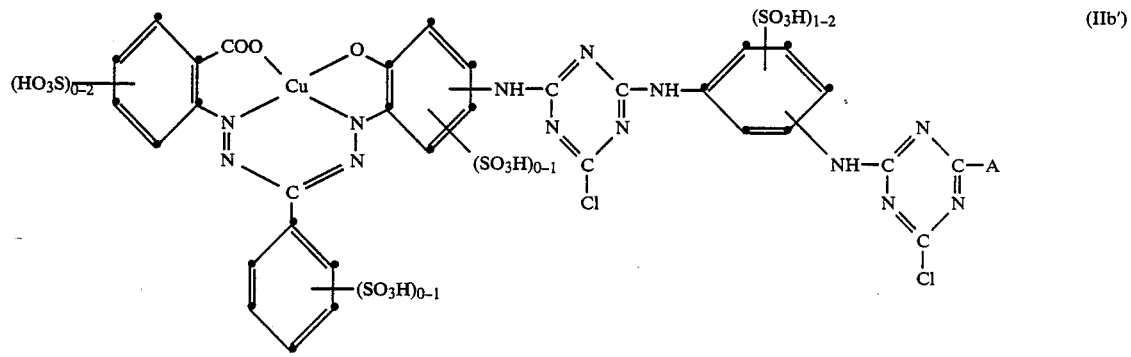

(IIb′)

in which A is a radical of the formula (7a) to (7i).

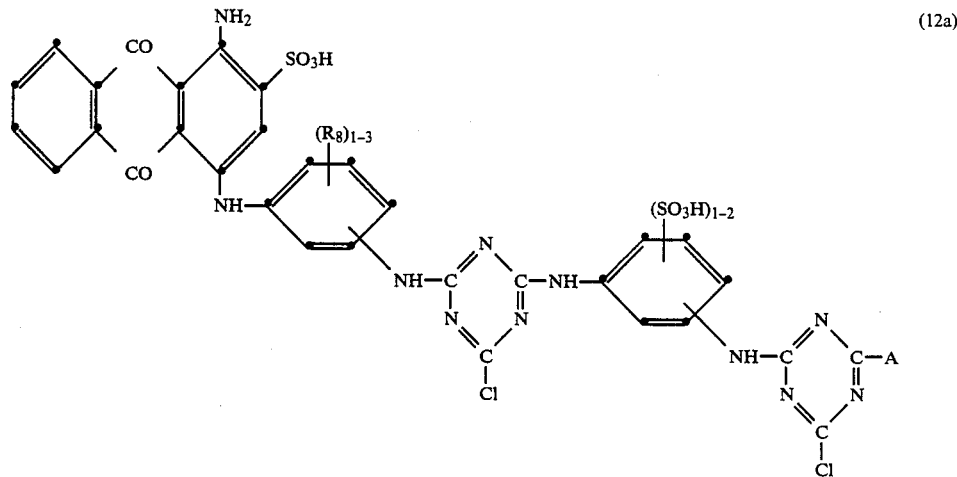

(12a)

in which R$_8$ is 1 to 3 substituents from the group consisting of hydrogen, C$_1$-C$_4$alkyl, C$_1$-C$_4$alkoxy, halogen, tuted by hydroxyl or sulfo, k is 1 to 3, and A is a radical of the formula (7a) to (7i).

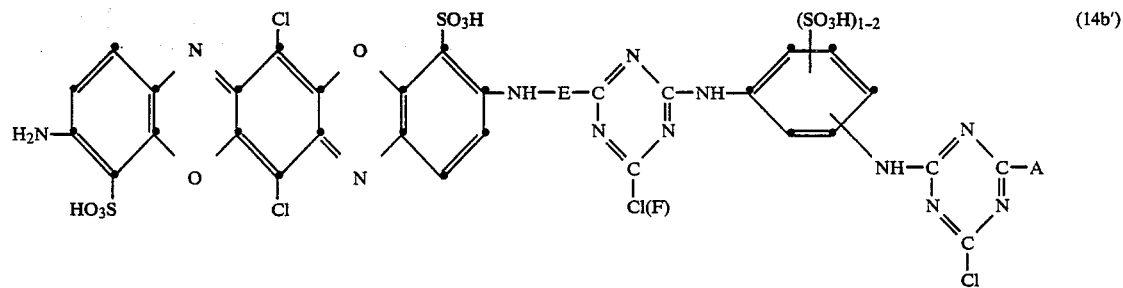
(14b')

in which E is a direct bond or a —(CH₂)₂—NH— or —(CH₂)₃—NH— radical and A is a radical of the formula (7a) to (7i).

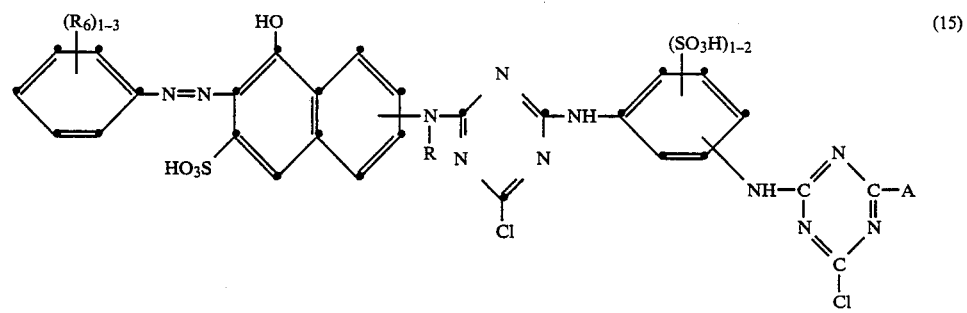
(15)

in which R₆ is 1 to 3 substituents from the group consisting of $C_1$-$C_4$alkyl, $C_1$-$C_4$alkoxy, halogen, carboxyl and sulfo; R is as defined under formula (1), and A is a radical of the formula (7a) to (7i).

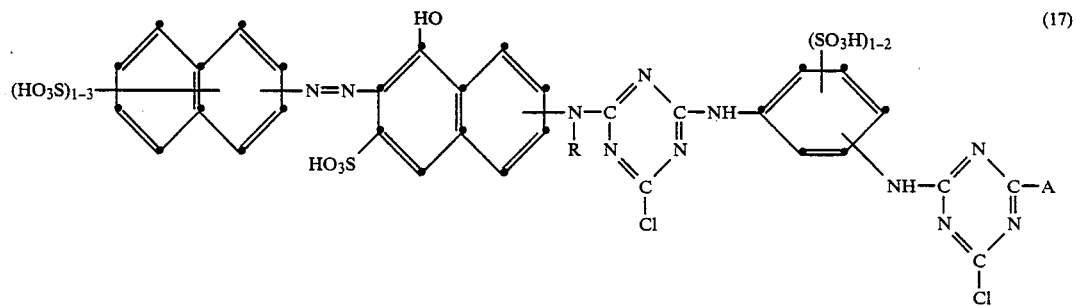
(17)

in which R₆ is 1 to 3 substituents from the group consisting of $C_1$-$C_4$-alkyl, $C_1$-$C_4$alkoxy, halogen, carboxyl and sulfo, and A is a radical of the formula (7a) to (7i).

in which R has the meaning given under formula (1), and A is a radical of the formula (7a) and (7i).

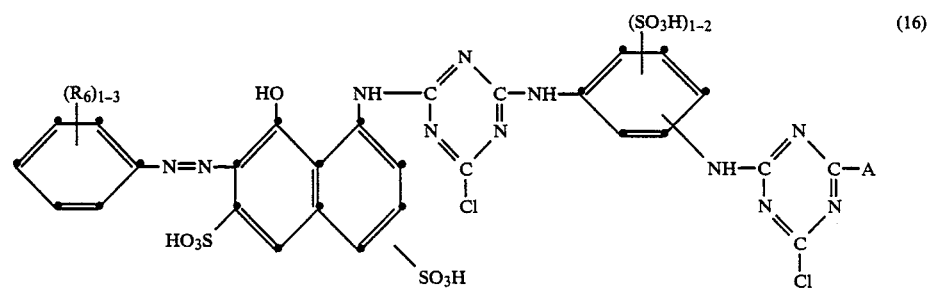
(16)

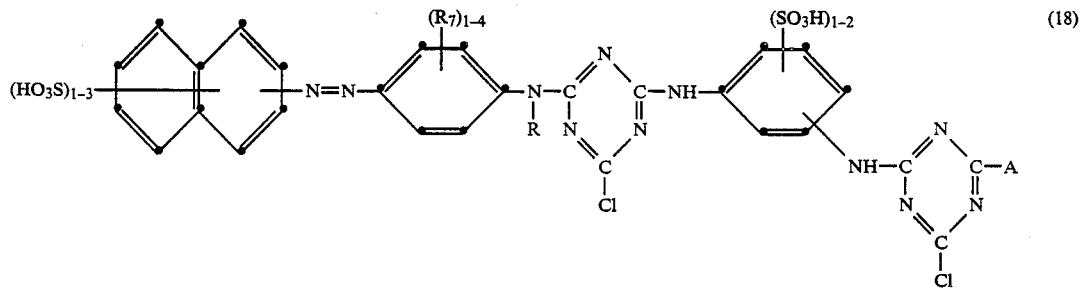

(18)

in which $R_7$ is 1 to 4 independently selected substituents from the group consisting of hydrogen, halogen, nitro, cyano, trifluoromethyl, sulfamoyl, carbamoyl, $C_1$–$C_4$alkyl, $C_1$–$C_4$alkoxy, amino, acetylamino, ureido, hydroxyl, carboxyl, sulfomethyl and sulfo, R is as defined under the formula (1) and A is a radical of the formula (7a) to (7i).

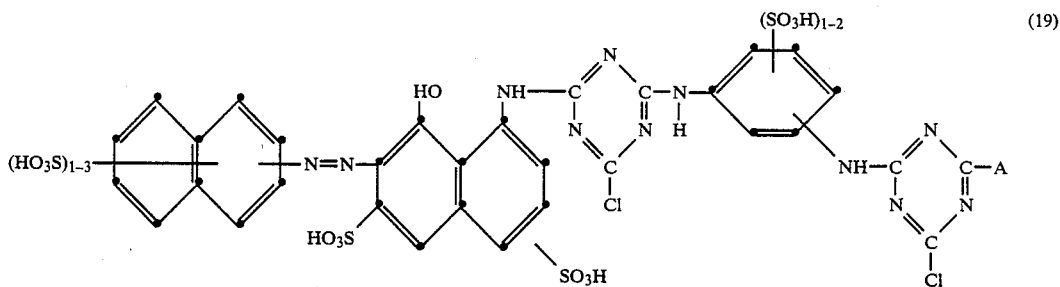

(19)

in which A is a radical of the formula (7a) to (7i).

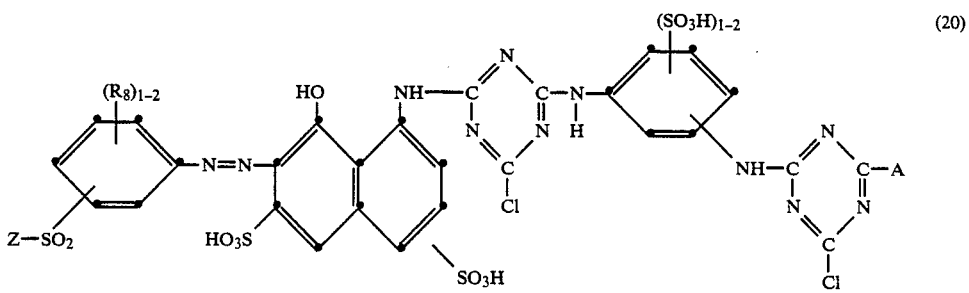

(20)

in which $R_8$ is 1 or 2 substitents from the group consisting of hydrogen, $C_1$–$C_4$alkyl, $C_1$–$C_4$alkoxy, halogen, carboxyl and sulfo, Z is $\beta$-sulfatoethyl, $\beta$-thiosulfatoethyl, $\beta$-phosphatoethyl, $\beta$-acyloxyethyl, $\beta$-haloethyl or vinyl, and A is a radical of the formula (7a) to (7i).

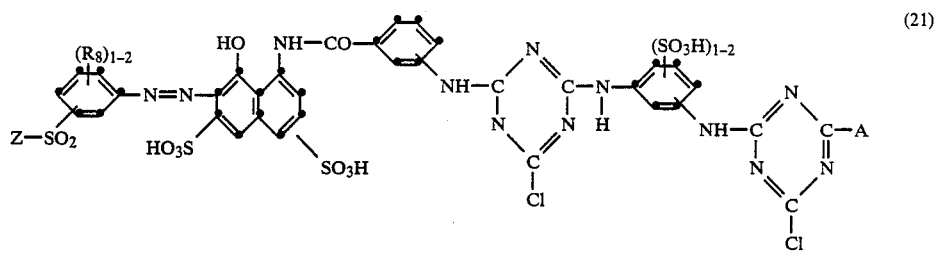

(21)

in which $R_8$ is 1 or 2 substituents from the group consisting of hydrogen, $C_1$–$C_4$alkyl, $C_1$–$C_4$alkoxy, halogen, carboxyl and sulfo, Z is $\beta$-sulfatoethyl, $\beta$-thiosulfatoethyl, $\beta$-phosphatoethyl, $\beta$-acyloxyethyl, $\beta$-haloethyl or vinyl, and A is a radical of the formula (7a) to (7i).

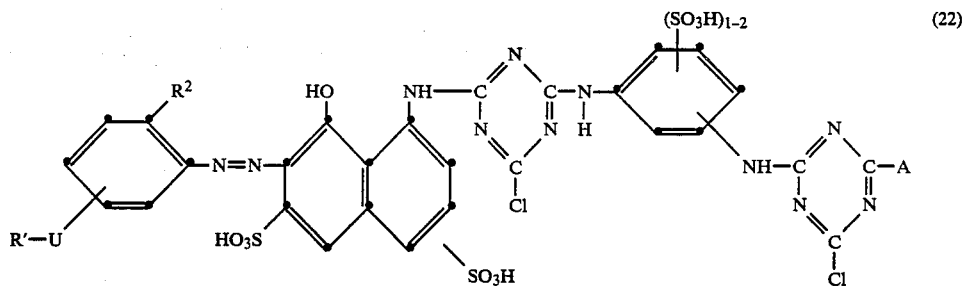
(22)
in which $R_2$ is hydrogen, $C_1$-$C_4$alkyl, $C_1$-$C_4$alkoxy, halogen, hydroxyl, carboxyl or sulfo, U is —CO— or —SO$_2$—, R' is a radical of the formula (3a) to (3d), and A is a radical of the formula (7a) to (7i).
in which $R_9$ is $C_1$-$C_4$alkanoyl or benzoyl, and A is a radical of the formula (7a) to (7i).
in which $R_{10}$ is $C_1$-$C_4$alkanoyl or benzoyl, and A is a radical of the formula (7a) to (7i).
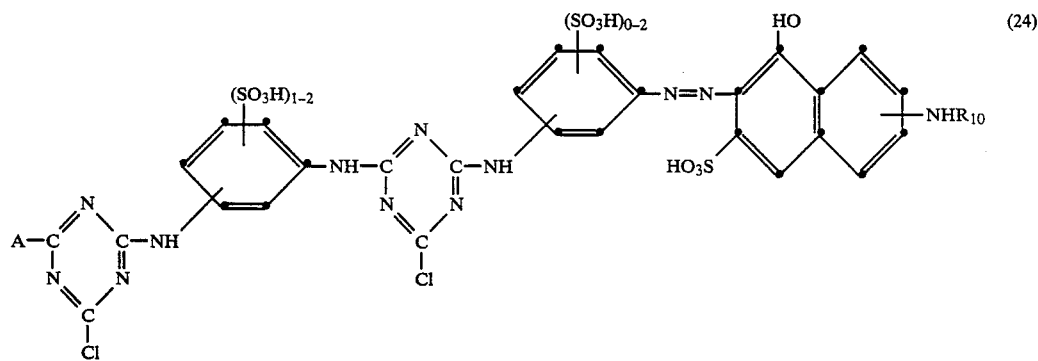
(24)
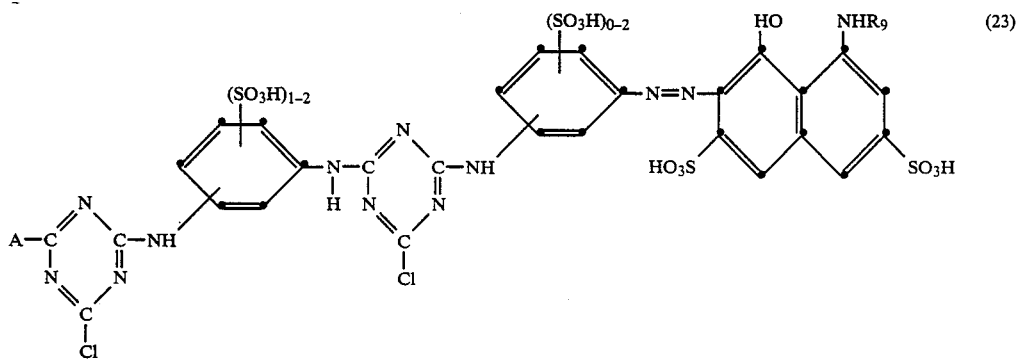
(23)
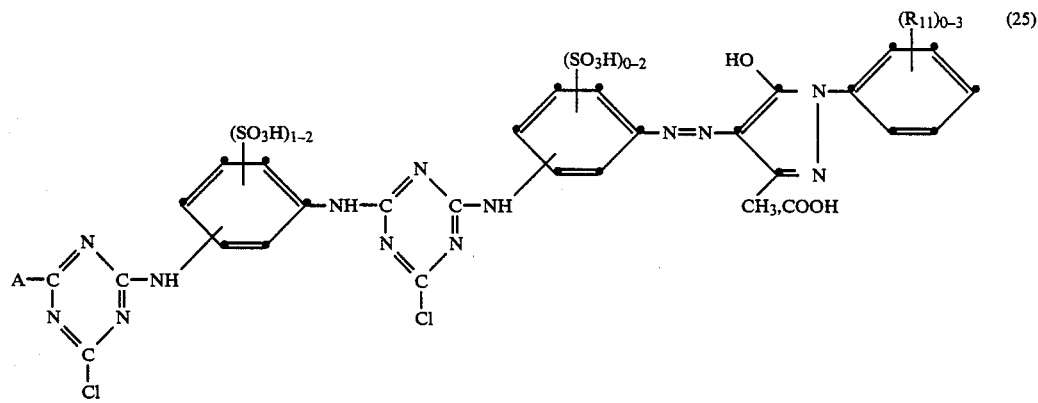
(25)

in which $R_{11}$ is 0 to 3 substituents from the group consisting of $C_1$–$C_4$-alkyl, $C_1$–$C_4$alkoxy, halogen, carboxyl and sulfo, and A is a radical of the formula (7a) to (7i).

cyano, carbamoyl or sulfomethyl, and A is a radical of the formula (7a) to (7i).

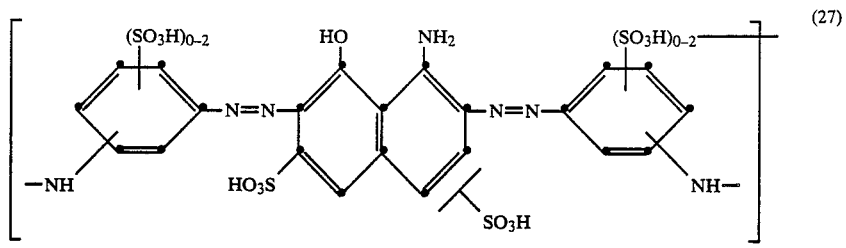

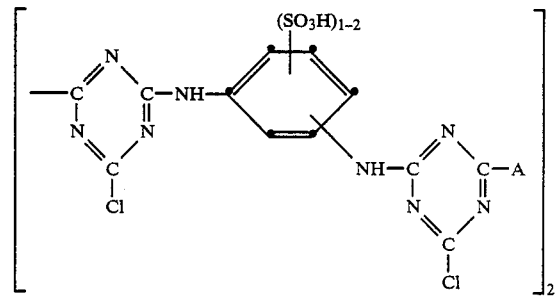

in which A is a radical of the formula (7a) to (7i)

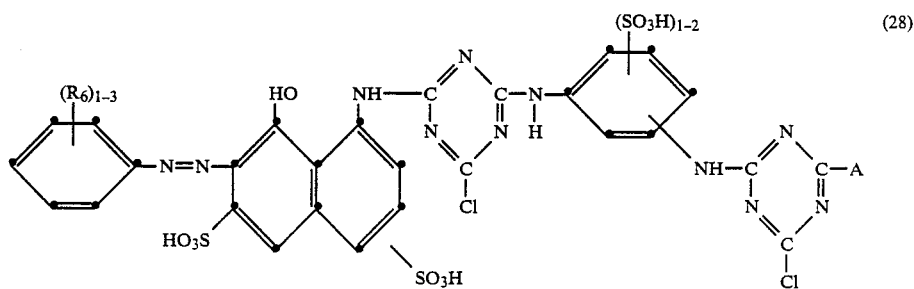

in which $R_6$ is 1 to 3 substituents from the group consisting of $C_1$–$C_4$-alkyl, $C_1$–$C_4$alkoxy, halogen, carboxyl and sulfo, and A is a radical of the formula (4), (5), (6) or (8).

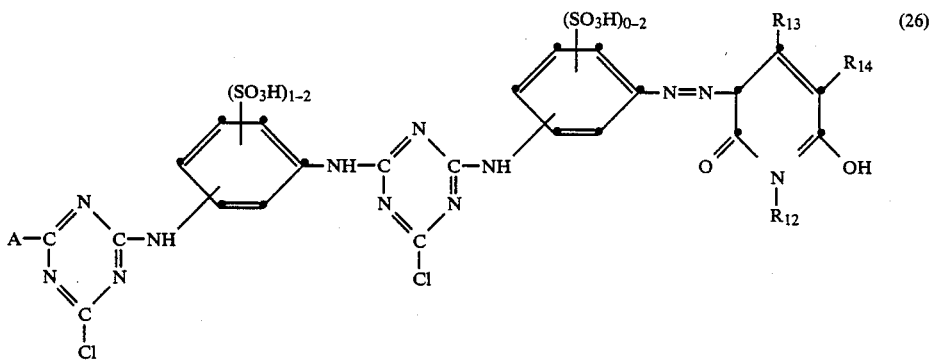

in which $R_{12}$ and $R_{13}$ are independently of each other hydrogen, $C_1$–$C_4$-alkyl or phenyl, and $R_{14}$ is hydrogen,

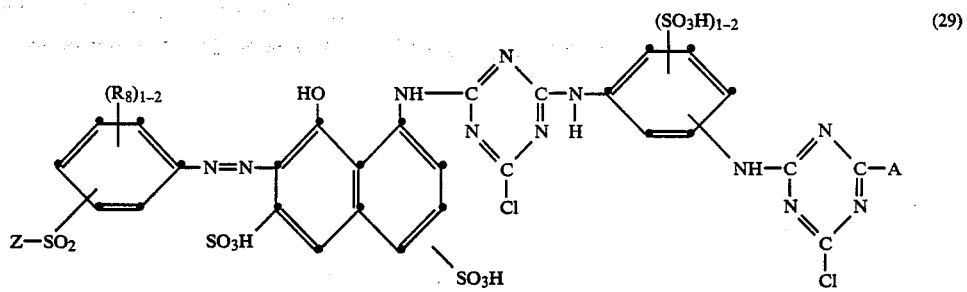

(29)

in which $R_8$ is 1 or 2 substituents from the group consisting of hydrogen, $C_1$–$C_4$alkyl, $C_1$–$C_4$alkoxy, halogen, carboxyl and sulfo, Z is $\beta$-sulfatoethyl, $\beta$-thiosulfatoethyl, $\beta$-phosphatoethyl, $\beta$-acyloxyethyl, $\beta$-haloethyl or vinyl, and A is a radical of the formula (4), (5), (6) or (8).

(33)

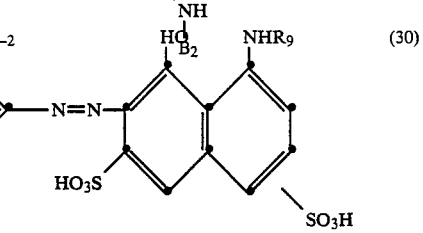

(30)

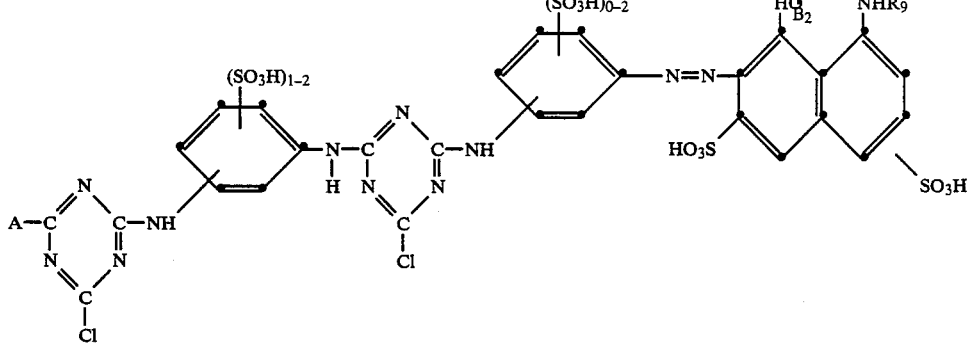

in which $R_9$ is $C_1$–$C_4$alkanoyl or benzoyl, and A is a radical of the formula (4), (5), (6) or (8).

Preference is also given to heavy metal complexes of reactive dyes of the formula (1); suitable complexing heavy metals are in particular copper, nickel, cobalt or chromium.

Preference is given in particular to reactive dyes of the formula (1) in which Z is a $\beta$-sulfatoethyl, $\beta$-chloroethyl or vinyl group, or in which X is fluorine or chlorine. Also suitable in particular are combinations of features according to the preceding description, if applicable.

Reactive dyes of the formula (1) are obtained by reacting an organic dye of the formula

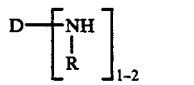

(31)

or a dye precursor, at least two equivalents of an s-triazine of the formula

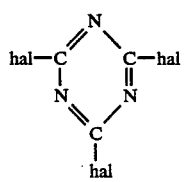

(32)

at least one equivalent of a diamine of the formula

and at least one equivalent of an amine of the formula

H—A     (34)

with one another in any desired order, D, R, $B_1$, $B_2$, Q and A being as defined under the formula (1) and hal being a halogen atom or one of the groups defined under the formula (1) for X and Y, or, if dye precursors are used, converting the intermediates obtained into the desired monohalotriazine dyes and, if desired, following up with a further conversion reaction.

The molar ratio of starting materials needs to be selected in accordance with the composition of the end product, according to whether one or two amino groups —N(R)H are present in the compound of the formula (31).

If desired, the process according to the invention can be followed by a further conversion reaction. The preparation of the end dyes from precursors comprises in particular couplings which lead to azo dyes.

Since the individual process steps mentioned above can be carried out in various orders, if desired in some instances even simultaneously, different process variants are possible. In general, the reaction is carried out in successive steps, the order of the elementary reactions between the individual reaction components advantageously depending on the particular conditions.

An important process comprises condensing a dye of the formula

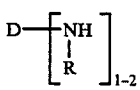 (31)

first with an s-triazine of the formula

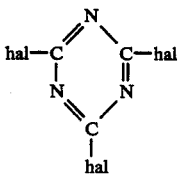 (32)

and then condensing the compound obtained of the formula

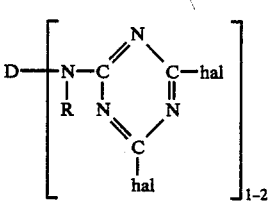 (35)

with a diamine of the formula

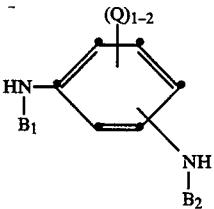 (33)

then again with an s-triazine of the formula (32) and finally with an amine of the formula

H—A (34)

In a modified process, reactive dyes of the formula (1) can be prepared by reacting a component of this dye which contains a radical of the formula

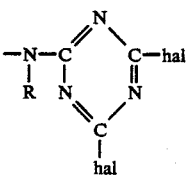 (36)

in which R and hal are as defined above, with a second component required for preparing the dye, which can, if desired, contain a radical of the formula (36), and condensing the resulting dye of the formula

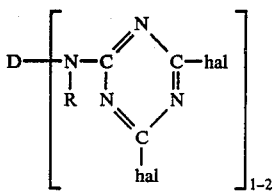 (35)

with a diamine of the formula (33), a further s-triazine of the formula (32) and an amine of the formula (34).

Effectively, it depends on the structure of the starting materials which of the possible process variants produce the best results or under which specific conditions, for example at which condensation temperature, the reaction should best be carried out.

Since under certain preconditions hydrolysis of the halotriazine radical occurs, it is necessary to hydrolyze an acetylamino-containing intermediate, to remove the acetyl groups, before condensation with a halotriazine. Which reaction is advantageously carried out first, for example the preparation of a secondary condensation product of a compound of the formula (33), the triazine of the formula (32) and the organic dye of the formula (31) or a precursor, that of the triazine with the compound of the formula (33) or that with the organic dye or a precursor of the dye, will vary from case to case and will depend in particular on the solubility of the amino compounds involved and on the basicity of the amino groups to be acylated.

A modified embodiment of the process comprises first preparing a dye which contains a preliminary stage of the reactive radical and subsequently converting this preliminary stage into the final stage, for example by esterification or an addition reaction. For example, a dye in which Z is an HO—CH$_2$CH$_2$— radical can be prepared and, before or after the acylation, the intermediate can be reacted with sulfuric acid, so that the hydroxyl group is converted into a sulfato group; or an analogous dye is used in which Z is an H$_2$C=CH— group and thiosulfuric acid is added onto this intermediate to form an HO$_3$SS—CH$_2$CH$_2$— radical. The sulfation of the hydroxyl group in a dye of the formula (1) or in a suitable precursor is effected for example by reaction with concentrated sulfuric acid at 0° C. to moderately elevated temperature. The sulfation can also be effected by reaction of the hydroxy compound with two equivalents of chlorosulfonic acid per hydroxyl group in a polar organic solvent, for example N-methylpyrrolidone, at 10° to 80° C. Preferably, the sulfation is effected by introducing the compound in question into sulfuric acid monohydrate at temperatures between 5° and 15° C. The introduction of another radical for Z in a compound of the formula (1) or an intermediate in place of a halogen atom or the sulfato group, for example a thiosulfato or phosphato group, is effected in a manner known per se. The preparation via an intermediate of the reactive radical proceeds in many cases uniformly and to completion.

In addition, the synthesis can be followed by elimination reactions. For example, reactive dyes of the formula (1) which contain sulfatoethylsulfonyl radicals can be treated with hydrogen halide eliminators, such as sodium hydroxide, and the sulfatoethylsulfonyl radicals become converted into vinylsulfonyl radicals.

It may also be possible to use a process variant where the starting materials are dye precursors. This variant is suitable for preparing reactive dyes of the formula (1) in which D is the radical of a dye composed of two or more than two components, for example a monoazo, disazo, trisazo, metal complex azo, formazan or azomethine dye.

Generally, the reactive dyes of the formula (1) of all dye classes can be prepared in a manner known per se or analogously to known methods by starting from precursors of or intermediates for dyes which contain fibre-reactive radicals of the formula (1) or by introducing these fibre-reactive radicals into intermediates of dye character which are suitable for this purpose.

Preference is given to reactive dyes of the formula (1) in which D is the radical of a monoazo or disazo dye or of a metal complex azo dye. In this case, the reactive radicals of the formula

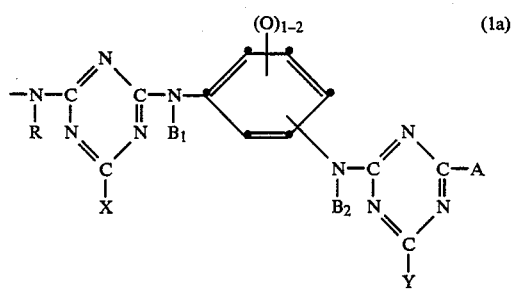

are bonded to the diazo and/or coupling components. If two radicals of the formula (1a) are present in a reactive dye of the formula (1), preferably each radical of the formula (1a) is bonded to one component, i.e. to a diazo component or coupling component. The reactive dyes thus have for example the formulae

and

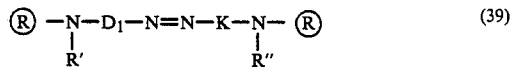

in which R' and R" are independently of each other defined in the same way as $B_1$ in the formula (1), $D_1$ is the radical of a diazo component, K is the radical of a coupling component, and ⓡ is a reactive radical of the formula (1a).

If the starting materials are dye precursors, the reactive dyes of the formula (1) are obtained by condensing a component of the dye of the formula (31) containing an —N(R)H group and a triazine of the formula (32), condensing beforehand or afterwards with a compound of the formula (33), and reacting with the other component of the dye of the formula (31). In the preparation of the preferred azo dyes, the diazo components and the coupling components together need to contain at least one amino group —N(R)H and can contain further amino groups. In this case th diazo components used are in particular 1,3-phenylenediamine-4-sulfonic acid, 1,4-phenylenediamine-2-sulfonic acid, 1,4-phenylenediamine-2,5-disulfonic acid and 1,3-phenylenediamine-4,6-disulfonic acid.

If desired, it is possible to use corresponding acetylamino or nitro compounds in which the acetylamino or nitro group is converted into an $H_2N$ group, by hydrolysis and reduction respectively, before the condensation with the triazine of the formula (32).

If groups capable of metal complex formation are present in the reactive dyes prepared, such as hydroxyl, carboxyl, amino or sulfo, the reactive dyes can subsequently also be metallized. For example, metal complex azo dyes are obtained by treating azo compounds which have been obtained according to the invention and which contain complexing groups, for example hydroxyl or carboxyl groups, in the ortho-ortho'-position relative to the azo bridge, with heavy metal donor agents before or if desired even after the condensation with a triazine of the formula (32). Of particular interest are copper complexes of reactive dyes of the formula (1). In addition to the method of metallization mentioned above, other suitable methods are dealkylating metallizatiion and, for the preparation of copper complexes, oxidative copperring.

The most important process variants are illustrated in the working examples.

In what follows, possible starting materials which can be used for preparing the reactive dyes of the formula (1) will be mentioned individually.

Organic dyes of the formula (31)

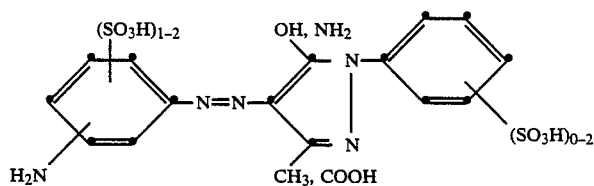

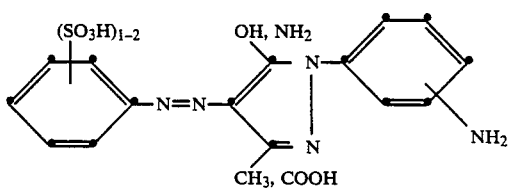

-continued
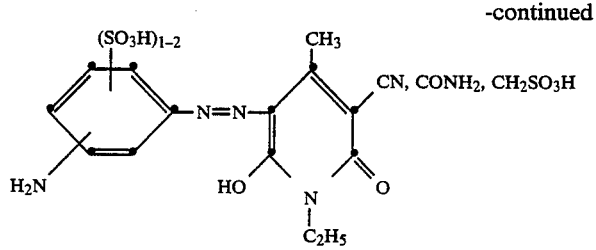
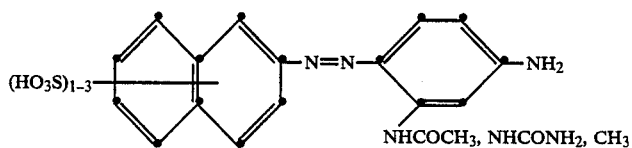
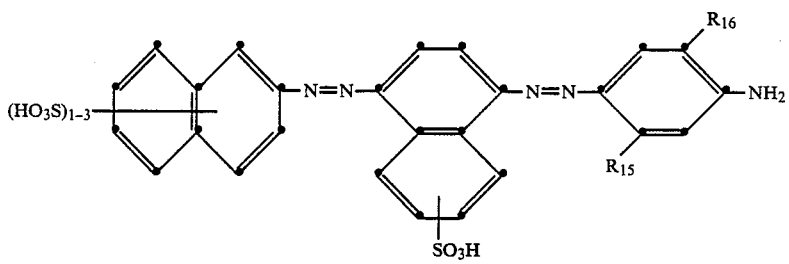
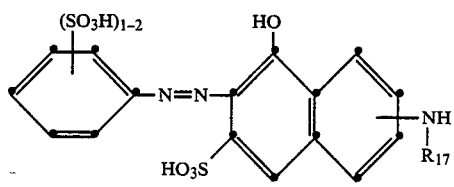
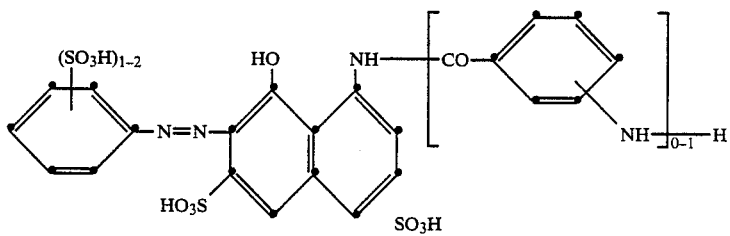
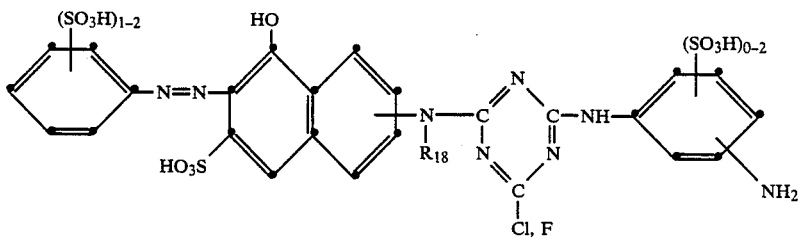
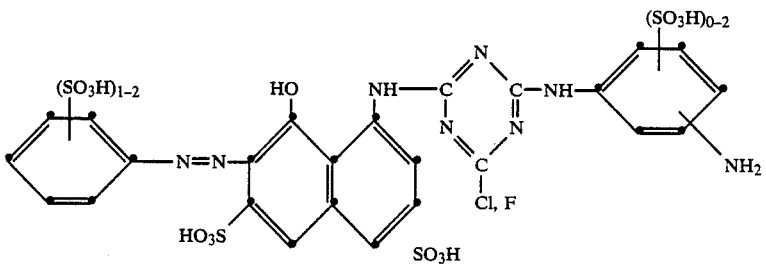

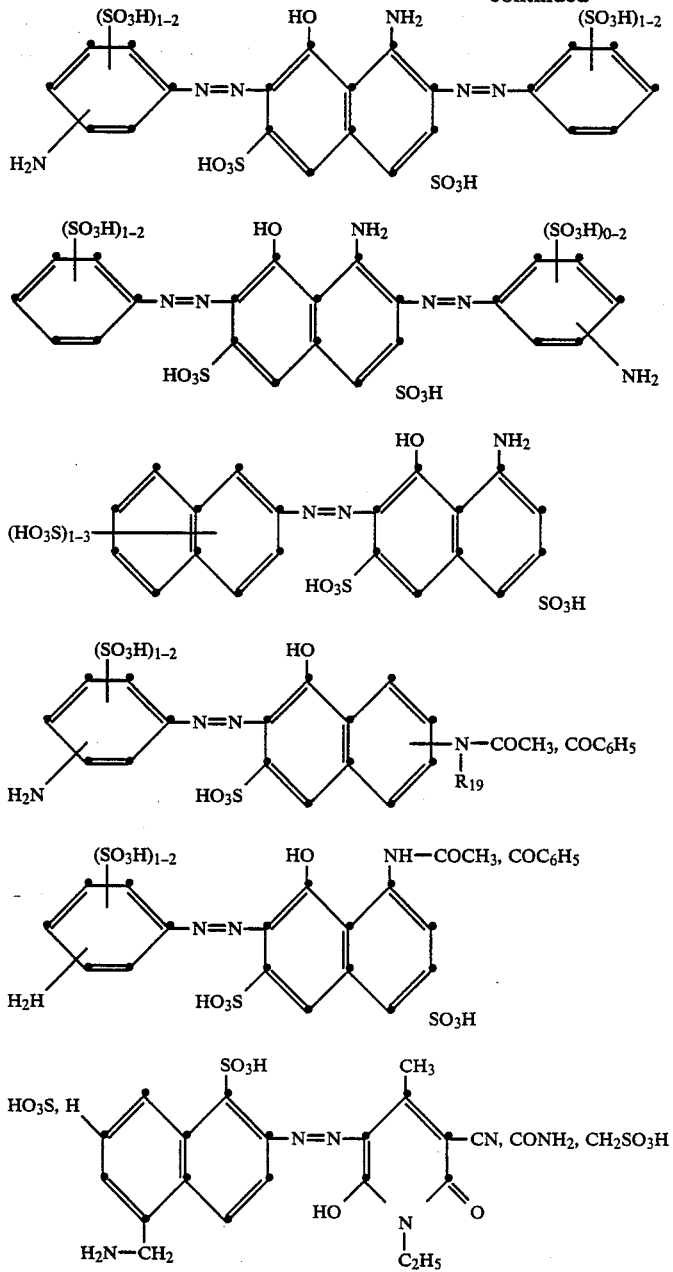
Metal complexes of dyes of the formulae:
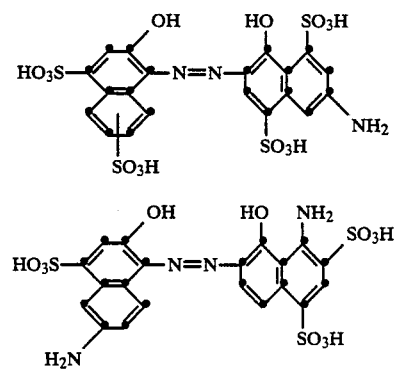
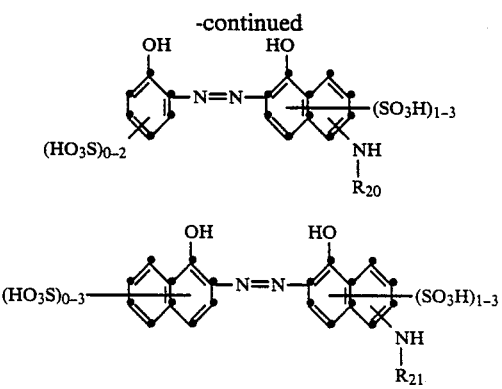

-continued

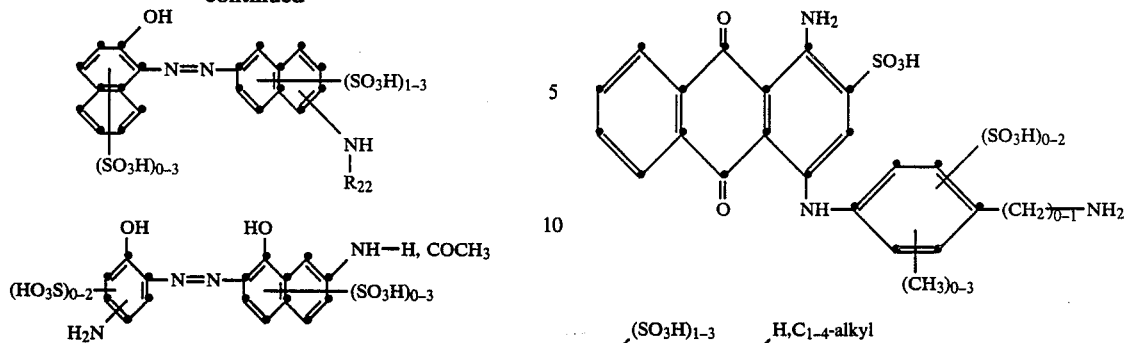

Preferred metal atoms are Cu (1:1 complex) or Cr and Co (1:2 complex). Cr- and Co-complexes can contain the azo compound of the abovementioned-formula once or twice, i.e. they can be constructed symmetrically or, using any other desired ligands, asymmetrically.

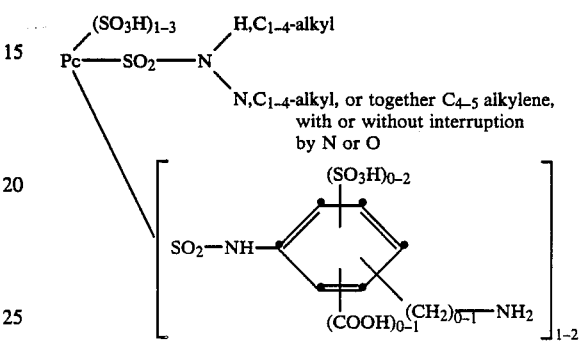

In this formula, Pc is the Cu- or Ni-phthalocyanine radical, the total number of the substituents on the Pc structure being 4.

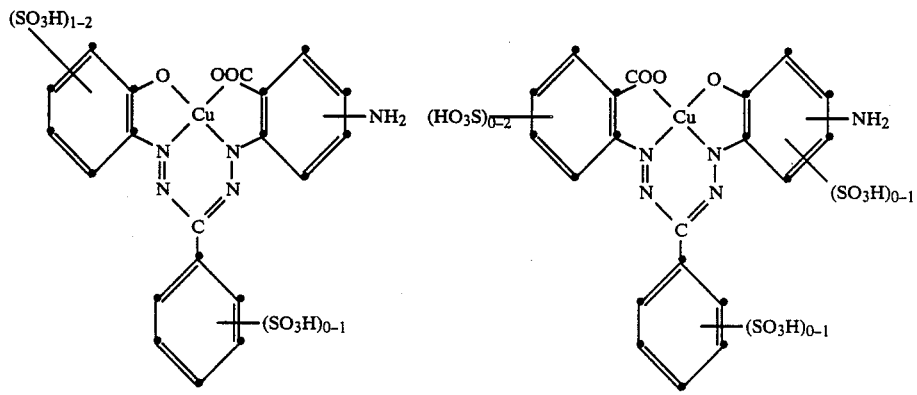

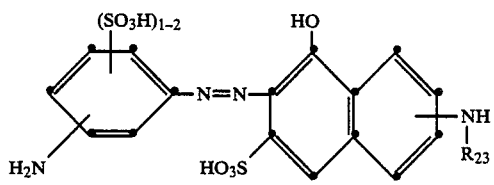

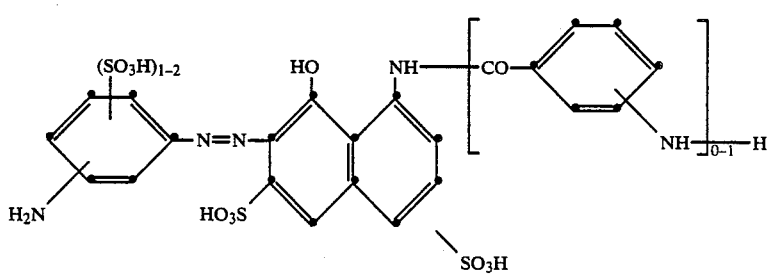

-continued
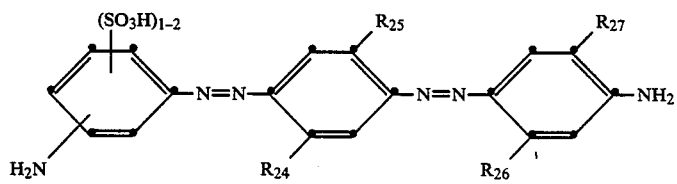
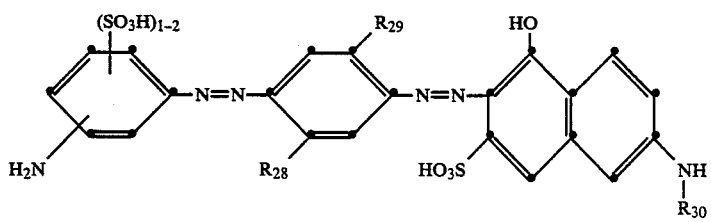
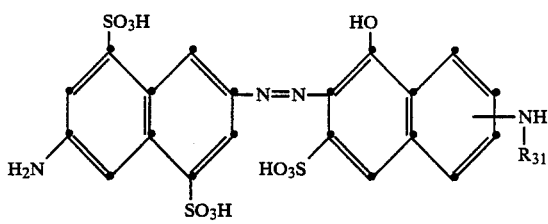
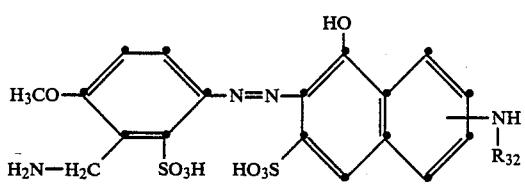
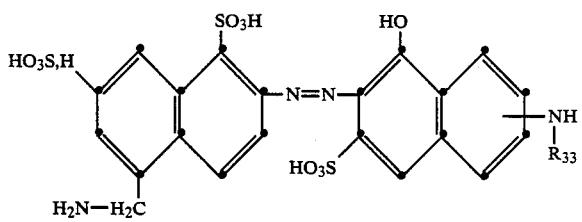
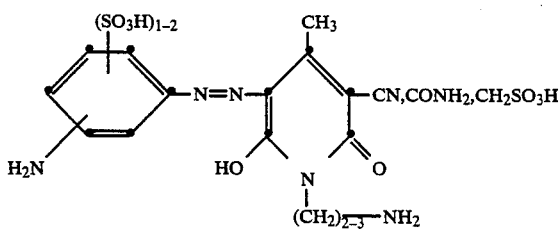
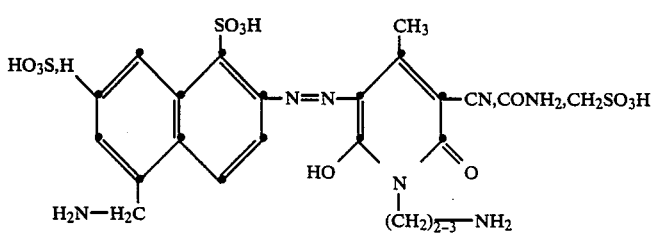

-continued
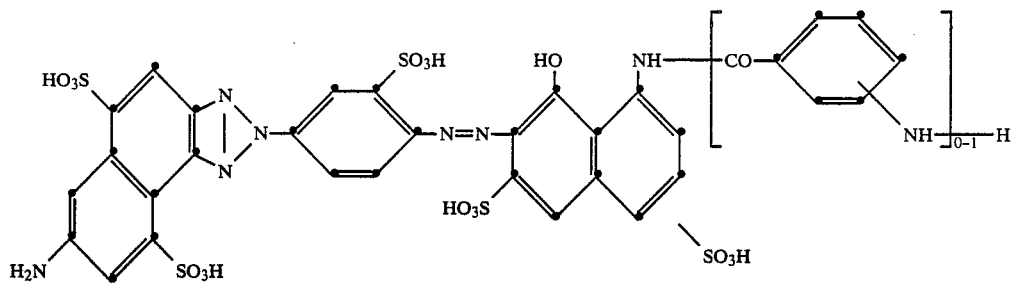
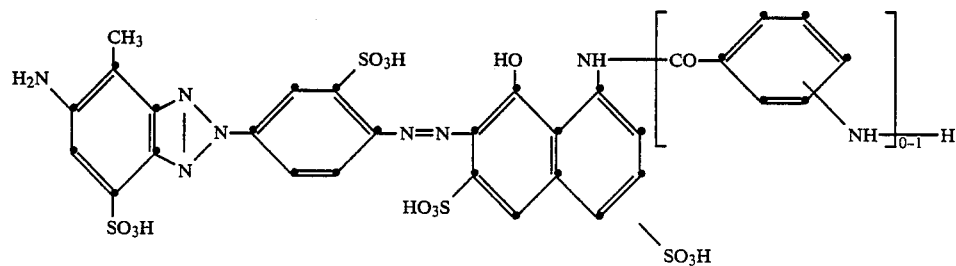
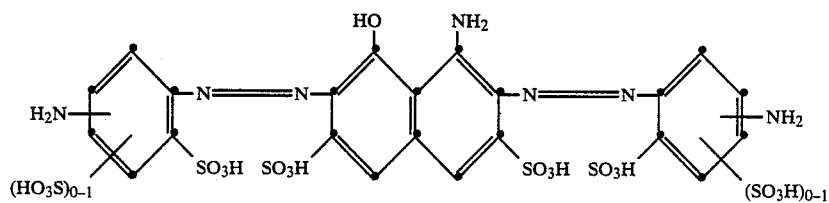
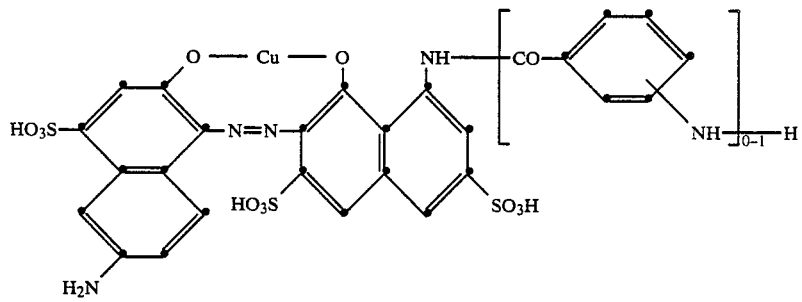
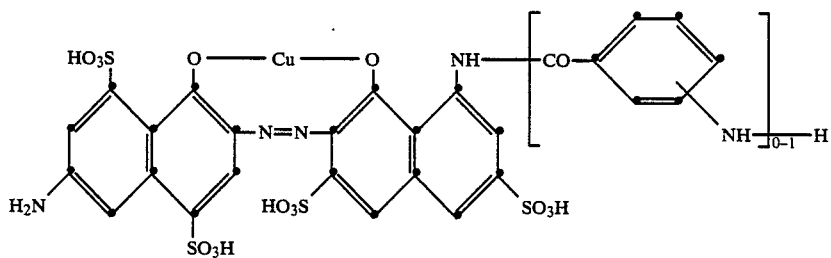
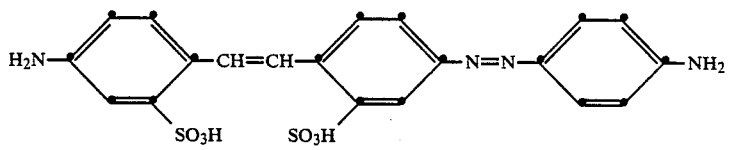

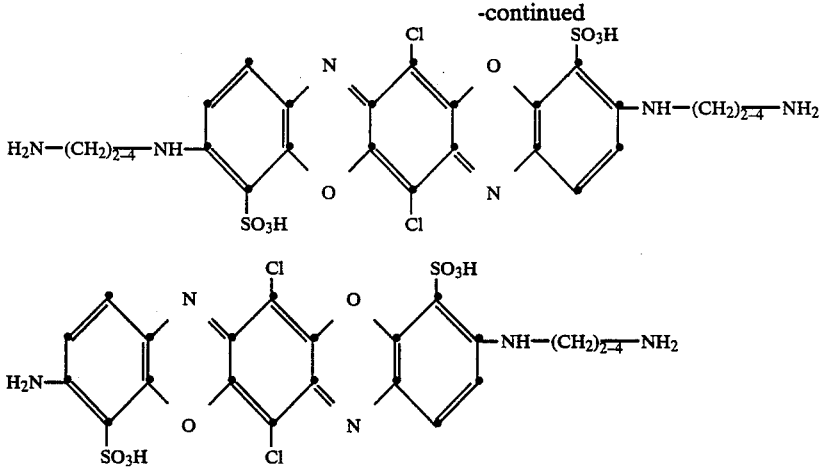

In the formulae shown above, the radicals $R_{17}$ to $R_{23}$ and $R_{30}$ to $R_{33}$ are hydrogen or $C_{1-4}$alkyl, and the radicals $R_{15}$, $R_{16}$ and $R_{24}$ to $R_{29}$ are hyrogen, $C_{1-4}$alkyl, $C_{1-4}$alkoxy, $C_{1-4}$alkanoylamino, ureido or halogen, radicals $R_{15}$, $R_{16}$, ... etc. which belong to one and the same formula being independent of one another. Preferably, radicals $R_{17}$ to $R_{23}$ and $R_{30}$ to $R_{33}$ are hydrogen, methyl or ethyl, and the radicals $R_{15}$, $R_{16}$, $R_{24}$ to $R_{29}$ are hydrogen, methyl, ethyl, methoxy, ethoxy, acetylamino, ureido or chlorine. The aromatic rings in the above dyes can be further substituted, the benzene rings in particular by methyl, ethyl, methoxy, ethoxy, methylsulfonyl, ethylsulfonyl, carboxyl, acetylamino or chlorine, and the naphthalene rings in particular by methoxy, carboxyl, acetylamino, nitro or chlorine; the same is true of the anthraquinones, dioxazines and the like. Preferably, the benzene rings are not further substituted.

Specific diazo and coupling components are:

Diazo components:

Aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 4-amino-biphenyl, 1-aminobenzene-2-, -3- or -4-carboxylic acid, 2-amino-diphenyl ether, 1-aminobenzene-2-, -3-, -4-sulfonamide, -N-methylamide, -N-ethylamide, -N,N-dimethylamide or -N,N-diethylamide, dehydrothio-p-toluidine-sulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methylazobenzene-2'4'-disulfonic acid, 3'-methoxy-4-amino-6-methylazobenzene-2'5'-disulfonic acid 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (Benzidene), 3,3'-dimethylbenzidene, 3,3'-dimethoxybenzidene, 3,3'-dichlorobenzidene, 3,3'-dicarboxybenzidene, 3,3'-dicarboxymethoxybenzidene, 2,2'-dimethylbenzidene, 4,2'-diaminodiphenyl (Diphenylene), 2,6-diaminonaphthalene-4,8-disulfonic acid, 1,4-diaminobenzene-4-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3- diamino-6-methylbenzene-4-sulfonic acid, 3-(3'- or 4'aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid.

If the diazo component to be used is not a diamine but an aminoacetylamino compound from which the acetyl group is subsequently eliminated again by hydrolysis, as is mentioned above in the explanations of the process variants, the possibilities are the monoacetyl compounds of the abovementioned diazo components, for example 1-acetylamino-3-aminobenzene-4-sulfonic acid or 1-acetylamino-4-aminobenzene-3-sulfonic acid.

Coupling components

Phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethyl-amino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6-or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazolone, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1(2'-methyl-4'-sulfophenyl)-5-pyrazolone-3-carboxylic acid, 1-(4',8'-disulfo-2'-naphthyl)-3-methyl-5-pyrazolone, 1-(5',7'-disulfo-2'-naphthyl)-3-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxy-ethylamino)-3-cyano-4-methyl-6-aminopyridine, 2,6-bis-(2'-hydroxyethyl-amino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulfonic acid, 4-hydroxy-2-quinoline, 1-amino-8-hydroxy-2-(phenylazo)-naphthalene-3,6-disulfonic acid, 1-amino-8-hydroxy-2-(4'-sulfophenylazo)-napthalene-3,6-disulfonic acid, 1-amino-8-hydroxy-2-(2',5'-disulfophenylazo)-naphthalene-3,6-disulfonic acid, 1-β-amino-ethyl-3-cyano-4-methyl-6-hydroxy-2-pyridone, 1-γ-aminopropyl-3-sulfomethyl-4-methyl-6-hydroxy-2-pyridone, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfo-benzylamino-4-chlorobenzene, 1-amino-3-N,N-disulfobenzylaminobenzene.

Triazines of the formula (32)

2,4,6-Trifluoro-s-triazine (cyanuric fluoride), 2,4,6-trichloro-s-triazine (cyanuric chloride), 2,4,6-tribromo-s-triazine (cyanuric bromide), 2,4,6-trisulfo-s-triazine, 2,4,6-tris-methylsulfonyl-s-triazine, 2,4,6-tris-phenylsulfonyl-s-triazine.

Amines of the formula (34)

Amines of the general formula (34) are known or can be prepared by known processes. Those amines which form the radical of the formula (5) can be prepared by condensing corresponding nitrophenyl-, nitrophenoxy, or nitrophenylamino-alkanoyl chlorides or analogous naphthalene compounds with amines of the formula $$H-R' \qquad (40)$$

which correspond to the radicals of the formulae (3) to (3d), and reducing the nitro group to an amino group.

The reaction is preferably carried out in a high-boiling organic solvent, for example nitrobenzene. The reduction of the nitro group to an amino group is effected in a manner know per se by catalytic hydrogenation with Pd/carbon in ethanol, ethyl acetate or tetrahydrofuran at room temperature to about 40° C. The reduction can also be carried out with Fe/hydrochloric acid or Fe/acetic acid in aqueous solution.

According to another method, described in DE Offenlegungsschrift 2,040,620, the acid chloride can be reached with an unsaturated aliphatic amine, and 2-mercaptoethanol can be added onto the double bond of the acid amide with the aid of catalytic amounts of a free radical former or sulfur at temperature between 50° C. and 180° C. The hydroxyethyl thioether compounds obtained as a result can also be prepared by condensing the acid chloride with a haloalkylamine and heating the condensation product in alcohol with 2-mercaptoethanol and sodium alkoxide. The thioether compounds are then oxidized to the corresponding sulfones.

The oxidation of the thioether compounds to sulfones can be carried out by various methods, for example with hydrogen peroxide with or without tungsten or vanadium compounds as catalysts, and also with peracetic acid, potassium permanganate or chromic acid, or with chlorine/hydrochloric acid, in each case in an aqueous, aqueous-organic or organic medium.

The carboxamides thus obtainable, where the grouping —$SO_2$—Z is a β-hydroxyethylsulfonyl group, can be converted, by treatment with sulfating agents, phosphorylating agents, halogenating agents, alkylsulfonic or arylsulfonic acid halides, alkylcarboxylic or arylcarboxylic acid halides or alkylcarboxylic or arylcarboxylic anhydrides, into the corresponding dye precursors where the grouping —$SO_2$—Z is for example an —$SO_2$—$CH_2$—$CH_2$—O—$SO_3H$, —$SO_2$—$CH_2$—$CH_2$—O—$PO_3H_2$, —$SO_2$—$CH_2$—$CH_2$— halogen, —$SO_2$—$CH_2$—$CH_2$—O—CO—$CH_3$ or —$SO_2$—$CH_2$—$CH_2$—O—CO—$C_6H_5$ grouping. The products thus obtained can in turn be converted by treatment with alkaline agents, for example alkali metal hydroxide or alkali metal carbonate, such as sodium hydroxide or sodium carbonate, into corresponding compounds where the grouping —$SO_2$—Z is a —$SO_2$—CH=$CH_2$ grouping. The products thus obtained can again be converted by reaction (addition) with salts of thiosulfuric acid, such as sodium thiosulfate, into compounds in which the grouping —$SO_2$—Z is an —$SO_2$—$CH_2$—$CH_2$—S—$SO_3H$ grouping.

Suitable sulfating agents are here for example concentrated sulfuric acid and also chlorosulfonic acid and amidosulfuric acid or other sulfur trioxide donor compounds. Suitable phosphorylating agents are here for example concentrated phosphoric acid, pyrophosphoric acid, metaphosphoric acid, polyphosphoric acid, alkyl polyphosphates, phosphorus oxychloride or mixtures of phosphoric acid and phosphorus (V) oxide. Suitable halogenating agents are for example thionyl chloride and thionyl bromide.

Preference is given to compounds of the formula

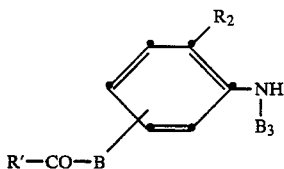

(41)

in which R' is a radical of the formula

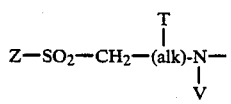

(3a)

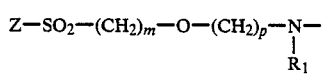

(3b)

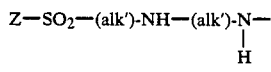

(3c)

or

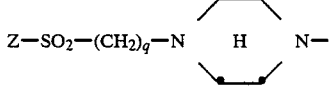

(3d)

$B_3$, B, Z, alk, T, V, $R_1$, alk', m, p and q are as defined under the formula (5), and $R_2$ is hydrogen, $C_1$-$C_4$alkyl, $C_1$-$C_4$alkoxy, halogen, hydroxyl, carboxyl or sulfo. In the compounds of the formula (41), preferably $B_2$ is methyl, ethyl, isopropyl or in particular hydrogen, $R_2$ is methyl, methoxy, chlorine, hydroxyl, carboxyl, sulfo or in particular hydrogen, B is methylene, methyleneoxy, propylene, propylenoxy or butyleneoxy, R' is one of the abovementioned radicals of the formulae (3a) to (3d).

The preferred process for preparing the compounds of the formula (41) comprises condensing a compound of the formula

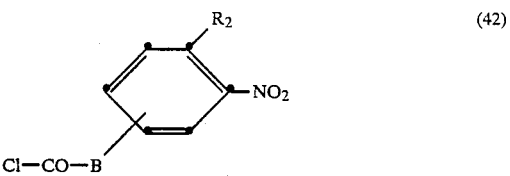

(42)

with an amine of the formula

(43a)

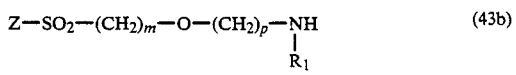

(43b)

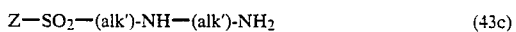

(43c)

or

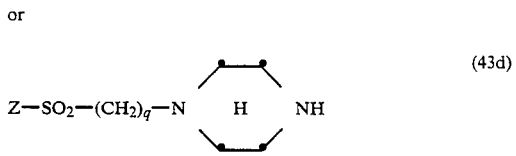

(43d)

and reducing the nitro group to an amino group.

In a modified version of the process described above, compounds of the formula (41) can also be prepared by condensing a compound of the formula (42) with an amine of the formula

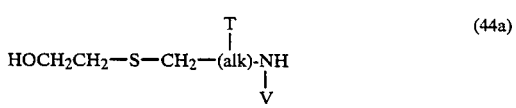

(44a)

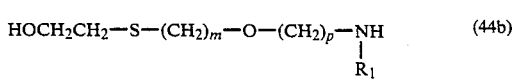

(44b)

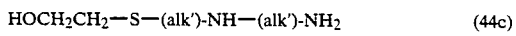

(44c)

or

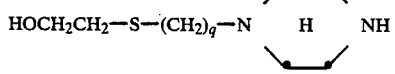 (44d)

oxidizing the condensation product with elemental chlorine to the corresponding β-chloroethylsulfonyl compound, and reducing the nitro group to an amino group.

In another possible process variant, first a compound of the formula (42) is condensed with one of the amines of formulae (44a) to (44d). The product obtained is oxidized with a peroxide to a sulfone, the nitro group is then reduced to an amino group, the amino compound obtained is condensed with an s-triazine of the formula (32) and finally the hydroxyl group in the radical of one of the amines of the formulae (44a) to (44d) is sulfated.

The condensation of the compound of the formula (42) with the amines of the formulae (44a) to (44d) is carried out for example in chloroform at room temperature and in the presence of alkaline, acid-binding agents, for example alkali metal hydroxides, alkali metal carbonates or alkali metal bicarbonates. The condensation product is then oxidized with a chlorine/hydrochloric acid mixture in a manner known per se. The reduction of the nitro group to an amino group is carried out as described above.

The amines of the formulae (43a) to (44d) used as starting compounds can be prepared analogously to the method of Example 1 of DE Offenlegungsschrift 2,614,550.

Further amines of the formula (34)
3-Amino-N'-β-(β'-chloroethylsulfonyl)ethylbenzamide,
4-Chloro-3-amino-N'-β-(β'-chloroethylsulfonyl)ethylbenzamide,
4-Methyl-3-amino-N'-β-(β'-chloroethylsulfonyl)ethylbenzamide,
4-Methoxy-3-amino-N'-β-(β'-chloroethylsulfonyl)ethylbenzamide,
3-Amino-N'-β[β'-(β''-chloroethylsulfonyl)ethyloxy]ethylbenzamide,
3-Amino-N'-γ-(β'-chloroethylsulfonyl)propylbenzamide,
3-Amino-N'-bis[β-(β'-chloroethylsulfonyl)ethyl]benzamide,
3-Amino-N'-bis[γ-(β'-chloroethylsulfonyl)propyl]benzamide,
3-N-ethylamino-N'-β-(β'-chloroethylsulfonyl)ethylbenzamide,
3-N-isopropylamino-N'-β-(β'-chloroethylsulfonyl)ethylbenzamide,
3-N-isopropylamino-N'-γ-(β'-chloroethylsulfonyl)propylbenzamide,
4-Amino-N'-β-(β'-chloroethylsulfonyl)ethylbenzamide,
4-Amino-N'-β-[β'-(β''-chloroethylsulfonyl)ethyloxy]ethylbenzamide,
4-Amino-N'-γ-(β'-chloroethylsulfonyl)propylbenzamide,
4-Amino-N'-bis[β-(β-chloroethylsulfonyl)ethyl]benzamide,
4-Amino-N'-bis[γ-(β'-chloroethylsulfonyl)propyl]benzamide,
4-N-ethylamino-N'-β-(β'-chloroethylsulfonyl)ethylbenzamide,
4-N-isopropylamino-N'-γ-(β'-chloroethylsulfonyl)propylbenzamide,
4-Amino-N'-β-(vinylsulfonyl)ethylbenzamide,
4-Amino-N'-bis[β-(vinylsulfonyl)ethyl]benzamide,
4-Amino-N'-δ-(β'-chloroethylsulfonyl)butylbenzamide,
4-Chloro-3-amino-N'-bis[β-(β'-chloroethylsulfonyl)ethyl]benzamide,
4-Methyl-3-amino-N'-bis[β-(β'-chloroethylsulfonyl)ethyl]benzamide,
4-Methoxy-3-amino-N'-bis[γ-(β'-chloroethylsulfonyl)propyl]benzamide,
3-Amino-N'-δ-(β'-chloroethylsulfonyl)butylbenzamide,
3-Amino-N'-β-[β'-(β''-chloroethylsulfonyl)ethyloxy]ethylbenzamide,
4-Hydroxy-3-amino-N'-β-(β'-chloroethylsulfonyl)ethylbenzamide,
4-Hydroxy-3-amino-N'-bis[β-(β'-chloroethylsulfonyl)ethyl]benzamide,
4-Methoxy-3-amino-N'-bis[β-(β'-chloroethylsulfonyl)ethyl]benzamide,
and corresponding compounds in which the β-chloroethylsulfonyl group has been replaced by β-sulfatoethylsulfonyl or vinylsulfonyl; also suitable are:
4-Amino-3-sulfo-N'-β-(β'-chloroethylsulfonyl)ethylbenzamide,
4-Amino-3-sulfo-N'-β-(β'-sulfatoethylsulfonyl)ethylbenzamide,
4-Amino-3-sulfo-N'-β-vinylsulfonyl-ethylbenzamide,
3-Amino-2-sulfo-N'-β-vinylsulfonyl-ethylbenzamide,
3-Amino-4-methoxy-N'-β-(β'-sulfatoethylsulfonyl)ethylbenzamide,
4-Amino-3-sulfo-N'-bis(β-vinylsulfonylethyl)benzamide,
3-Amino-4-methoxy-N'-bis[β-(β'-sulfatoethylsulfonyl)ethyl]benzamide,
3-Amino-2-sulfo-N'-bis(β-vinylsulfonylethyl)benzamide,
3-Amino-4-methoxy-N'-(γ-vinylsulfonylpropyl)piperazinylbenzamide,
4-Amino-3-methoxy-N'-bis(β-vinylsulfonylethyl)benzamide,
3-Amino-N'-β-(β'-vinylsulfonylethylamino)ethylbenzamide,
3-Amino-4-methyl-N'-(β-vinylsulfonylethyl)piperazinylbenzamide,
4-Amino-3-sulfo-N'-bis[β-(β'-sulfatoethylsulfonyl)ethyl]benzamide,
3-Amino-4-methoxy-N'-bis(β-vinylsulfonylethyl)benzamide,
3-Amino-4-methoxy-N'-(β-vinylsulfonylethyl)benzamide,
4-Amino-3-sulfo-N'-(γ-vinylsulfonylpropyl)piperazinylbenzamide,
4-Amino-3-sulfo-N'-β-(β'-vinylsulfonylethylamino)ethylbenzamide,
3-Amino-4-methyl-N'-β-(β'-sulfatoethylsulfonyl)ethylbenzamide,
4-Amino-3-sulfo-N'-bis[β-(β'-chloroethylsulfonyl)ethyl]benzamide,
4-Amino-3-sulfo-N'-(β-vinylsulfonylethyl)piperazinylbenzamide,
4-Amino-3-sulfo-N'-β-(β'-vinylsulfonylethylamino)ethylbenzamide,
5-Amino-1,3-N',N''-(β-vinylsulfonylethyl)benzodicarboxamide,
4-Amino-3-sulfo-N'-β-(β'-vinylsulfonylethyloxy)ethylbenzamide, and also analogous aminobenzamides and aminobenzenesulfonamides of the following amino compounds:

β-[β'-(β'''-chloroethylsulfonyl)ethylamino]ethylamine,
β-(β'-Vinylsulfonylethylamino)ethylamine,
β-[β'-(β'''-Sulfatoethylsulfonyl)-α'-methylethylamino]ethylamine,
β-[β'-(β'''-Sulfatoethylsulfonyl)-α'-methylethylamino]-β-methylethylamine,
γ-[β'-(β'''-Sulfatoethylsulfonyl)-α'-methylethylamino]propylamine,
δ-[β'-(β'''-Sulfatoethylsulfonyl)-α'-methylethylamino]-n-butylamine,
α-Carboxyl-β-(β'-chloroethylsulfonyl)ethylamine,
α-Ethoxycarbonyl-β-(β'-chloroethylsulfonyl)ethylamine,
β-Hydroxy-γ-(β'-chloroethylsulfonyl)propylamine,
β,γ-(Bis-β'-chloroethylsulfonyl)propylamine,
β-Acetoxy-γ-(β'-acetoxyethylsulfonyl)propylamine,
β-Chloro-γ-(β'-chloroethylsulfonyl)propylamine,
β-Sulfato-γ-(β'-sulfatoethylsulfonyl)propylamine,
Bis-[β-hydroxy-γ-(β'-chloroethylsulfonyl)propyl]amine,
Bis-[β-chloro-γ-(β'-chloroethylsulfonyl)propyl]amine,
Bis-[β-sulfato-γ-(β'-sulfatoethylsulfonyl)propyl]amine,
β-Hydroxy-γ-(β'-vinylsulfonyl)propylamine,

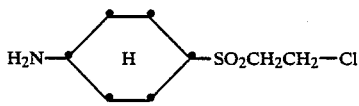

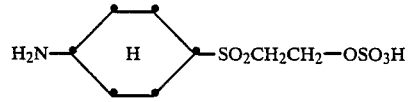

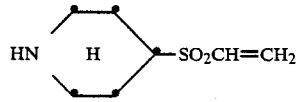

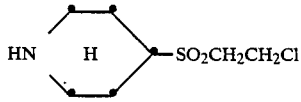

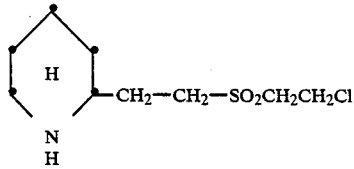

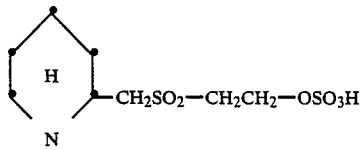

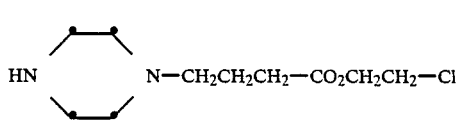

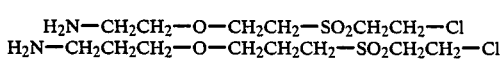

$H_2N-CH_2CH_2-O-CH_2CH_2-SO_2CH_2CH_2-Cl$
$H_2N-CH_2CH_2CH_2-O-CH_2CH_2CH_2-SO_2CH_2CH_2-Cl$ $H_2N-CH_2CH_2-NH-CH_2CH_2SO_2-CH_2CH_2-Cl$
$H_2N-CH_2CH_2-NH-CH_2CH_2SO_2-CH=CH_2$ $H_2N-CH_2CH_2-NH-\underset{\underset{CH_3}{|}}{CH}-CH_2SO_2CH_2CH_2-OSO_3H$ $H_2N-CH_2-\underset{\underset{CH_3}{|}}{CH}-NH-\underset{\underset{CH_3}{|}}{CH}-CH_2SO_2CH_2CH_2-OSO_3H$ $H_2N-CH_2CH_2CH_2-NH-\underset{\underset{CH_3}{|}}{CH}-CH_2SO_2-CH_2CH_2-OSO_3H$ $H_2N-CH_2CH_2CH_2CH_2-NH-\underset{\underset{CH_3}{|}}{CH}-CH_2SO_2CH_2CH_2-OSO_3H$ $H_2NCH_2CH_2SO_2CH_2CH_2Cl$

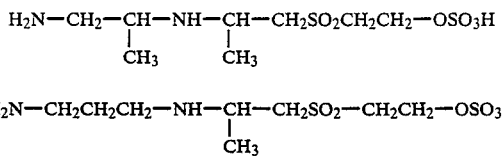

$H_2NCH_2CH_2OCH_2CH_2SO_2CH_2CH_2Cl$
$H_2NCH_2CH_2SO_2CH=CH_2$

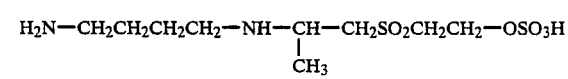

$H_2NCH_2CH_2OCH_2CH_2SO_2CH=CH_2$
$H_2NCH_2CH_2NHCH_2CH_2SO_2CH=CH_2$

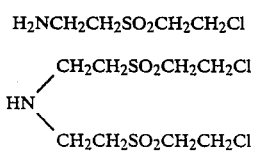

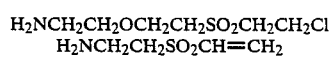

1-Amino-2-, -3- or -4-phenyl β-sulfatoethyl sulfone,
1-Amino-4-methyl-3-phenyl β-sulfatoethyl sulfone,
1-Amino-3-phenyl β-chloroethyl sulfone,
1-Amino-4-methoxy-3-phenyl β-sulfatoethyl sulfone,
1-Amino-2-sulfo-4-phenyl β-sulfatoethyl sulfone,
1-Amino-2-sulfo-5-phenyl β-sulfatoethyl sulfone,
1-Amino-2,4-disulfo-5-phenyl β-sulfatoethyl sulfone,
1-Amino-4-naphthyl β-sulfatoethyl sulfone,
1-Amino-2,5-dimethoxy-4-phenyl β-sulfatoethyl sulfone,
1-Amino-2-carboxyl-4-phenyl β-sulfatoethyl sulfone,
1-amino-2-carboxyl-5-phenyl β-sulfatoethyl sulfone,
1-Amino-2-methoxy-4-phenyl β-sulfatoethyl sulfone,
1-Amino-2-chloro-4-phenyl β-sulfatoethyl sulfone,
1-Amino-2-methoxy-5-phenyl β-sulfatoethyl sulfone,
2-Amino-8-naphthyl β-sulfatoethyl sulfone,
2-Amino-6-sulfo-8-naphthyl β-sulfatoethyl sulfone,
1-Amino-2,5-dimethoxy-4-phenyl vinyl sulfone,
1-Amino-2-methoxy-5-methyl-4-phenyl β-sulfatoethyl sulfone,
1-Amino-2,5-diethoxy-4-phenyl β-sulfatoethyl sulfone,
1-Amino-2-bromo-4-phenyl β-sulfatoethyl sulfone,
1-Amino-2-bromo-4-phenyl vinyl sulfone,
1-Amino-2,4-disulfo-5-phenyl vinyl sulfone, 1-Amino-2,4-disulfo-5-phenyl β-phosphatoethyl sulfone,
1-Amino-2,4-disulfo-5-phenyl β-chloroethyl sulfone,
2-Amino-6-sulfo-8-naphthyl β-phosphatoethyl sulfone,
2-Amino-6-sulfo-8-naphthyl vinyl sulfone,
1-Amino-2-methoxy-5-methyl-4-phenyl β-chloroethyl sulfone,
2-Amino-1-hydroxy-4-phenyl β-sulfatoethyl sulfone,
1-Amino-3- or -4-phenyl vinyl sulfone,
1-Amino-2-hydroxy-4-phenyl β-sulfatoethyl sulfone,
1-Amino-2-sulfo-5-phenyl vinyl sulfone,
3-(N-methyl-β-sulfatoethylsulfonylamino)-1-aminobenzene,
3-(N-ethyl-β-sulfatoethylsulfonylamino)-1-aminobenzene,
3- -Sulfatoethylethylsulfonylamino-1-aminobenzene.

The condensation of the s-triazine of the formula (32), in particular of a 2,4,6-trihalo-s-triazine, with the organic dyes of the formula (31) or with the diazotizable and/or couplable components containing an —N(R)H group is preferably effected in aqueous solution or suspension, at low temperatures, for example between 0° and 5° C., and at a weakly acidic, neutral or weakly alkaline pH. Advantageously, the hydrogen halide freed in the course of condensation is continuously neutralized by adding aqueous alkali metal hydroxides, alkali metal carbonates or alkali metal bicarbonates. For further reaction of the halotriazine dyes thus obtained, or for the reaction of the 2,4,6-trihalo-s-triazine with the compounds of the formula (34), the free amines or salts thereof, preferablly in the form of the hydrochloride, are used. The reaction is carried out at temperatures between about 0° and 40° C., preferably between 5° and 25° C., in the presence of acid-binding agents, preferably sodium carbonate, within a pH range from 2 to 8, preferably 5 to 6.5.

The condensation of the halotriazine with a compound of the formula (34) can be carried out before or after the condensation of the halotriazine with a dye of the formula (31). The condensation of the halotriazine with a compound of the formula (34) is preferably carried out in aqueous solution or suspension, at low temperature and at weakly acid or neutral pH. Here, too, the hydrogen halide freed in the course of the condensation is advantageously neutralized by uninterrupted addition of aqueous alkali metal hydroxide, alkali metal carbonates or alkali metal bicarbonates.

The diazotization of the diazo components, or of the intermediates containing a diazotizable amino group, is effected in general by the action of nitrous acid in aqueous mineral acid solution at low temperature. The coupling onto the coupling component takes place at strongly acid, neutral or weakly alkaline pH.

The reactive dyes of the formula (1) are suitable for dyeing and printing a very wide range of materials, such as silk, leather, wool, polyamide fibres and polyurethanes, and in particular cellulose-containing fibre materials of any kind. Such fibre materials are for example the natural cellulose fibers, such as cotton, linen and hemp, and also cellulose pulp and regenerated cellulose. The reactive dyes of the formula (1) are also suitable for dyeing or printing hydroxyl-containing fibres which are present in blend fabrics, for example mixtures of cotton with polyamide fibres or in particular polyester fibres.

The dyes according to the invention can be applied to the fibre material and fixed on the fibre in various ways, in particular in the form of aqueous dye solutions and print pastes. They are suitable not only for the exhaust method of dyeing but also for dyeing by the padding method, whereby the material is impregnated with aqueous, optionally salt-containing dye solutions and the dyes are fixed after an alkali treatment or in the presence of alkali, if desired by heating. After fixing, the dyeings and prints are thoroughly rinsed with cold and hot water, in the presence or absence of an agent which has a dispersing action and promotes the diffusion of the unfixed portions.

If the reactive dyes of the formula (1) in which D is the radical of an anthraquinone dye are insufficiently soluble in the alkaline dyeing liquor, this defect can be remedied in a manner known from the literature, namely by adding dispersants or other non-coloured compounds, for example a naphthalenesulfonic acid/formaldehyde condensate or in particular anthraquinone-2-sulfonic acid.

The reactive dyes of the formula (1) are distinguished by high reactivity and good fixing properties and very good build-up. They can therefore be used for exhaustive dyeing at low dyeing temperatures and require only short steaming times in the pad-steam process. The degrees of fixation are high, and the unfixed portions can easily be washed off, the difference between the degree of exhaustion and the degree of fixation being remarkably small, i.e. the soaping loss being very small. The reactive dyes of the formula (1) are also suitable for printing, in particular on cotton, but also for printing nitrogen-containing fibres, for example wool, silk or wool- or silk-containing blend fabrics.

The dyeings and prints prepared with the dyes according to the invention on cellulose fibre materials have a high tinctorial strength and high fibre-dye bond stability, not only in the acid but also in the alkaline range, and also a good light fastness and very good wet fastness properties, such as wash, water, seawater, cross-dyeing and perspiration fastness properties, and also a good pleating fastness, hot press fastness and rub fastness.

The examples which follow serve to illustrate the invention. The temperatures are given in degrees celsius, and parts and percentages are by weight, unless otherwise stated. Parts by weight relate to parts by volume as the kilogram relates to the liter.

The preparation of the monoazo or disazo intermediate compounds has not been described in all cases in the working examples below, but it will be readily apparent from the general description.

EXAMPLE 1

25 parts by volume of a 4N sodium nitrite solution are added to a neutral aqueous solution containing 35.8 parts of the sodium salt of 2-(3'-aminophenyl)amino-4,6-dichloro-1,3,5-triazine-4'-sulfonic acid, ice is added to cool down to 0°, and 25 parts by volume of concentrated hydrochloric acid are added all at once. After the diazotization has ended, a small excess of nitrous acid is destroyed by addition of sulfamic acid. An aqueous solution containing 24 parts of the sodium salt of 2,6-dihydroxy-3-sulfomethyl-4-methylpyridine is then poured into the suspension of the diazo compound. The diazo compound dissolves to form a clear yellow dye solution. This solution is brought to pH 7, and a neutral aqueous solution of 21 parts of the sodium salt of 1,3-phenylenediamine-4-sulfonic acid is then added. The condensation reaction is carried out at 20°–25° while the pH of the solution is maintained at 6–7 by dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the dropwise addition of sodium hydroxide solution.

hydroxide solution. After the condensation has ended, 22 parts of HClH$_2$N(CH$_2$)$_2$SO$_2$(CH$_2$)$_2$Cl are added and stirred in at 20°–40° and pH 7–8 in the course of 3 hours. Sodium chloride is added to salt out the dye of the formula

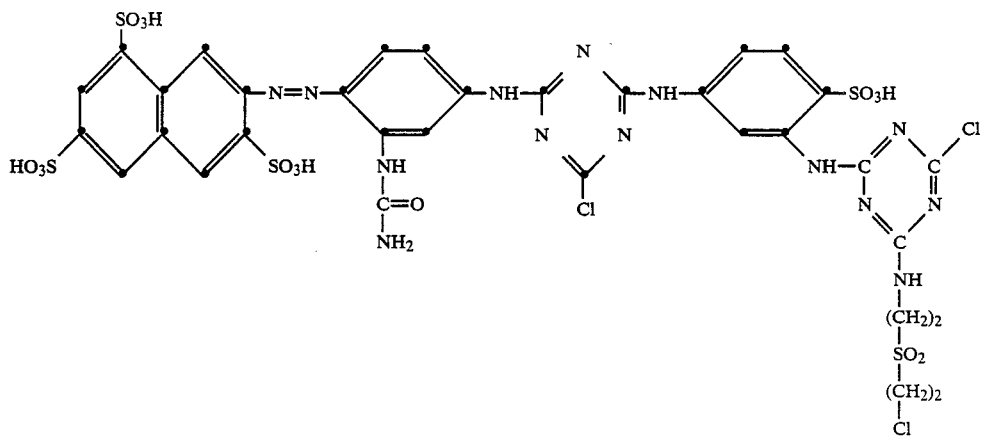

After the condensation has ended, 25.2 parts of HClH$_2$N(CH$_2$)O(CH$_2$)$_2$SO$_2$(CH$_2$)$_2$Cl are added and stirred in at 20°–40° and pH 7–8 for 3 hours.

Sodium chloride is added to salt out the dye of the formula which is then filtered off and dried. It dyes cellulose fibres in fast golden yellow shades.

EXAMPLE 3

54.5 parts of the dye 2-(4′-amino-2′-ureidophenylazo)-

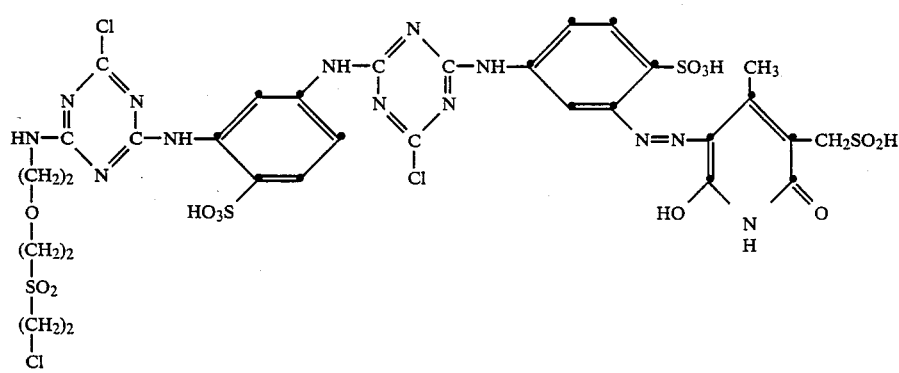

which is then filtered off and dried. It dyes cellulose fibres in fast greenish yellow shades.

EXAMPLE 2

54.5 parts of the dye 2-(4′-amino-2′-ureidophenylazo)-naphthalene-3,6,8-trisulfonic acid are dissolved in 250 parts of water under neutral conditions. This neutral solution is added to a suspension of 18.5 parts of cyanuric chloride in acetone and water. By cooling with ice the temperature is maintained at 0° to 3°. In the course of the acylation reaction 9 g of bicarbonate are added in such a way that the pH stays between 5.5 and 7. Once no starting dye is detectable any longer in a chromatogram, a neutral aqueous solution of 19 parts of 1,3-phenylenediamine-4-sulfonic acid is added. The condensation is carried out at 20°–25° while the pH of the solution is maintained at 6–7 by the dropwise addition of sodium hydroxide solution. After the condensation has ended, the mixture is cooled down and admixed with a solution of 18.5 parts of cyanuric chloride in 50 parts of acetone. The condensation is carried out at 0°–5° while the pH is maintained at 6–7 by the addition of sodium naphthalene-3,6,8-trisulfonic acid are dissolved in 250 parts of water under neutral conditions. This neutral solution is added to a suspension of 18.5 parts of cyanuric chloride in acetone and water. By cooling with ice the temperature is maintained at 0° to 3°. In the course of the acylation reaction 9 g of bicarbonate are added in such a way that the pH stays between 5.5 and 7. Once no starting dyes is detectable any longer in a chromatogram, a neutral aqueous solution of 19 parts of 1,4-phenylenediamine-2-sulfonic acid is added. The condensation is carried out at 20°–25° while the pH of the solution is maintained at 6–7 by the dropwise addition of sodium hydroxide solution. After the condensation has ended, the mixture is cooled down to 0° and admixed with a solution of 18.5 parts of cyanuric chloride in 50 parts of acetone. The condensation is carried out at 0°–5° while the pH is maintained at 6–7 by the addition of sodium hydroxide solution. After the condensation has ended, 25 parts of HCl H$_2$N(CH$_2$)$_2$O(CH$_2$)$_2$Cl are added and stirred in at 20°–40° and pH 7–8 in the course of 3 hours. Sodium chloride is added to salt out the dye of the formula

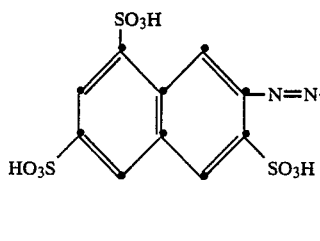

which is then filtered off and dried. It dyes cellulose fibres in fast golden yellow shades.

EXAMPLE 4

54.5 parts of the dye 2-(4'-amino-2'-ureidophenylazo)-naphthalene-3,6,8-trisulfonic acid are dissolved in 250 parts of water under neutral conditions. This neutral solution is added to a suspension of 18.5 parts of cyanuric chloride in acetone and water. By cooling with ice the temperature is maintained at 0° to 3°. In the course of the acylation reaction 9 g of bicarbonate are added in such a way that the pH stays between 5.5 and 7. Once no starting dye is detectable any longer in a chromatogram, a neutral aqueous solution of 19 parts of 1,3-phenylenediamine-4-sulfonic acid is added. The condensation is carried out at 20°–25° while the pH of the solution is maintained at 6–7 by the dropwise addition of sodium hydroxide solution. After the condensation has ended, the mixture is cooled down to 0° and admixed with a solution of 18.5 parts by cyanuric chloride in 50 parts of acetone. The condensation is carried out at 0°–5° while the pH is maintained at 6–7 by the addition of sodium hydroxide solution. After the condensation has ended, 37 parts of HCl HN[(CH$_2$)$_2$SO$_2$(CH$_2$)$_2$Cl]$_2$ are added and stirred in at 20°–40° and pH 7–8 in the course of 3 hours. Sodium chloride is added to salt out the dye of the formula which is then filtered off and dried. It dyes cellulose fibres in fast golden yellow shades.

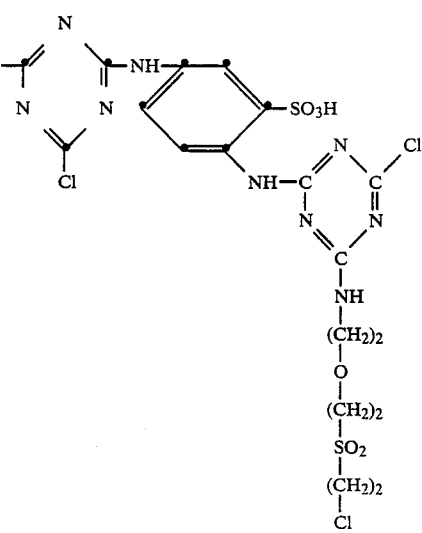

EXAMPLE 5

18.5 parts of cyanuric chloride are dissolved in 110 parts of acetone and poured onto 250 parts of ice with vigorous stirring. This solution is then admixed at 0° with a solution of 55.3 parts of the dye of the following structure:

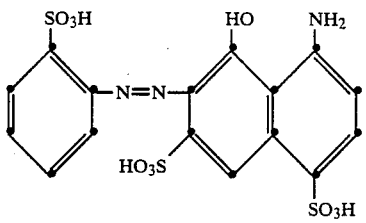

then 50 parts of 2-normal sodium carbonate solution are added dropwise, and a pH of 6–6.5 is obtained. A neutral aqueous solution of 19 parts of 1,4-phenylenediamine-2-sulfonic acid is then added. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the addition of sodium hydroxide solution. After the condensation has ended,

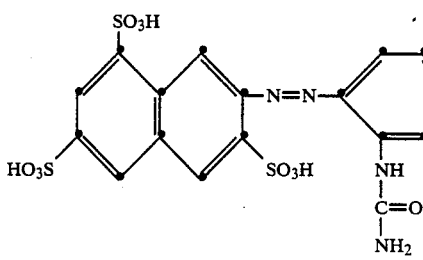
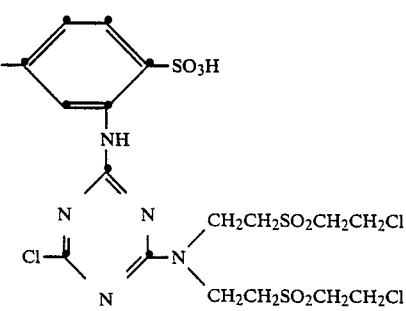

22 parts of HCl H$_2$N(CH$_2$)$_2$SO$_2$(CH$_2$)$_2$Cl are added and stirred in at 20°–40° and pH 7–8 for 3 hours. Sodium chloride is then added to salt out the dye of the formula

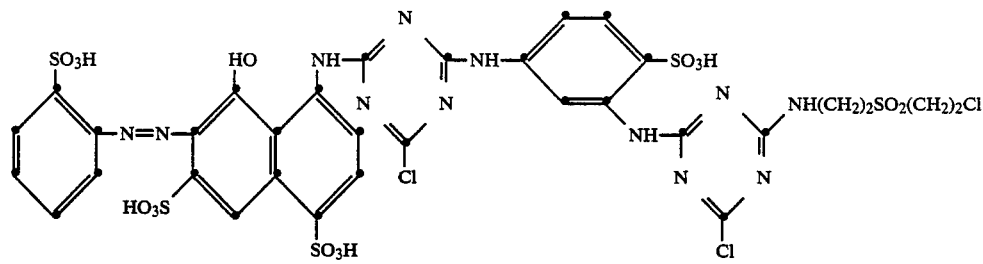

which is then filtered off and dried. It dyes cellulose fibres in fast yellowish red shades.

chloride is then added to salt out the dye of the formula

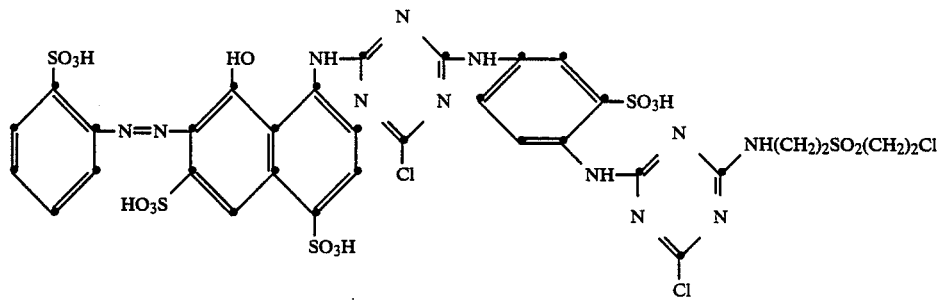

which is then filtered off and dried. It dyes cellulose fibres in fast yellowish red shades.

EXAMPLE 6

18.5 parts of cyanuric chloride are dissolved in 110 parts of acetone and poured onto 250 parts of ice with vigorous stirring. This solution is then admixed at 0° with a solution of 50.3 parts of the dye of the following structure:

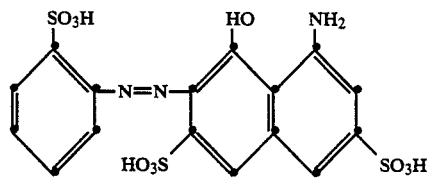

then 50 parts of 2-normal sodium carbonate solution are added dropwise, and a pH of 6–6.5 is obtained. A neutral aqueous solution of 19 parts of 1,3-phenylenediamine-4-sulfonic acid is then added. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the addition of sodium hydroxide solution. After the condensation has ended, 22 parts of HCl H$_2$N(CH$_2$)$_2$SO$_2$(CH$_2$)$_2$Cl are added and stirred in at 20°–40° and pH 7–8 for 3 hours. Sodium

EXAMPLE 7

18.5 parts of cyanuric chloride are dissolved in 110 parts of acetone and poured onto 250 parts of ice with vigorous stirring. This solution is then admixed at 0° with a solution of 55.3 parts of the dye of the following structure:

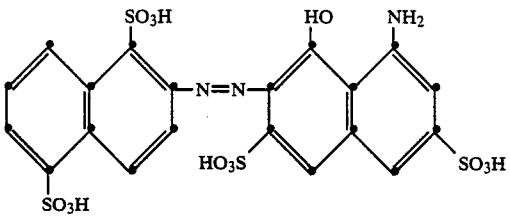

then 50 parts of 2-normal sodium carbonate solution are added dropwise, and a pH of 6–6.5 is obtained. A neutral aqueous solution of 19 parts of 1,3-phenylenediamine-4-sulfonic acid is then added. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the addition of sodium hydroxide solution. After the condensation has ended, 22 parts of HCl H$_2$N(CH$_2$)$_2$SO$_2$(CH$_2$)$_2$Cl are added and stirred in at 20°–40° and pH 7–8 for 3 hours. Sodium chloride is then added to salt out the dye of the formula

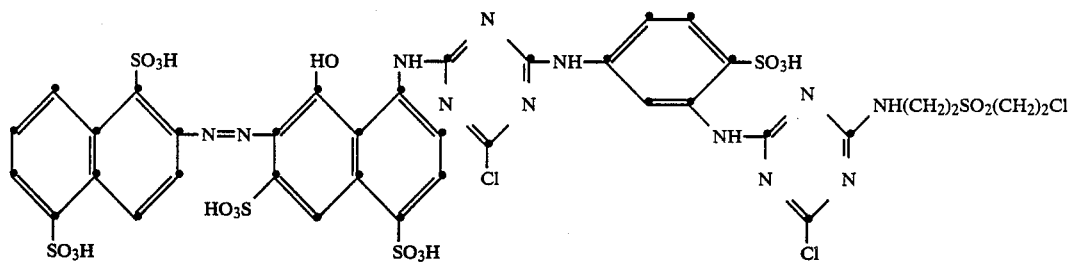

which is then filtered off and dried. It dyes cellulose fibres in fast bluish red shades.

EXAMPLE 8

18.5 parts of cyanuric chloride are dissolved in 110 parts of acetone and poured onto 250 parts of ice with vigorous stirring. This solution is then admixed at 0° with a solution of 55.3 parts of the dye of the following structure:

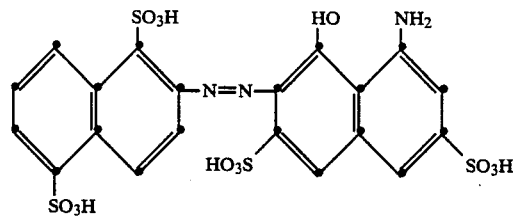

then 50 parts of 2-normal sodium carbonate solution are added dropwise, and a pH 6–6.5 is obtained. A neutral aqueous solution of 19 parts of 1,3-phenylenediamine-4-sulfonic acid is then added. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of actone. The condensation is carried out at 0°–5° while the pH is maintained at 6–7 by the addition of sodium hydroxide solution. After the condensation has ended, 25 parts of HCl H$_2$N(CH$_2$)$_2$O(CH$_2$)SO$_2$(CH$_2$)$_2$Cl are added and stirred in at 20°–40° and pH 7–8 for 3 hours. Sodium chloride is then added to salt out the dye of the formula which is then filtered off and dried. It dyes cellulose fibres in fast bluish red shades.

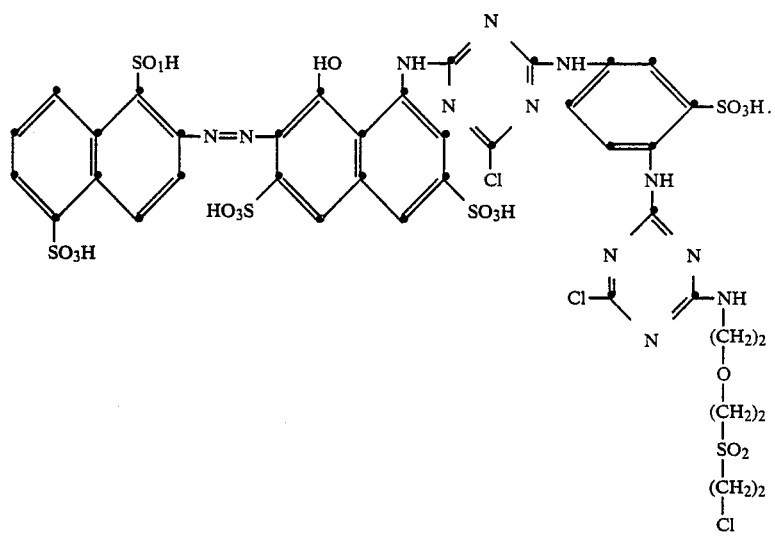

EXAMPLE 9

58.1 parts of the copper complex dye prepared by diazotization of 2-aminophenol-4,6-disulfonic acid and coupling onto 2-amino-5-naphthol-7-sulfonic acid with subsequent coppering in acetic acid solution are dissolved in water under neutral conditions. This dye solution is added at 0°–5° to a suspension of 18.5 parts of cyanuric chloride prepared by dissolving the cyanuric chloride in 110 parts of acetone and to 250 parts of ice dropwise. During the reaction the pH is maintained at 4.5–5.5 by the dropwise addition of 50 parts of 2-normal sodium carbonate solution. This is followed by stirring at 0°–5° for 1–2 hours until the reaction has ended. A neutral aqueous solution of 19 parts of 1,4-phenylenediamine-2-sulfonic acid is then added. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the addition of sodium hydroxide solution. After the condensation has ended, 22 parts of HCl H$_2$N(CH$_2$)$_2$SO$_2$(CH$_2$)$_2$Cl are added and stirred in at 20°–40° and pH 7–8 for 3 hours. Sodium chloride is then added to salt out the dye of the formula

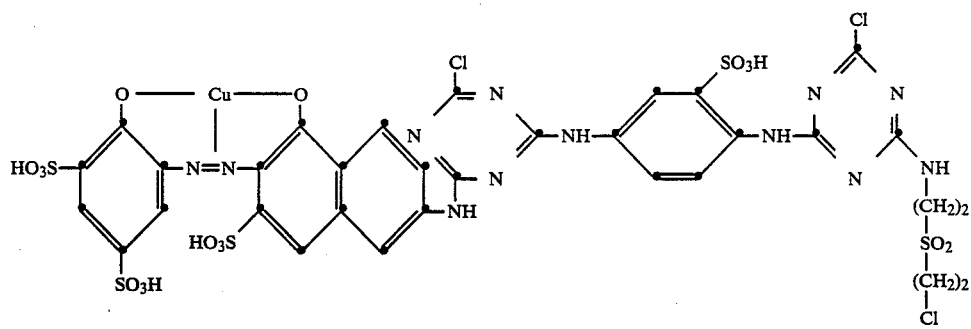

which is then filtered off and dried.

EXAMPLE 10

50.3 parts of the dye 1-amino-4-(3'-amino-4'-methyl-5'-sulfophenylamino)anthraquinone-2-sulfonic acid are dissolved with water and the requisite amount of sodium carbonate under neutral conditions. This solution is added at 0°–5° to a suspension of 18.5 parts of cyanuric chloride prepared by dropwise addition of a solution of the cyanuric chloride in 110 parts of acetone to 250 parts of ice. The hydrogen chloride formed in the course of the reaction is neutralized by the dropwise addition of 50 parts of 2-normal sodium carbonate solution, the result being a pH of 6–6.5. A neutral aqueous solution of 19 parts of 1,3-phenylenediamine-4-sulfonic acid is then added. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the addition of sodium hydroxide solution. After the condensation has ended, 22 parts of HCl H$_2$N(CH$_2$)$_2$SO$_2$(CH$_2$)$_2$Cl are added and stirred in at 20°–40° and pH 7–8 for 3 hours. Sodium chloride is added to salt out the dye of the formula which is then filtered off and dried. It dyes cellulose fibres in fast sky blue shades.

EXAMPLE 11

106.6 parts of the dye 3-(3'-amino-4'-sulfophenylaminosulfonyl)-copper-phthalocyanine-3'',3''',3''''-trisulfonic acid are dissolved with water and the requisite amount of sodium carbonate under neutral conditions. This solution is added at 0° to 5° to a suspension of 18.5 parts of cyanuric chloride prepared by the dropwise addition of a solution of the cyanuric chloride in 110 parts of acetone to 250 parts of ice. In the course of the reaction, the pH is maintained at 6 to 6.5 by the dropwise addition of 50 ml of 2-normal sodium carbonate solution. To the intermediate stage obtained is added a neutral aqueous solution of 19 parts of 1,3-phenylenediamine-4-sulfonic acid. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the addition of sodium hydroxide solution. After the condensation has ended, 26 parts of HCl H$_2$N(CH$_2$)$_2$—O—(CH$_2$)$_2$SO$_2$(CH$_2$)$_2$Cl are added and stirred in at 20°–40° and pH 7–8 for 3 hours. Sodium chloride is added to salt out the dye of formula

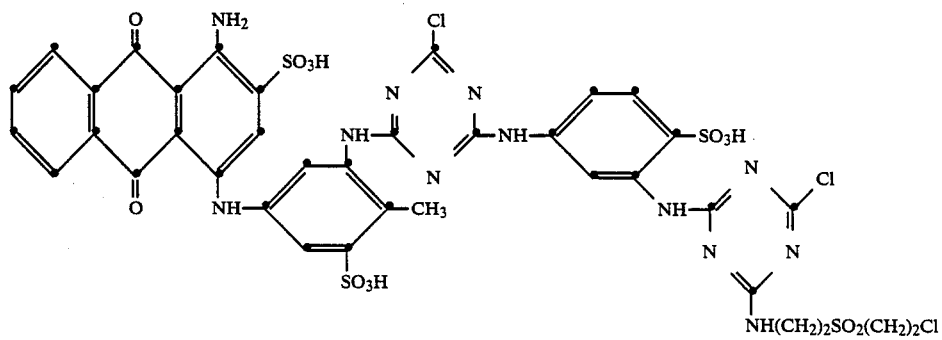

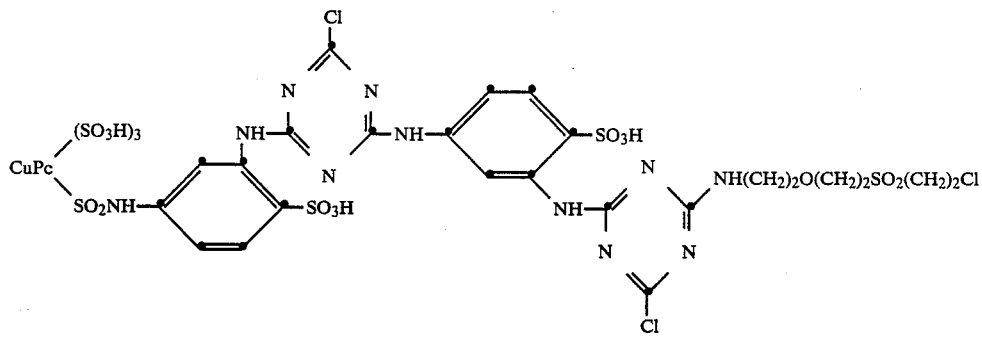

which is then filtered off and dried. It dyes cellulose fibres in fast pure turquoise shades.

EXAMPLE 12

70.2 parts of the disazo dye of 1-amino-2-(4'-sulfophenylazo)-7-(2''-sulfo-5''-aminophenylazo)-8-naphthol-3,6-disulfonic acid in the form of a neutral solution are reacted at 0°–5° with a suspension of 18.5 parts of cyanuric chloride dissolved in 110 parts of acetone and reprecipitated with 250 parts of ice. The reaction takes place at pH 6.0–6.5 while the pH is maintained by the dropwise addition of 50 parts of 2-normal sodium carbonate solution. A neutral aqueous solution of 19 parts of 1,3-phenylenediamine-4-sulfonic acid is then added. The condensation is carried out at 20°–25° while the pH of the solution is maintained at 6–7 by the dropwise addition of sodium hydroxide solution. After the condensation has ended, the mixture is cooled down to 0° and is admixed with a solution of 18.5 parts of cyanuric chloride in 50 parts of acetone. The condensation is carried out at 0°–5° while the pH is maintained at 6–7 by the dropwise addition of sodium hydroxide solution. After the condensation has ended, 22 parts of HCl $H_2N(CH_2)_2$—O—$(CH_2)_2SO_2(CH_2)_2Cl$ are added and stirred in at 20°–40° C. and pH 7–8 for 3 hours. Sodium chloride is added to salt out the dye of the formula which is then filtered off and dried. It dyes cellulose fibres in fast navy shades.

EXAMPLE 13

54.4 parts of the dye 2-(4'-amino-2'-ureidophenylazo)-naphthalene-3,6,8-trisulfonic acid are dissolved in 250 parts of water under neutral conditions. This neutral solution is cooled down to 0° C. and is then admixed in the course of 15 minutes with 14 parts of cyanuric fluoride.

In the course of the acylation reaction 9 g of bicarbonate are added in such a way that the pH stays between 5.5 and 7. Once no starting dye is detectable any longer in a chromatogram, a neutral aqueous solution of 19 parts of 1,3-phenylenediamine-4-sulfonic acid is added. The condensation is carried out at 20°–25° while the pH of the solution is maintained at 6–7 by the dropwise addition of sodium hydroxide solution. After the condensation has ended, the mixture is cooled down and admixed with a solution of 18.5 parts of cyanuric chloride in 50 parts of acetone. The condensation is carried out at 0°–5° while the pH is maintained at 6–7 by the addition of sodium hydroxide solution. After the condensation has ended, 22 parts of $HClH_2N(CH_2)_2SO_2(CH_2)_2Cl$ are added and stirred in at 20°–40° and pH 7–8 in the course of 3 hours. Sodium chloride is added to salt out the dye of the formula

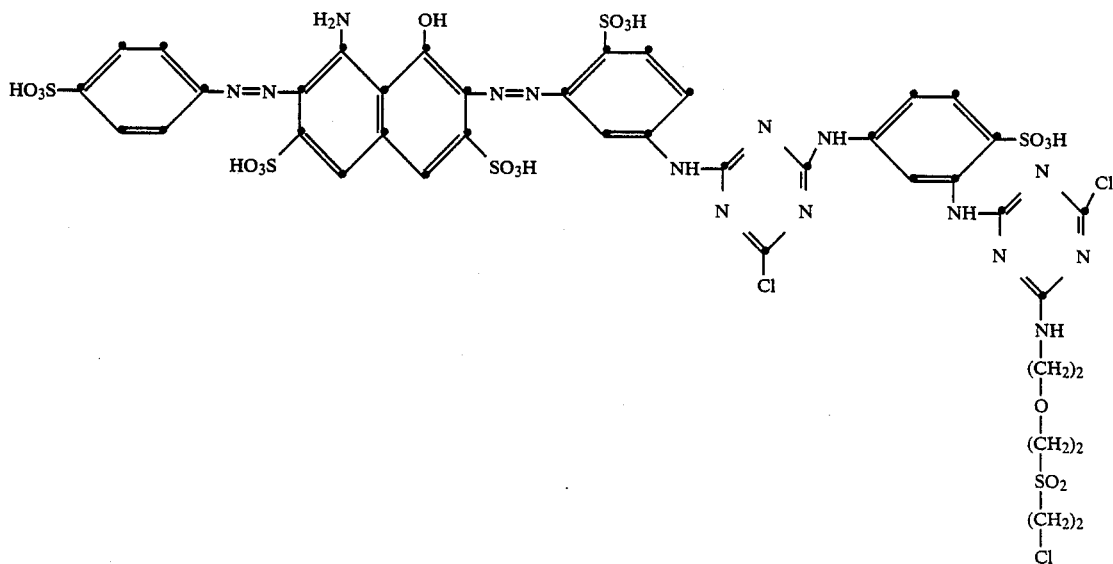

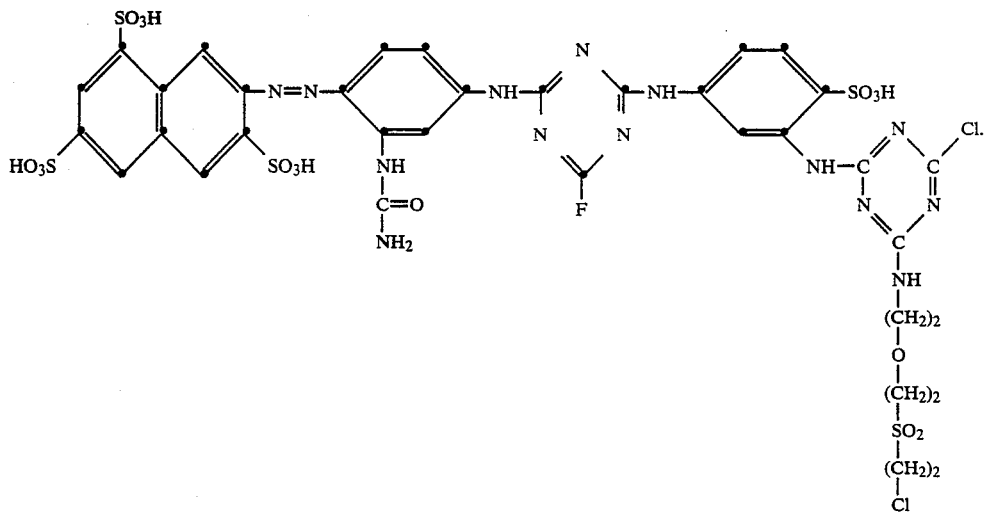
which is then filtered off and dried. It dyes cellulose fibres in fast golden yellow shades.
The procedures described in Examples 1 to 13 can also be used to prepare the dyes of Nos. 14 to 48 listed in the table below. The dyes dye cellulose fibres in the hues stated in the third column.

| Ex. No. | Dye | Hue |
|---|---|---|
| 14 | 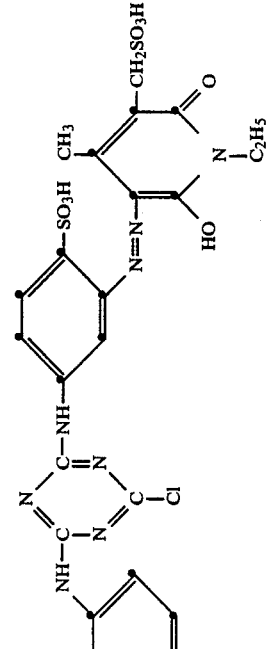 | lemon yellow |
| 15 | 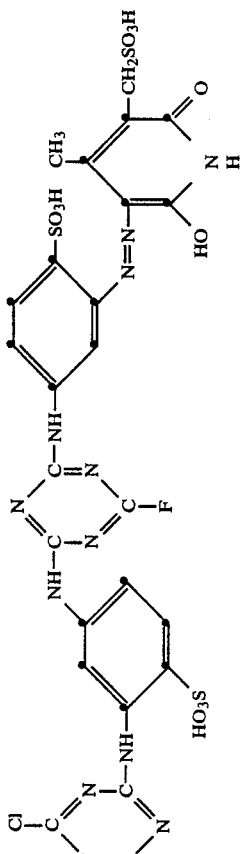 | lemon yellow |
| 16 | 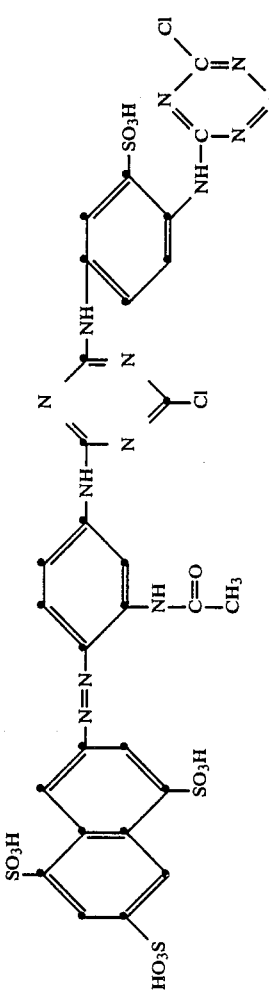 | yellow |

| Ex. No. | Dye | Hue |
|---|---|---|
| 17 | | yellow |
| 18 | | golden yellow |
| 19 | | golden yellow |

| Ex. No. | Dye | Hue |
|---|---|---|
| 20 | 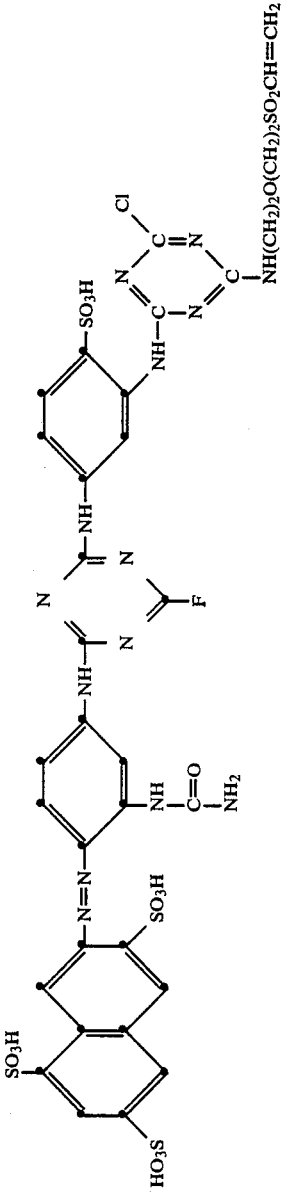 | golden yellow |
| 21 | 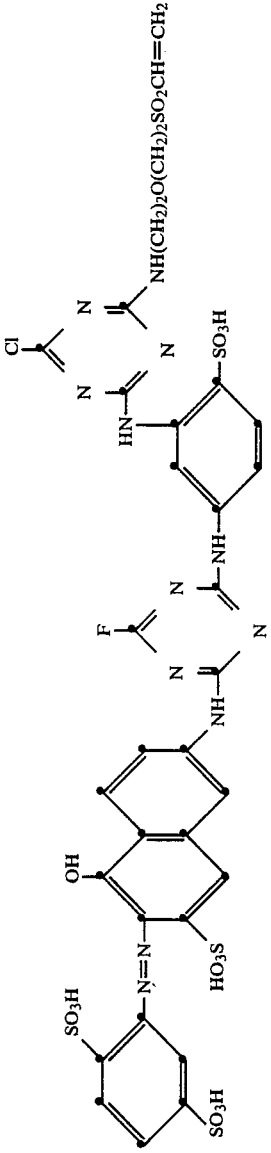 | golden orange |
| 22 | 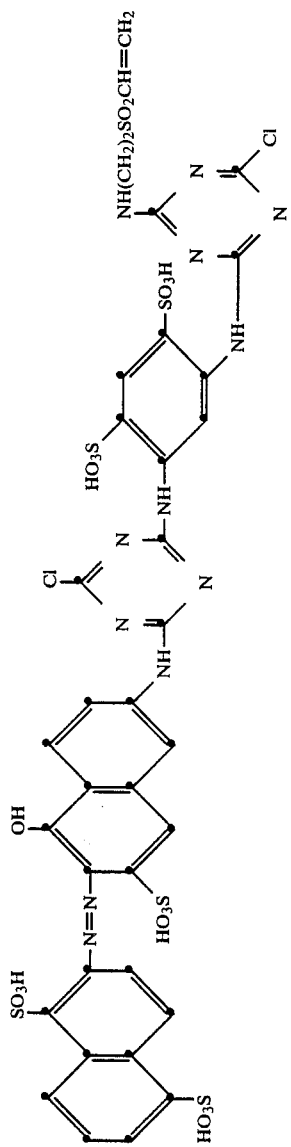 | orange |

-continued

| Ex. No. | Dye | Hue |
|---|---|---|
| 23 | | orange |
| 24 | | scarlet |
| 25 | | scarlet |

-continued

| Ex. No. | Dye | Hue |
|---|---|---|
| 26 | (structure with naphthalene-OH-NH-triazine(F)-NH-phenyl(SO₃H)-triazine(Cl)-NH(CH₂)₂, NH—(CH₂)₂—SO₂CH=CH₂; with phenyl-SO₃H-N=N-naphthalene(OH)(SO₃H)(HO₃S)) | scarlet |
| 27 | (analogous structure with piperazine N—(CH₂)₃SO₂CH=CH₂ and Cl triazines) | scarlet |
| 28 | (analogous structure with piperazine N—(CH₂)₂SO₂CH=CH₂, Cl triazines, and disulfonaphthyl azo group) | red |

-continued

| Ex. No. | Dye | Hue |
|---|---|---|
| 29 | | red |
| 30 | | bluish red |
| 31 | | bluish red |

| Ex. No. | Dye | Hue |
|---|---|---|
| 32 | 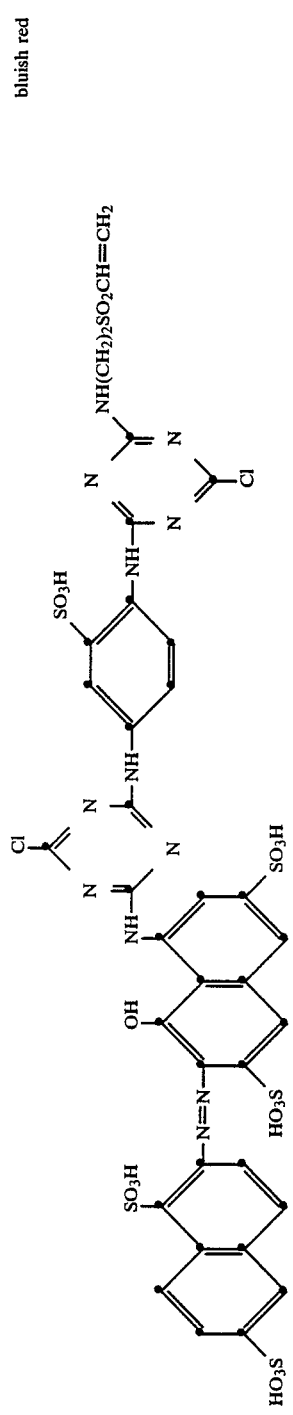 | bluish red |
| 33 | 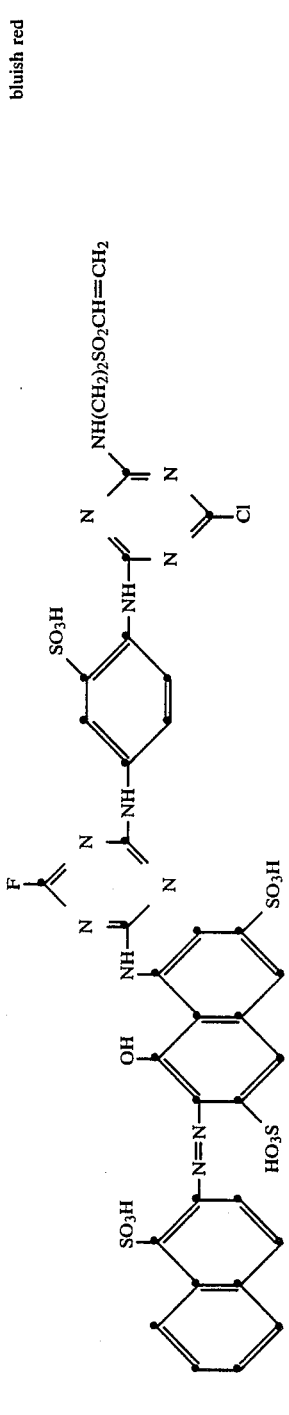 | bluish red |
| 34 | 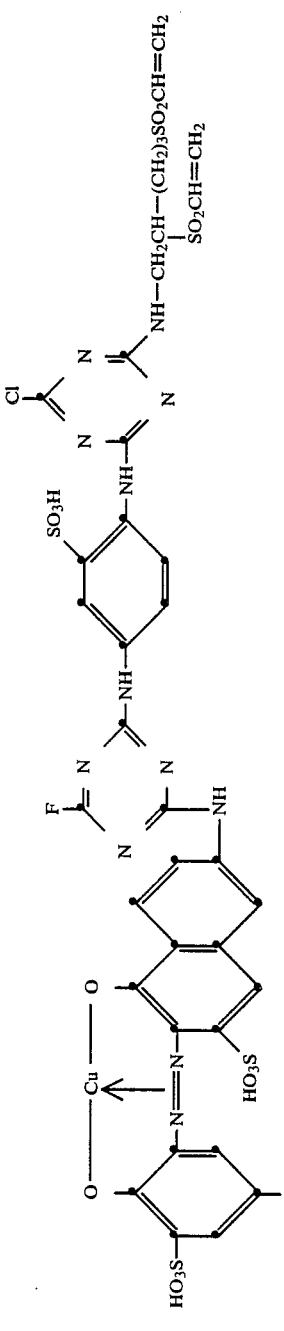 | blue |

-continued
| Ex. No. | Dye | Hue |
|---|---|---|
| 35 | 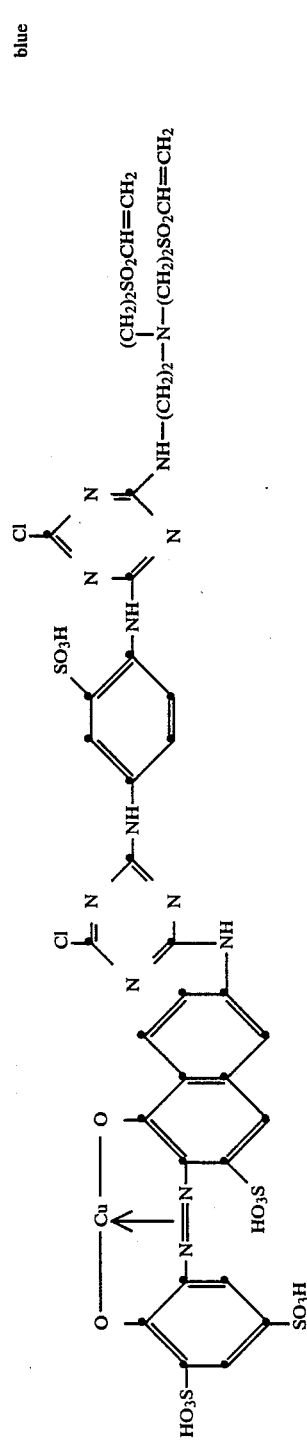 | blue |
| 36 | 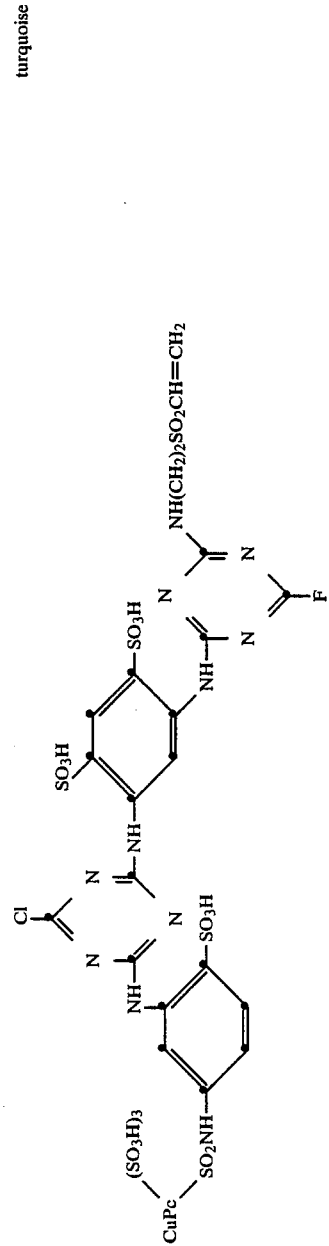 | turquoise |
| 37 | 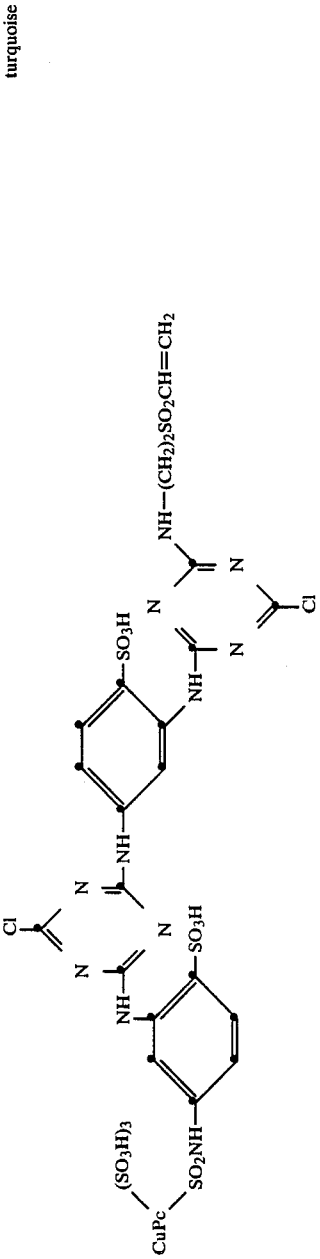 | turquoise |

-continued

| Ex. No. | Dye | Hue |
|---|---|---|
| 38 | | blue |
| 39 | | blue |

-continued

| Ex. No. | Dye | Hue |
|---|---|---|
| 40 | (structure) | navy |
| 41 | (structure) | navy |

| Ex. No. | Dye | Hue |
|---|---|---|
| 42 | 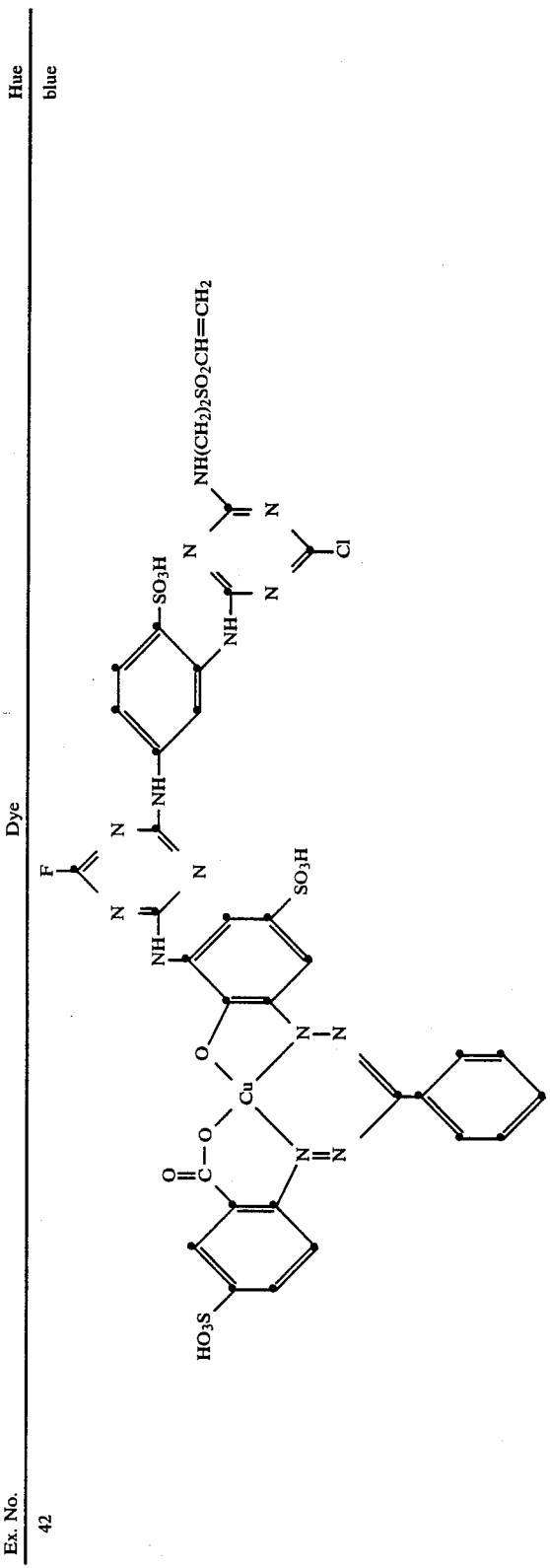 | blue |
| 43 | 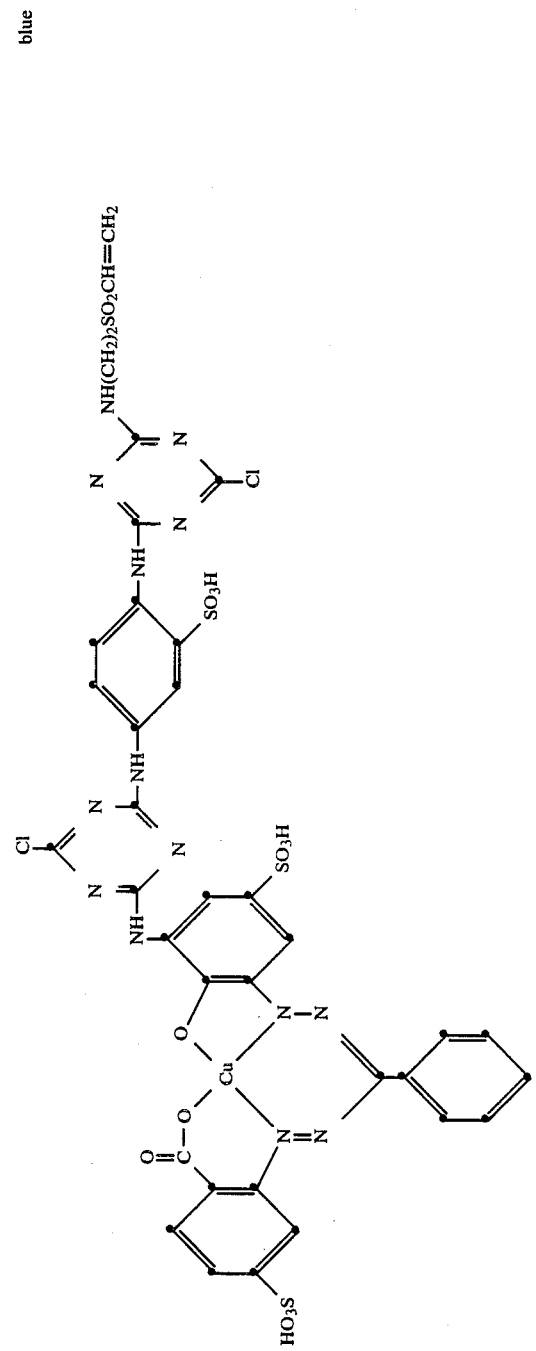 | blue |

-continued
| Ex. No. | Dye | Hue |
|---|---|---|
| 44 | 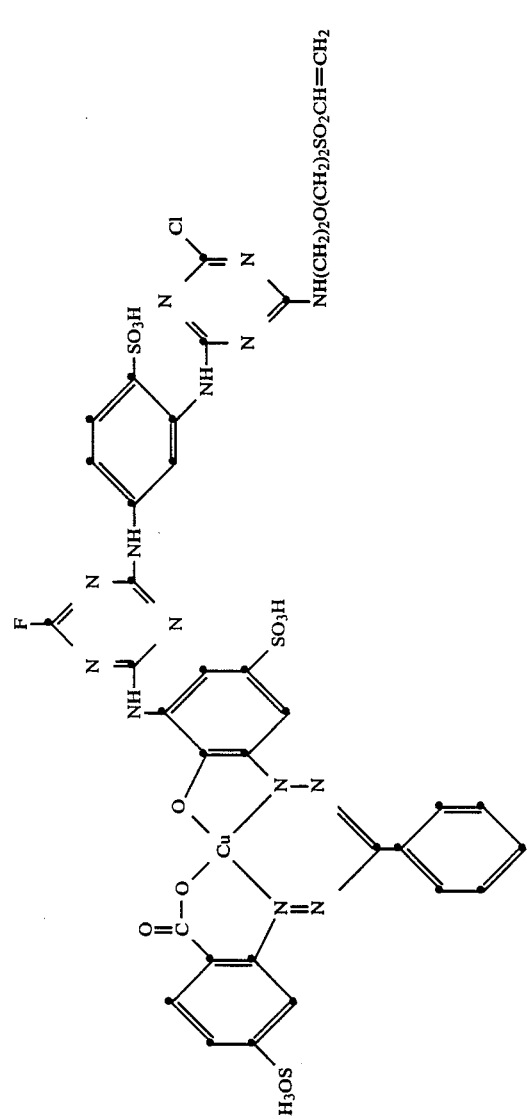 | blue |

-continued
| Ex. No. | Dye | Hue |
|---|---|---|
| 45 | 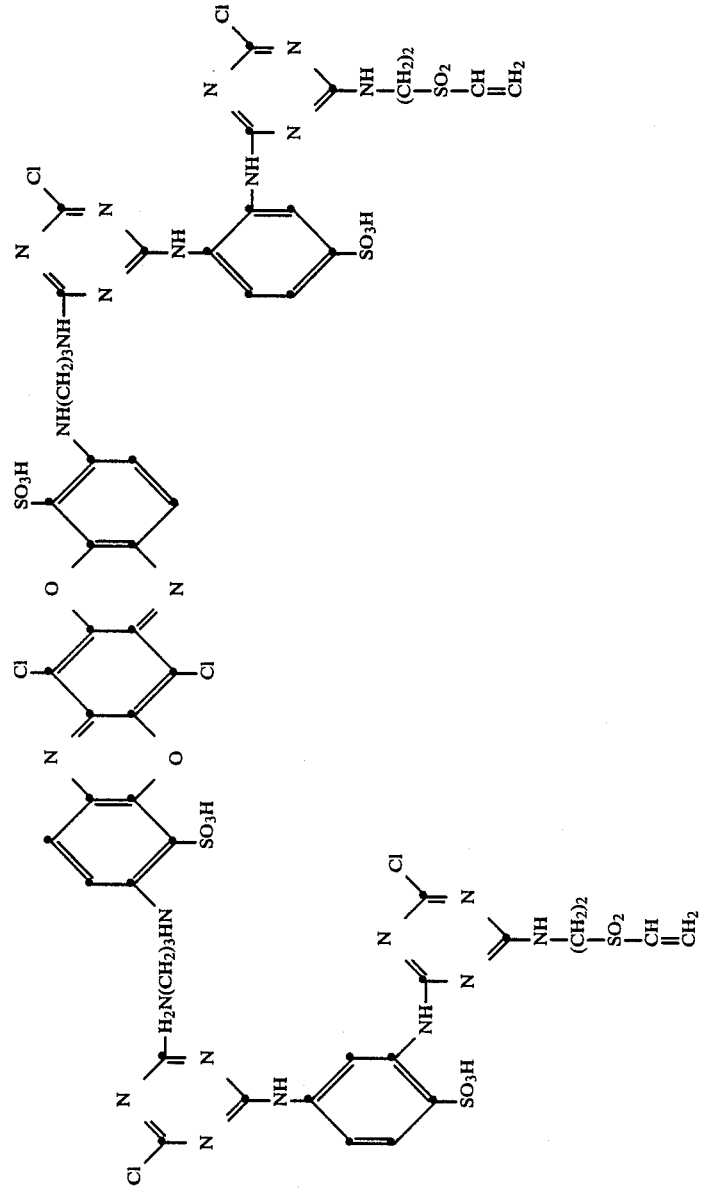 | blue |

-continued

| Ex. No. | Dye | Hue |
|---|---|---|
| 46 | | blue |
| 47 | | blue |
| 48 | | blue |

Dyeing method I 2 parts of the reactive dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

Dyeing method II 2 parts of the reactive dye obtained in Example 1 are dissolved in 400 parts of water; to this solution are added 1,500 parts of a solution which contains per liter 53 gof sodium chloride. 100 parts of a cotton fabric are introduced at 35° C. into this dyebath. After 20 minutes, 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

Dyeing method III 8 parts of the reactive dye obtained in Example 1 are dissolved in 400 parts of water; to this solution are added 1,400 parts of a solution which contains per liter 100 g of sodium sulfate. 100 parts of a cotton fabric are introduced at 25° C. into this dyebath. After 10 minutes, 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

Dyeing method IV 4 parts of the reactive dye obtained in Example 1 are dissolved in 50 parts of water; to this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quater of an hour, is rinsed once more and is dried.

Dyeing method V 6 parts of the reactive dye obtained in Example 1 are dissolved in 50 parts of water; to this solution are added 50 parts of a solution which contains per liter 16 g of sodium hydroxide and 0.04 liter of 38° Bé sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

Dyeing method VI 2 parts of the reative dye obtained in Example 1 are dissolved in 100 parts of water in the presence of 0.5 parts of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and dried.

Dyeing method VII 2 parts of the dye of Example 5, 160 parts of sodium sulfate and, as a buffer, 4 parts of $Na_2HPO_4.12H_2O$ and 1 part of $KH_2PO_4$ are added to 2,000 parts of water, so that a dyebath of pH 7 is obtained. This bath is entered with 100 parts of a knitwear material made of non-mercerized cotton. The temperature of the bath is raised to 130° C. in the course of 30 minutes, and dyeing is carried out at that temperature for 60 minutes. The dyed material is then removed from the bath, washed with water, soaped, washed again with water and dried. A deep red deying has been obtained.

Dyeing method VIII 2 parts of the dye of Example 5, 2 parts of the known water-insoluble anthraquinone dye of the formula

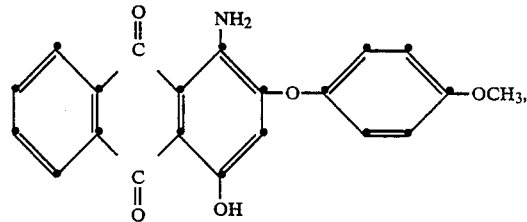

120 parts of sodium sulfate and, as buffer, 4 parts of $Na_2HPO_4.12H_2O$ and 1 part of $KH_2PO_4$ are added to 2,000 parts of water. The dyebath thus obtained is then entered with 100 parts of a 50:50 polyester/cotton blend fabric, and in the course of 30 minutes the temperature of the bath is raised to 130° C., and dyeing is carried out at that temperature for 60 minutes. The dyed fabric is then removed from the bath, washed with water, soaped, washed again with water and dried. A level red dyeing has been obtained on the fabric. The dyebath is maintained at pH 7 before and during the dyeing process.

Printing method I 3 parts of the reactive dye obtained in Example 1 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric which is then dried, and the resulting printed fabric is steamed at 102° C. in saturated steam for 2 minutes. The printed fabric is then rinsed, if desired soaped off at the boil and rinsed once more, and is then dried.

Printing method II 5 parts of the reactive dye obtained in Example 1 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste

What is claimed is:

1. A reactive dye of the formula

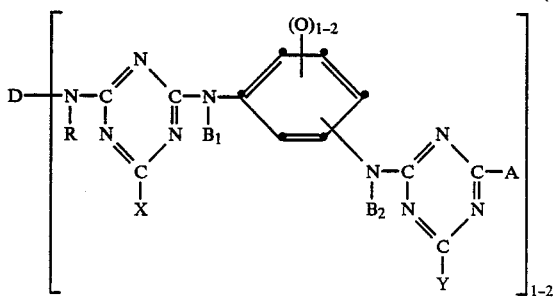

in which D is the radical of a monoazo, polyazo, metal complex azo, anthraquinone, phthalocyanine, formazan, azomethine, dioxazine, phenazine, stilbene, triphenylmethane, xanthane, thioxanthone, nitroaryl, naphthoquinone, pyrenequinone or perylenetetracarbimide dye, R, $B_1$ and $B_2$ are independently of each other hydrogen or alkyl which has 1 to 4 carbon atoms and which is unsubstituted or substituted by halogen, hydroxyl, cyano, $C_1$-$C_4$-alkoxy, $C_1$-$C_4$-alkoxycarbonyl, carboxyl, sulfamoyl, sulfo or sulfato, X and Y independently of each other are fluorine, chlorine or bromine, sulfo $C_1$-$C_4$-alkylsulfonyl or phenylsulfonyl, A is an amino substituent which contains at least one group of the formula

Z is β-sulfatoethyl, β-thiosulfatoethyl, β-phosphatoethyl, β-acetoxyethyl, β-haloethyl or vinyl, and Q is 1 or 2 substituents from the group consisting of hydrogen, $C_1$-$C_4$-alkyl, $C_1$-$C_4$-alkoxy, halogen, carboxyl or sulfo; except dyes of formula (1), wherein D is phthalocyanine and Y is fluorine.

2. A reactive dye according to claim 1 in which A is a radical of the formula

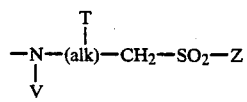

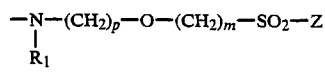

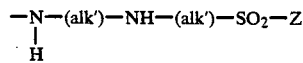

or

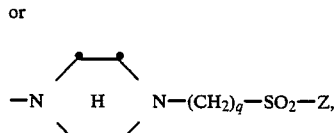

alk is alkylene having 1 to 6 carbon atoms or branched isomers thereof, T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl or —$SO_2$—Z, V is hydrogen or alkyl having 1 to 4 carbon atoms which is unsubstituted or substituted by carboxyl, sulfo, carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfonyl, N,N-dimethylsulfamoyl, N,N-diethylsulfamoyl, methylsulfonyl, ethylsulfonyl, propylsulfonyl, alkoxy groups having 1 or 2 carbon atoms, halogen or hydroxyl, or a radical

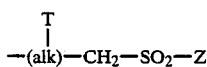

in which alk and T are as defined above, $R_1$ is hydrogen or $C_1$-$C_6$-alkyl, each alk' is independently either polymethylene having 2 to 6 carbon atoms or a branched isomer thereof, and m is from 1 to 6, p is from 1 to 6 and q is from 1 to 6.

3. A reactive dye according to claim 1 in which A is a radical of the formula

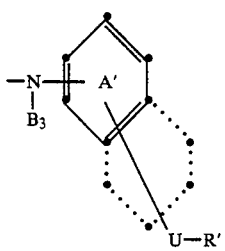

in which $B_3$ is hydrogen or alkyl having 1 to 4 carbon atoms which is unsubstituted or substituted by halogen, hydroxyl, cyano, $C_1$-$C_4$-alkoxy, $C_1$-$C_4$-alkoxycarbonyl, carboxyl, sulfamoyl, sulfo or sulfato, U is —CO— or —$SO_2$—, R' is a radical of the formula

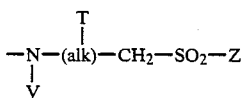

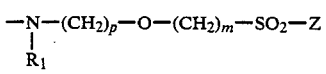

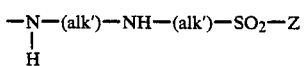

or

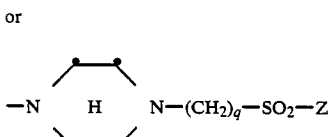

alk is alkyene having 1 to 6 carbon atoms or branched isomers thereof, T is hydrogen, chlorine, bromine, fluorine, hydroxyl, sulfato, alkanoyloxy having 2 to 4 carbon atoms, cyano, carboxyl, alkoxycarbonyl having 1 to 5 carbons atoms, carbamoyl or —$SO_2$—Z, V is hydrogen or alkyl having 1 to 4 carbon atoms which is unsubstituted or substituted by carboxyl, sulfo, carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, n-methylsulfamoyl, N-ethylsulfamoyl, N,N-dimethylsulfamoyl, N,N-diethylsulfamoyl, methylsulfonyl, ethylsulfonyl, propylsulfonyl, alkoxy groups having 1 to 2 carbon atoms, halogen or hydroxyl, or a radical

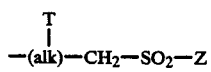
(3e)

in which, alk and T are as defined above, $R_1$ is hydrogen or $C_1$–$C_4$-alkyl, each alk' is idenpendently either polymethylene having 2 to 6 carbon atoms or a branched isomer thereof, and m is from 1 to 6, p is from 1 to 6 and q is from 1 to 6, and, if U is —$SO_2$—, V must not be hydrogen, and the benzene or naphthalene radical A' is unsubstituted or substituted by alkyl having 1 to 4 carbon atoms, alkoxy having 1 to 4 carbon atoms, acetylamino, propionylamino, benzoylamino, amino, alkylamino having 1 to 4 carbon atoms, phenylamino, N,N-di-$\beta$-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, alkyl-sulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-($\beta$-hydroxyethyl)sulfamoyl, N,N-di($\beta$-hydroxyethyl)-sulfamoyl, N-phenylsulfamoyl, ureido, hydroxyl, carboxyl, sulfomethyl or sulfo.

4. A reactive dye according to claim 1 in which A is a radical of the formula

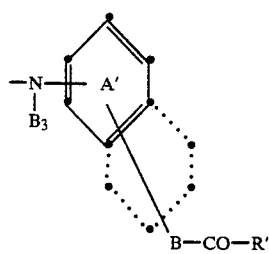
(5)

in which $B_3$ is hydrogen or alkyl having 1 to 4 carbon atoms which is unsubstituted or substituted by halogen, hydroxyl, cyano, $C_1$–$C_4$-alkoxy, $C_1$–$C_4$-alkoxycarbonyl, carboxyl, sulfamoyl, sulfo or sulfato, B is —$(CH_2)_{\overline{n}}$, —O—$(CH_2)_{\overline{n}}$ or —NH—$(CH_2)_{\overline{n}}$, n is 1 to 6, R' is a radical of the formula

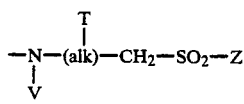
(3a)

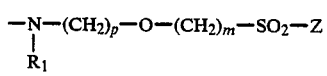
(3b)

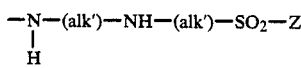
(3c)

or

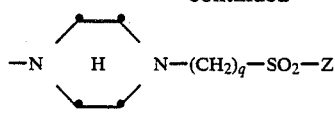
(3d)

alk is alkylene having 1 to 6 carbon atoms or branched isomers thereof, T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl or —$SO_2$—Z, V is hydrogen or alkyl having 1 to 4 carbon atoms which is unsubstituted or substituted by carboxyl, sulfo, carbamoyl, N-methylcarbamoyl, N-ethylacarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylfulfamoyl, N-ethylsulfamoyl, N,N-dimethylsulfamoyl, N,N-diethylsulfamoyl, methylsulfonyl, ethylsulfonyl, propylsulfonyl, alkoxy groups having 1 or 2 carbon atoms, halogen or hydroxyl, or a radical

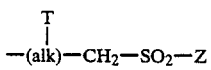
(3e)

and in which alk und T are as defined above, $R_1$ is hydrogen or $C_1$–$C_6$-alkyl, each alk' is independently either polymethylene having 2 to 6 carbon atoms or a branched isomer thereof, and m is from 1 to 6, p is from 1 to 6 and q is from 1 to 6, and the benzene or naphthalene radical A' is unsubstituted or substituted by alkyl groups having 1 to 4 carbon atoms, alkoxy groups having 1 to 4 carbon atoms, acetylamino, propionylamino, benzoylamino, amino, alkylamino having 1 to 4 carbon atoms, phenylamino, N,N-di-$\beta$-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-($\beta$-hydroxyethyl)-sulfamoyl, N,N-di-($\beta$-hydroxyethyl)-sulfamoyl, N-phenylsulfamoyl, ureido, hydroxyl, carboxyl, sulfomethyl or sulfo.

5. A reactive dye according to claim 1 in which A is a radical of the formula

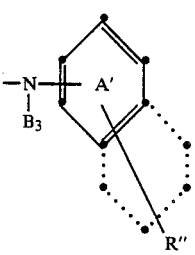
(6)

in which $B_3$ is hydrogen or alkyl having 1 to 4 carbon atoms which is unsubstituted or substituted by halogen, hydroxyl, cyano, $C_1$–$C_4$-alkoxy, $C_1$–$C_4$-alkoxycarbonyl, carboxyl, sulfamoyl, sulfo or sulfato, R" is a radical of the formula

—$SO_2$—Z (2)

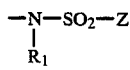 (2a)

or

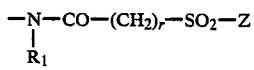 (2b)

$R_1$ is hydrogen or $C_1$–$C_6$-alkyl and r is 3 to 5, and the benzene or naphthalene radical A' is unsubstituted or substituted by alkyl groups having 1 to 4 carbon atoms, alkoxy groups having 1 to 4 carbon atoms, acetylamino, propionylamino, benzoylamino, amino, alkylamino having 1 to 4 carbon atoms, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo.

6. A reactive dye according to claim 2 in which A is a radical of the formula

—NHCH₂CH₂SO₂CH₂CH₂Cl (7a)

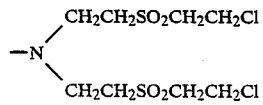 (7b)

—NHCH₂CH₂OCH₂CH₂SO₂CH₂CH₂Cl (7c)
—NHCH₂CH₂SO₂CH=CH₂ (7d)

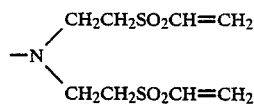 (7e)

—NHCH₂CH₂OCH₂CH₂SO₂CH=CH₂ (7f)
—NHCH₂CH₂NHCH₂CH₂SO₂CH=CH₂ (7g)

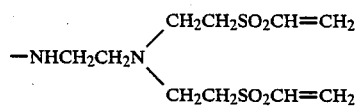 (7h)

or

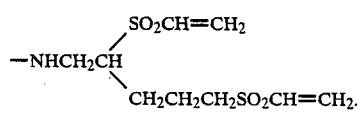 (7i)

7. A reactive dye according to claim 3 in which A is a radical of the formula

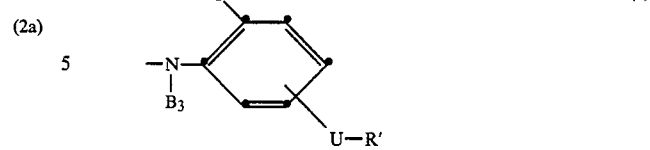 (8)

and $R_2$ is hydrogen, $C_1$–$C_4$-alkyl, $C_1$–$C_4$-alkoxy, halogen, hydroxyl, carboxyl or sulfo.

8. A reactive dye according to claim 1 in which $B_1$ and $B_2$ are hydrogen and Q is sulfo.

9. A reactive dye according to claim 1 in which X and Y are chlorine atoms.

10. A reactive dye according to claim 1 in which R is hydrogen, methyl or ethyl.

11. A reactive dye according to claim 1 in which D is the radical of a monoazo or disazo dye.

12. A reactive dye according to claim 1 in which D is the radical of a metal complex azo or formazan dye.

13. A reactive dye according to claim 1 in which D is the radical of an anthraquinone dye.

14. A reactive dye according to claim 1 in which D is the radical of a phthalocyanine dye.

15. A reactive dye according to claim 1 in which D is the radical of a dioxazine dye.

16. A reactive dye according to claim 11 in which D is a monoazo or disazo dye radical of the formula D₁—N=N—(M—N=N)ₛ—K— (9a), —D₁—N=N—(M—N=N)ₛ—K (9b), or —D₁—N=N—(M—N=N)ₛ—K— (9c), or of a metal complex derived therefrom, D is a benzene or naphthalene diazo component, M is a benzene or naphthalene middle component, and K is a benzene, naphthalene, pyrazolone, 6-hydroxy-2-pyridone or acetoacetarylamide coupling component, where $D_1$, M and K are unsubstituted or substituted by alkyl groups having 1 to 4 carbon atoms, alkoxy groups having 1 to 4 carbon atoms, acetylamino, propionylamino, benzoylamino, amino, alkylamino having 1 to 4 carbon atoms, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyan, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo, s is 0 or 1, and $D_1$, M and K together contain at least two sulfo groups.

17. A reactive dye according to claim 16 in which $D_1$, M and K together contain three or four sulfo groups.

18. A reactive dye according to claim 11 in which D is a disazo dye radical of the formula D₁—N=N—K—N=N—D₂— (10a), or —D₁—N=N—K—N=N—D₂— (10b), $D_1$ and $D_2$ are idenpendently of each other a benzene or naphthalene diazo component, and K is a naphthalene coupling component, where $D_1$, $D_2$ and K are unsubstituted or substituted by alkyl groups having 1 to 4 carbon atoms, alkoxy groups having 1 to 4 carbon atoms, acetylamino, propionylamino, benzoylamino, amino, alkylamino having 1 to 4 carbon atoms, phenylamino, N,N-di-β-hydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyan, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di-(β-hydroxyethyl)-sulfamoyl, N-phenylsulfamoyl, ureido, hydroxyl, carboxyl, sulfomethyl or sulfo, and $D_1$, $D_2$ and K together contain at least two sulfo groups.

19. A reactive dye according to claim 18 in which $D_1$, $D_2$ and K together contain three or four sulfo groups.

20. A reactive dye according to claim 12 in which D is a 1:1 copper complex azo dye containing benzene or naphthalene and the copper atom is bonded on each side to a metallizable group in ortho-position relative to the azo bridge.

21. A reactive dye according to claim 12 in which D is a formazan dye of the formula

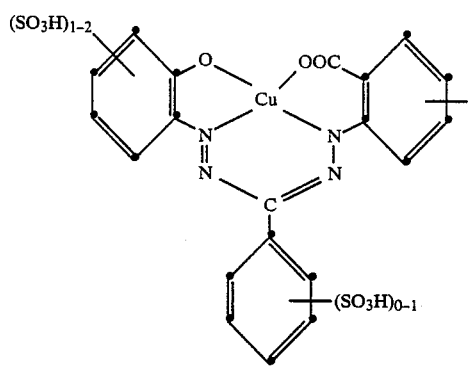

(11a)

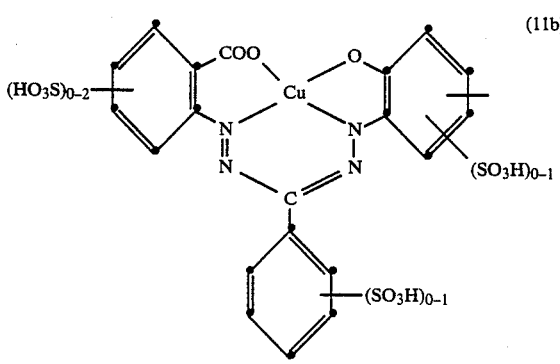

(11b)

in which the benzene rings are unsubstituted or further substituted by alkyl having 1 to 4 carbon atoms, alkoxy having 1 to 4 carbon atoms, alkylsulfonyl having 1 to 4 carbon atoms, halogen or carboxyl.

22. A reactive dye according to claim 13 in which D is an anthraquinone dye of the formula

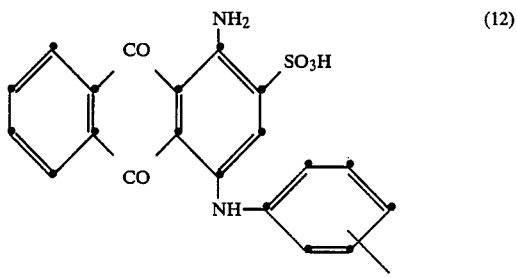

(12)

where the anthraquinone nucleus is unsubstituted or substituted by a further sulfo group and the phenylene radical by alkyl having 1 to 4 carbon atoms, alkoxy having 1 to 4 carbon atoms, halogen, carboxyl or sulfo, and the dye contains at least 2 strongly water-solubilizing groups.

23. A reactive dye according to claim 14 in which D is a phthalocyanine dye of the formula

(13)

in which Pc is a cooper- or nickel-phthalocyanine, W is —OH and/or —NR$_3$R$_4$, R$_3$ and R$_4$ are independently of each other hydrogen or alkyl which has 1 to 4 carbon atoms which is unsubstituted or substituted by hydroxyl or sulfo, R$_5$ is hydrogen or alkyl having 1 to 4 carbon atoms, E is phenylene which is unsubstituted or substituted by alkyl having 1 to 4 carbon atoms, halogen, carboxyl or sulfo, or is alkylene having 2 to 6 carbon atoms, and k is 1 to 3.

24. A reactive dye according to claim 23 in which E is sulfophenylene or ethylene.

25. A reactive dye according to claim 15 in which D is a dioxazine dye of the formula

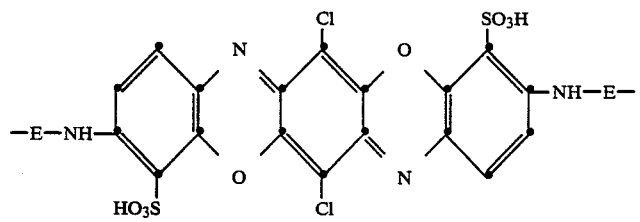
(14a)

or

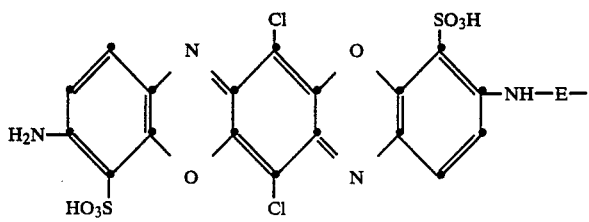
(14b)

in which E is phenylene which is unsubstituted or substituted by alkyl having 1 to 4 carbon atoms, halogen, carboxyl or sulfo, or is alkylene having 2 to 6 carbon atoms, and the outer benzene rings in the formulae (14a) and (14b) are unsubstituted or further substituted by alkyl having 1 to 4 carbon atoms, alkoxy having 1 to 4 carbon atoms, acetylamino, nitro, halogen, carboxyl or sulfo.

26. A reactive dye according to claim 21 of the formula

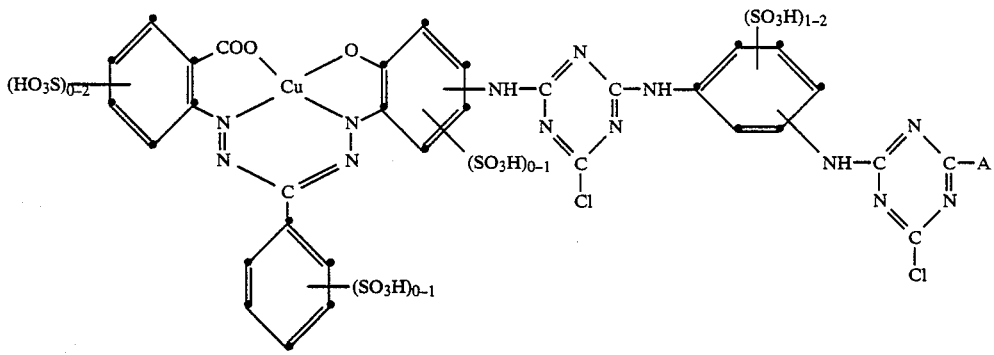
(IIb')

in which A is a radical of the formula

—NHCH₂CH₂SO₂CH₂CH₂Cl (7a)

(7b)

—NHCH₂CH₂OCH₂CH₂SO₂CH₂CH₂Cl (7c)
—NHCH₂CH₂SO₂CH=CH₂ (7d)

-continued

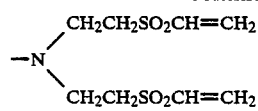
(7e)

—NHCH₂CH₂OCH₂CH₂SO₂CH=CH₂ (7f)
—NHCH₂CH₂NHCH₂CH₂SO₂CH=CH₂ (7g)

(7h)

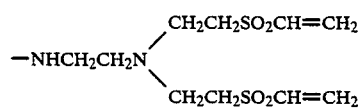

or

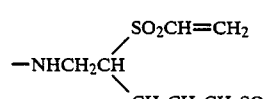
(7i)

27. A reactive dye according to claim 22 of the formula

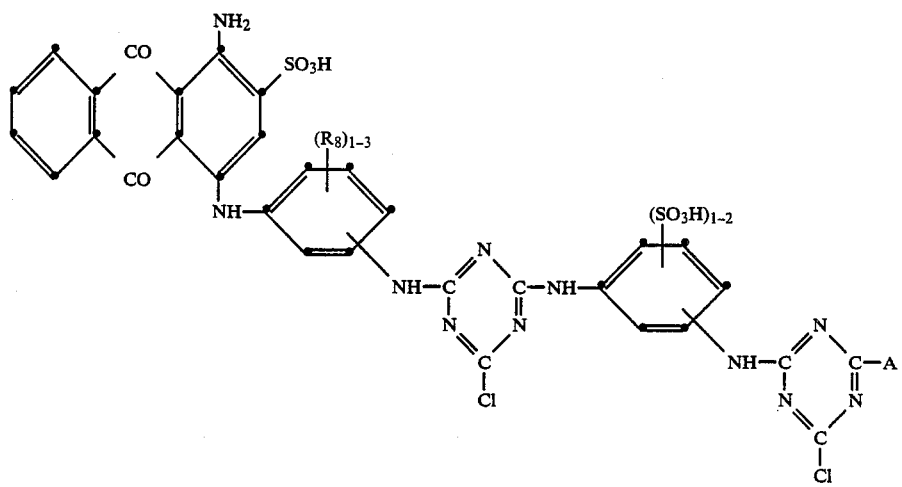
(12a)

in which $R_8$ is 1 to 3 substituents from the group consisting of hydrogen, $C_1$-$C_4$-alkyl, $C_1$-$C_4$-alkoxy, halogen, carboxyl and sulfo, and A is a radical of the formula —NHCH$_2$CH$_2$SO$_2$CH$_2$CH$_2$Cl   (7a)

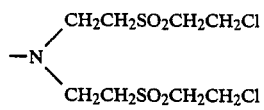   (7b)

—NHCH$_2$CH$_2$OCH$_2$CH$_2$SO$_2$CH$_2$CH$_2$Cl   (7c)
—NHCH$_2$CH$_2$SO$_2$CH=CH$_2$   (7d)

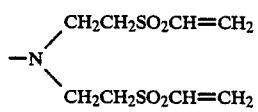   (7e)

—NHCH$_2$CH$_2$OCH$_2$CH$_2$SO$_2$CH=CH$_2$   (7f)
—NHCH$_2$CH$_2$NHCH$_2$CH$_2$SO$_2$CH=CH$_2$   (7g)

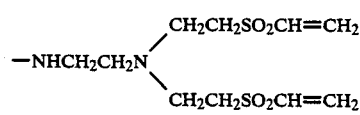   (7h)

or

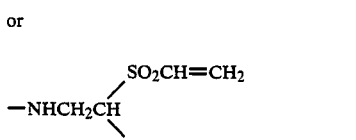   (7i)

28. A reactive dye according to claim 23 of the formula

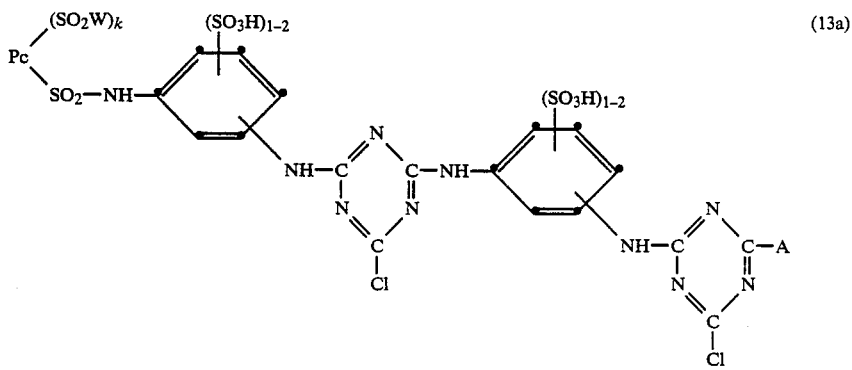
(13a)

in which Pc is a copper- or nickel-phthalocyanine, W is —OH and/or —NR$_3$R$_4$, R$_3$ and R$_4$ are independently of each other hydrogen or alkyl having 1 to 4 carbon atoms which are unsubstiuted or substituted by hydroxyl or sulfo, k is 1 to 3, and A is a radical of the formula —NHCH$_2$CH$_2$SO$_2$CH$_2$CH$_2$Cl   (7a)

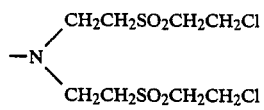   (7b)

—NHCH$_2$CH$_2$OCH$_2$CH$_2$SO$_2$CH$_2$CH$_2$Cl   (7c)
—NHCH$_2$CH$_2$SO$_2$CH=CH$_2$   (7d)

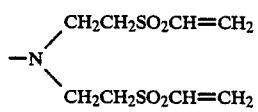   (7e)

—NHCH$_2$CH$_2$OCH$_2$CH$_2$SO$_2$CH=CH$_2$   (7f)
—NHCH$_2$CH$_2$NHCH$_2$CH$_2$SO$_2$CH=CH$_2$   (7g)

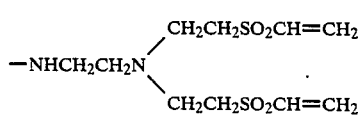   (7h)

or

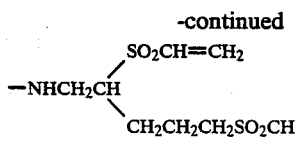
29. A reactive dye according to claim 25 of the formula
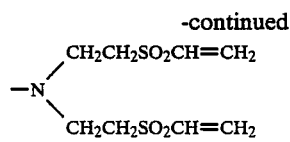
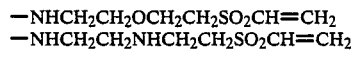
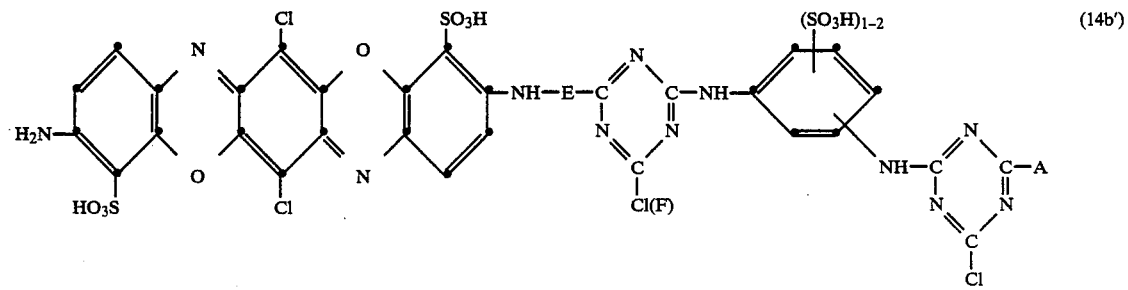
in which E is a direct bond or a —(CH$_2$)$_2$NH— or —(CH$_2$)$_3$NH— radical and A is a radical of the formula
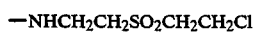 (7a)
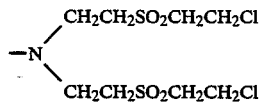 (7b)
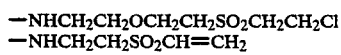 (7c), (7d)
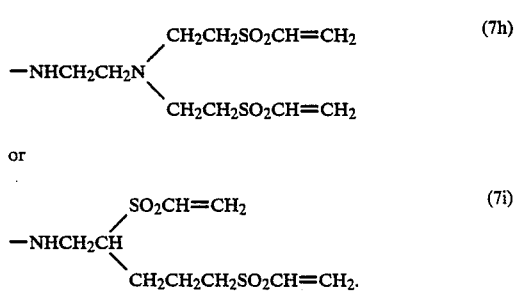 (7h), (7i)
30. A reactive dye according to claim 16 of the formula
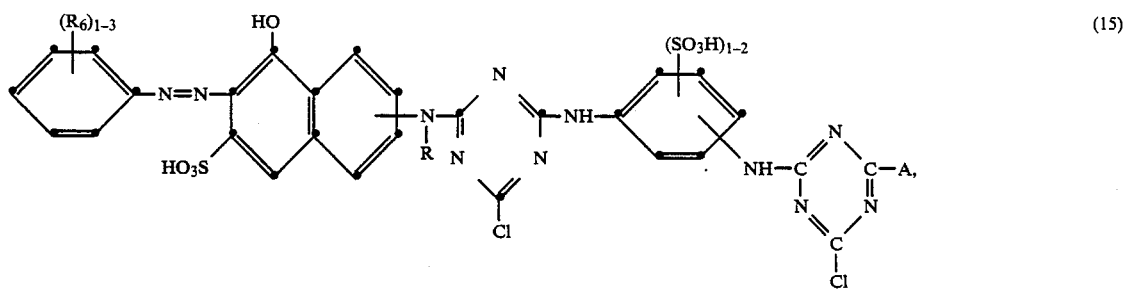
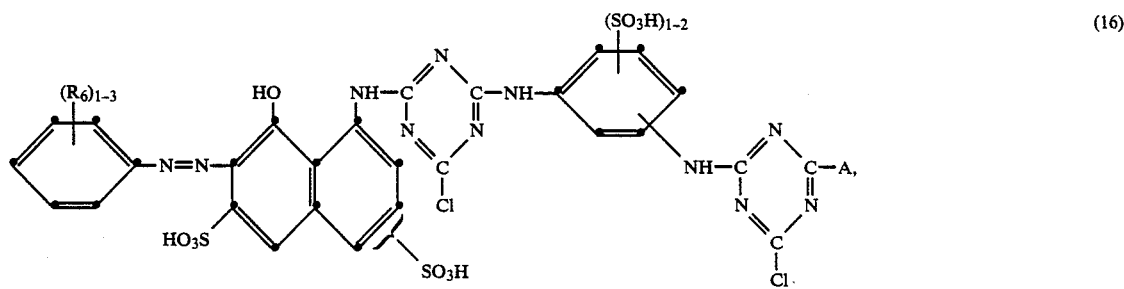

-continued
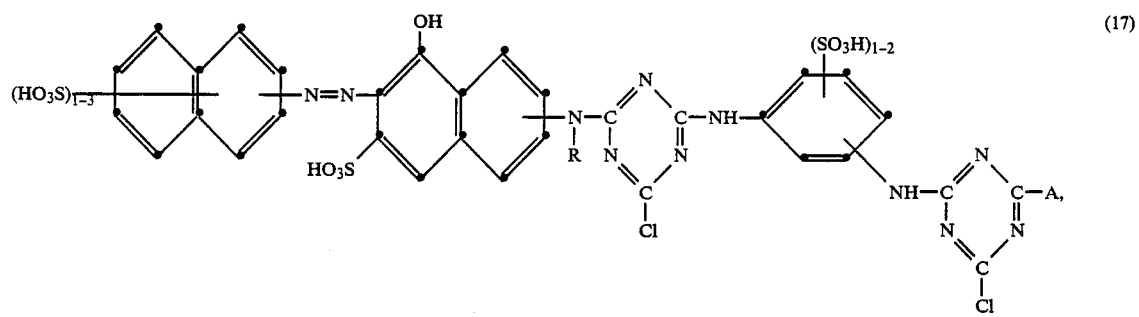
(17)
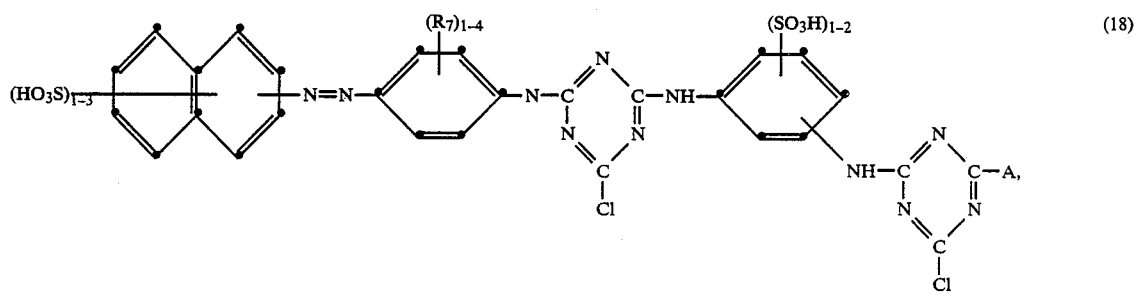
(18)
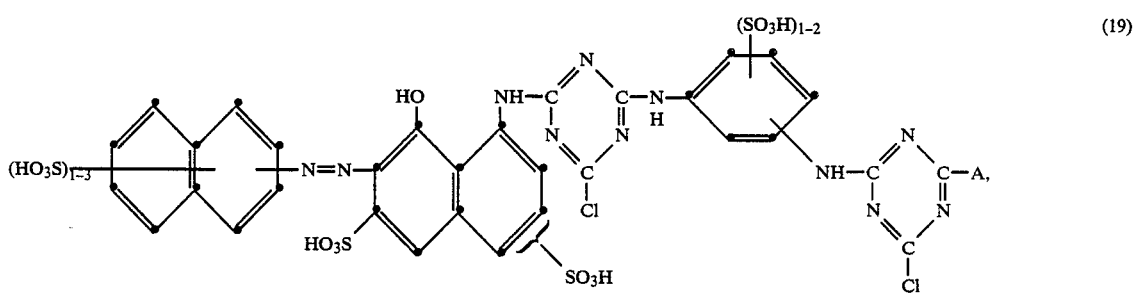
(19)
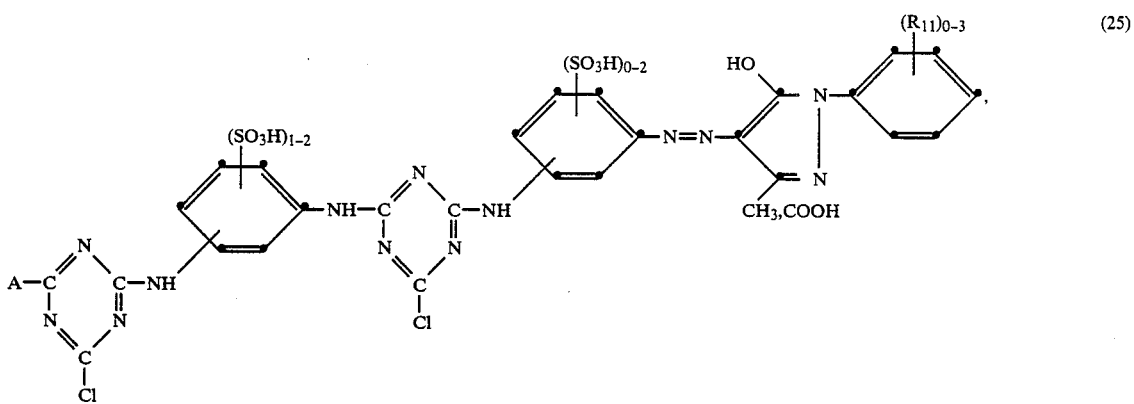
(25)
or
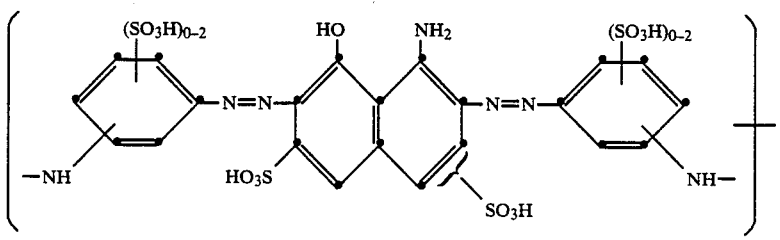

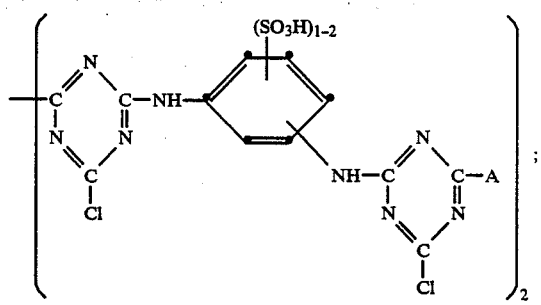

in which A is a radical of the formula

—NHCH₂CH₂SO₂CH₂CH₂Cl (7a)

—NHCH₂CH₂OCH₂CH₂SO₂CH₂CH₂Cl (7c)

—NHCH₂CH₂SO₂CH=CH₂ (7d)

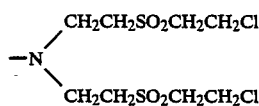

—NHCH₂CH₂OCH₂CH₂SO₂CH=CH₂ (7f)

—NHCH₂CH₂NHCH₂CH₂SO₂CH=CH₂ (7g)

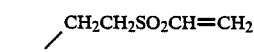

or

$R_6$ is selected from the group consisting of $C_1$–$C_4$-alkyl, $C_1$–$C_4$-alkoxy, halogen, carboxyl and sulfo;
$R_7$ is selected from the group consisting of hydrogen, halogen, nitro, cyano, trifluoromethyl, sulfamoyl, carbamoyl, $C_1$–$C_4$-alkyl, $C_1$–$C_4$-alkoxy, amino, acetylamino, ureido, hydroxy, carboxyl, sulfomethyl and sulfo; and $R_{11}$ is selected from the group consisting of $C_1$–$C_4$-alkyl, $C_1$–$C_4$-alkoxy, halogen, carboxyl and sulfo.

31. A reactive dye according to claim 11 of the formula

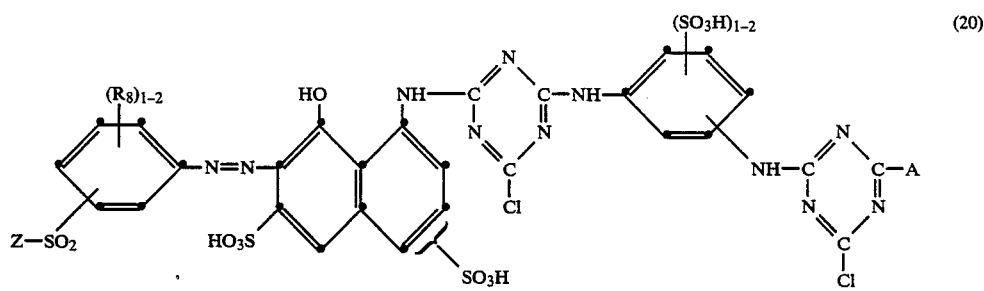

in which $R_8$ is 1 or 2 substituents of the group consisting of hydrogen, $C_1$–$C_4$-alkyl, $C_1$–$C_4$-alkoxy, halogen, carboxyl and sulfo, Z is β-sulfatoethyl, β-thiosulfatoethyl, β-phosphatoethyl, β-acetoxyethyl, β-haloethyl or vinyl, and A is a radical of the formula —NHCH₂CH₂SO₂CH₂CH₂Cl (7a)

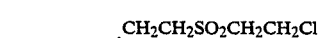

—NHCH₂CH₂OCH₂CH₂SO₂CH₂CH₂Cl (7c)
—NHCH₂CH₂SO₂CH=CH₂ (7d)

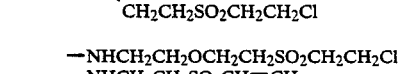

—NHCH₂CH₂OCH₂CH₂SO₂CH=CH₂ (7f)
—NHCH₂CH₂NHCH₂CH₂SO₂CH=CH₂ (7g)

or

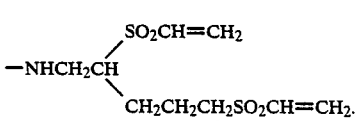

32. A reactive dye according to claim 11 of the formula

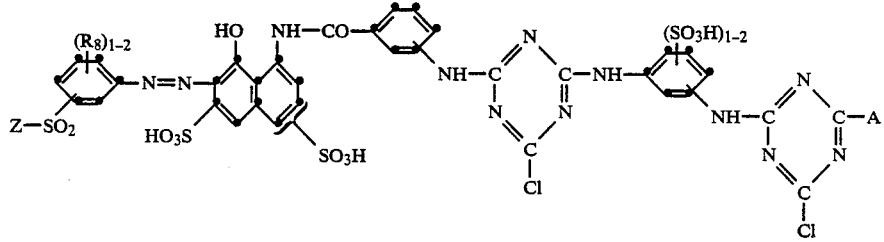

in which $R_8$ is 1 or 2 substituents from the group consisting of hydrogen, $C_1$-$C_4$-alkyl, $C_1$-$C_4$-alkoxy, halogen, carboxyl and sulfo, Z is β-sulfatoethyl, β-thiosulfatoethyl, β-phosphatoethyl, β-acetoxyethyl, β-haloethyl or vinyl, and A is a radical of the formula —NHCH$_2$CH$_2$SO$_2$CH$_2$CH$_2$Cl (7a)

 (7b)

—NHCH$_2$CH$_2$OCH$_2$CH$_2$SO$_2$CH$_2$CH$_2$Cl (7c)
—NHCH$_2$CH$_2$SO$_2$CH=CH$_2$ (7d)

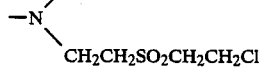 (7e)

—NHCH$_2$CH$_2$OCH$_2$CH$_2$SO$_2$CH=CH$_2$ (7f)
—NHCH$_2$CH$_2$NHCH$_2$CH$_2$SO$_2$CH=CH$_2$ (7g)

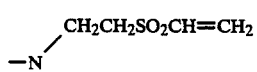 (7h)

or

 (7i)

33. A reactive dye according to claim 11 of the formula

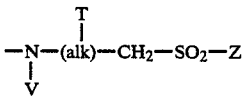 (3a)

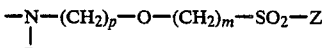 (3b)

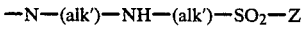 (3c)

or

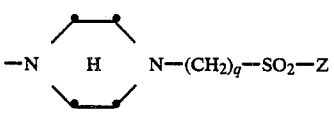 (3d)

alk is alkylene having 1 to 6 carbon atoms or branched iosomers thereof, T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl or —SO$_2$—Z, V is hydrogen or alkyl having 1 to 4 carbon atoms which is unsubstituted or substituted by carboxyl, sulfo, carbamoyl, N-methylcarbamoyl, N-ethylcarbamoyl, N,N-dimethylcarbamoyl, N,N-diethylcarbamoyl, cyano, acetyl, propionyl, butyryl, methoxycarbonyl, ethoxycarbonyl, propyloxycarbonyl, sulfamoyl, N-methylsulfamoyl, N-ethylsulfamoyl, N,N-dimethylsulfamoyl, N,N-diethylsulfamoyl, methylsulfonyl, ethylsulfonyl, propylsulfonyl, alkoxy groups having 1 or 2 carbon atoms, halogen or hydroxyl, or a radical

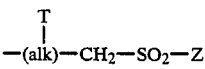 (3e)

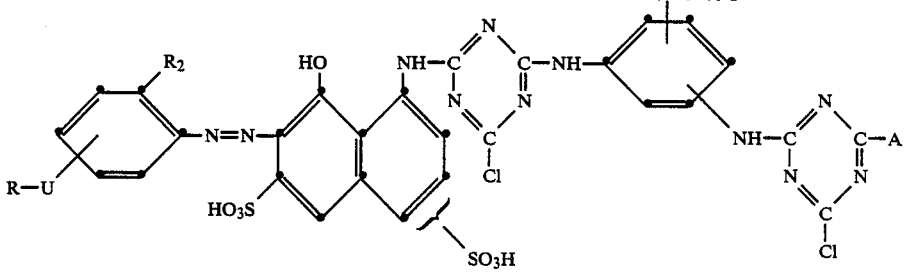

in which $R_2$ is hydrogen, $C_1$-$C_4$-alkyl, $C_1$-$C_4$-alkoxy, halogen, hydroxyl, carboxyl or sulfo, U is —CO— or —SO$_2$—, R is a radical of the formula in which alk and T are as defined above, $R_1$ is hydrogen or $C_1$-$C_6$-alkyl, each alk' is independently either polymethylene having 2 to 6 carbon atoms or a branched isomer thereof, and m is from 1 to 6, p is from 1 to 6 and q is from 1 to 6, and if U is —SO$_2$—, V must not be hydrogen, and the benzene or naphthalene radical A' is unsubstituted or substituted by alkyl having 1 to 4 carbon atoms, alkoxy having 1 to 4 carbon atoms, acetylamino, propionylamino, benzoylamino, amino, alkylamino having 1 to 4 carbon atoms, phenylamino, N,N-di-β-dihydroxyethylamino, N,N-di-β-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-(β-hydroxyethyl)-sulfamoyl, N,N-di-(β-hydroxyethyl)sulfamoyl, N-phenylsulfamoyl, ureido, hydroxyl, carboxyl, sulfomethyl or sulfo, Z is β-sulfatoethyl, β-thiosulfatoethyl, β-phosphatoethyl, β-acetoxyethyl, β-haloethyl or vinyl, and A is a radical of the formula —NHCH$_2$CH$_2$SO$_2$CH$_2$CH$_2$Cl (7a)

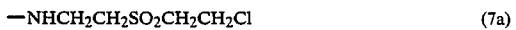 (7b)

—NHCH$_2$CH$_2$OCH$_2$CH$_2$SO$_2$CH$_2$CH$_2$Cl (7c)
—NHCH$_2$CH$_2$SO$_2$CH=CH$_2$ (7d)

 (7e)

—NHCH$_2$CH$_2$OCH$_2$CH$_2$SO$_2$CH=CH$_2$ (7f)
—NHCH$_2$CH$_2$NHCH$_2$CH$_2$SO$_2$CH=CH$_2$ (7g)

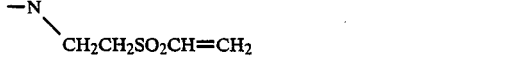 (7h)

or

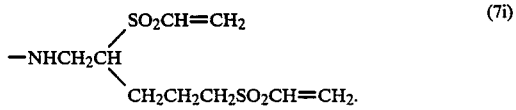 (7i)

34. A reactive dye according to claim 11 of the formula

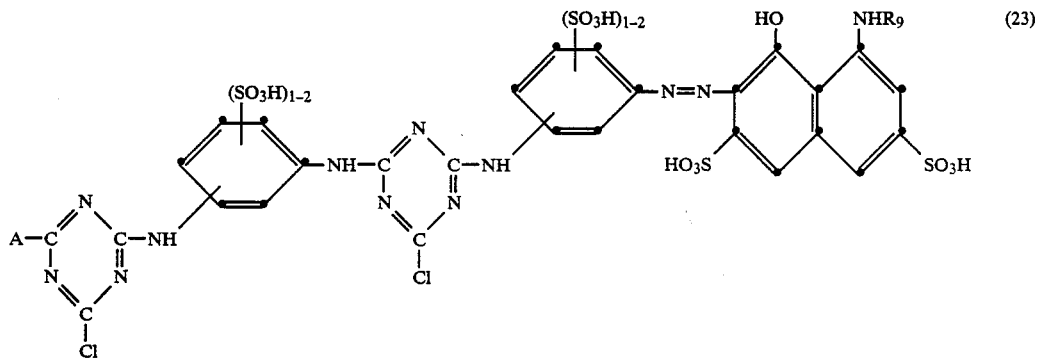 (23)

in which R$_9$ is C$_1$–C$_4$-alkanoyl or benzoyl, and A is a radical of the formula —NHCH$_2$CH$_2$SO$_2$CH$_2$CH$_2$Cl (7a)

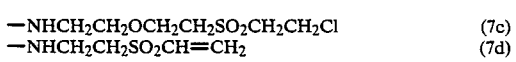 (7b)

—NHCH$_2$CH$_2$OCH$_2$CH$_2$SO$_2$CH$_2$CH$_2$Cl (7c)
—NHCH$_2$CH$_2$SO$_2$CH=CH$_2$ (7d)

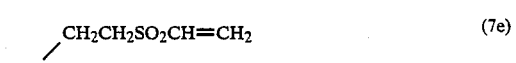 (7e)

—NHCH$_2$CH$_2$OCH$_2$CH$_2$SO$_2$CH=CH$_2$ (7f)
—NHCH$_2$CH$_2$NHCH$_2$CH$_2$SO$_2$CH=CH$_2$ (7g)

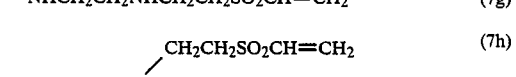 (7h)

or

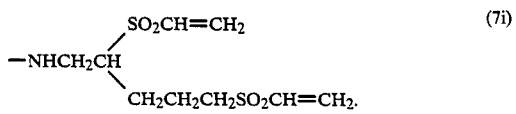 (7i)

35. A reactive dye according to claim 11 of the formula

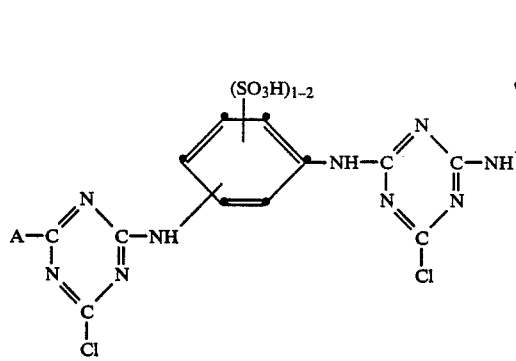

in which $R_{10}$ is $C_1$-$C_4$-alkanoyl or benzoyl, and A is a radical of the formula $-NHCH_2CH_2SO_2CH_2CH_2Cl$ (7a)

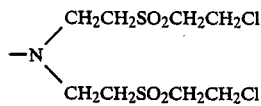 (7b)

$-NHCH_2CH_2OCH_2CH_2SO_2CH_2CH_2Cl$ (7c)
$-NHCH_2CH_2SO_2CH=CH_2$ (7d)

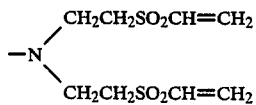 (7e)

$-NHCH_2CH_2OCH_2CH_2SO_2CH=CH_2$ (7f)
$-NHCH_2CH_2NHCH_2CH_2SO_2CH=CH_2$ (7g)

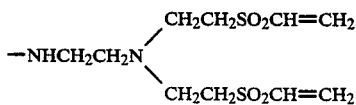 (7h)

or

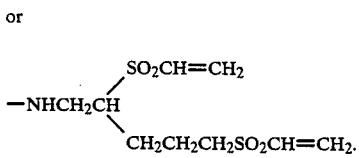 (7i)

36. A reactive dye according to claim 11 of the formula in which $R_{12}$ and $R_{13}$ are independently of each other hydrogen, $C_1$-$C_4$-alkyl or phenyl, $R_{14}$ is hydrogen, cyano, carbamoyl or sulfomethyl, and A is a radical of the formula $-NHCH_2CH_2SO_2CH_2CH_2Cl$ (7a)

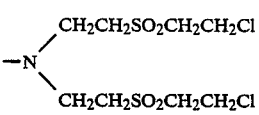 (7b)

$-NHCH_2CH_2OCH_2CH_2SO_2CH_2CH_2Cl$ (7c)
$-NHCH_2CH_2SO_2CH=CH_2$ (7d)

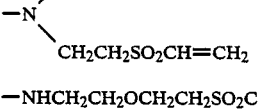 (7e)

$-NHCH_2CH_2OCH_2CH_2SO_2CH=CH_2$ (7f)
$-NHCH_2CH_2NHCH_2CH_2SO_2CH=CH_2$ (7g)

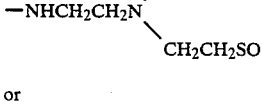 (7h)

or

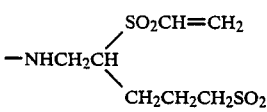 (7i)

37. A reactive dye according to claim 11 of the formula

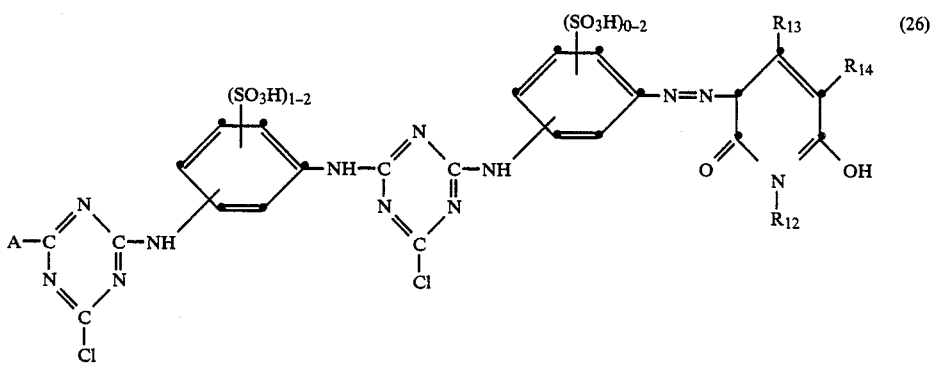

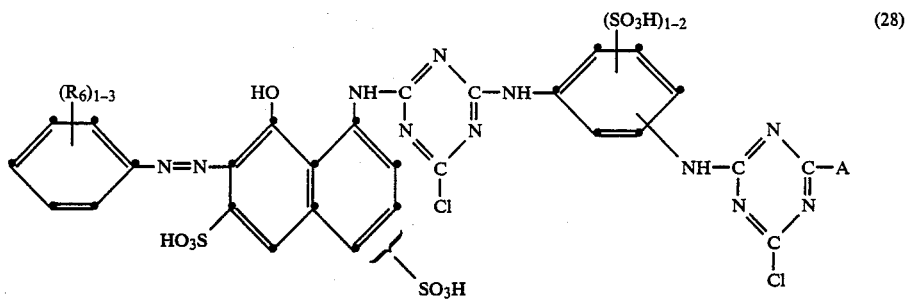

(28)

in which $R_6$ is 1 to 3 substituents from the group consisting of $C_1$-$C_4$-alkyl, $C_1$-$C_4$-alkoxy, halogen, carboxyl or sulfo,

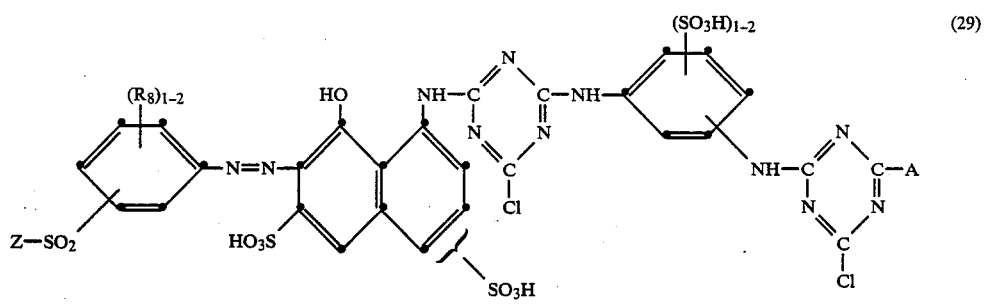

(29)

in which $R_8$ is 1 or 2 substituents from the group consisting of hydrogen, $C_1$-$C_4$-alkyl, $C_1$-$C_4$-alkoxy, halogen, carboxyl and sulfo, Z is $\beta$-sulfatoethyl, $\beta$-thiosulfatoethyl, $\beta$-phosphatoethyl, $\beta$-acetoxyethyl, $\beta$-haloethyl or vinyl,

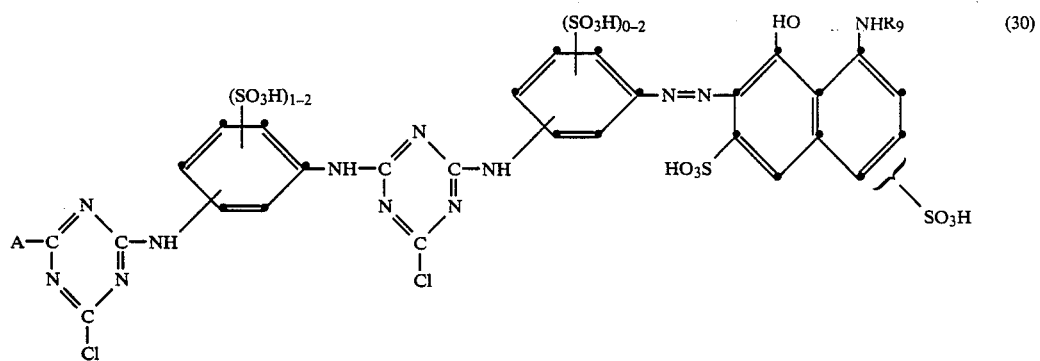

(30)

in which $R_9$ is $C_1$-$C_4$-alkanoyl or benzoyl, and A in formulae (28), (29) and (30) is a radical of the formula

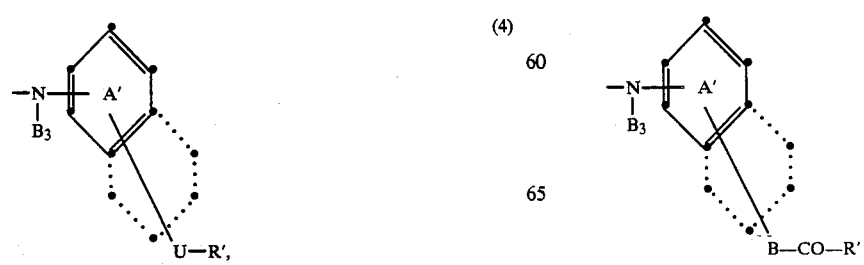

(4)

(5)

-continued

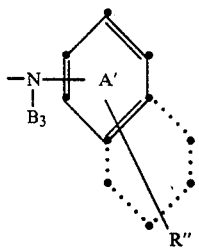
(6)

or

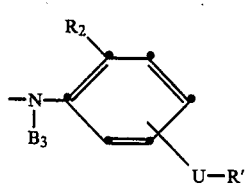
(8)

in which $R_2$ is hydrogen, $C_1$-$C_4$-alkyl, $C_1$-$C_4$-alkoxy, halogen, hydroxyl, carboxyl or sulfo, U is —CO— or —SO$_2$—, $B_3$ is hydrogen or alkyl having 1 to 4 carbon atoms which is unsubstituted or substituted by halogen, hydroxyl, cyano, $C_1$-$C_4$-alkoxy, $C_1$-$C_4$-alkoxycarbonyl, carboxyl, sulfamoyl, sulfo or sulfato, B is —(CH$_2$)$_n$, —O—(CH$_2$)$_n$ or —NH—(CH$_2$)$_n$, n is 1 to 6, R' is a radical of the formula

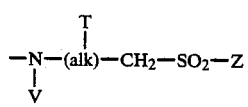
(3a)

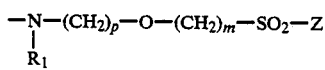
(3b)

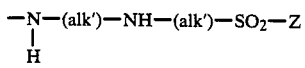
(3c)

or

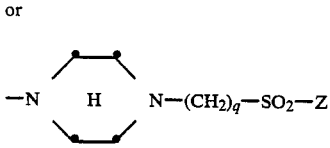
(3d)

alk is alkylene having 1 to 6 carbon atoms or branched isomers thereof, T is hydrogen, chlorine, bromine, fluorine, hydroxyl, sulfato, alkanoyloxy having 2 to 4 carbon atoms, cyano, carboxyl, alkoxycarbonyl having 1 to 5 carbon atoms, carbamoyl or —SO$_2$—Z in which Z is as defined above, V is hydrogen or alkyl having 1 to 4 carbon atoms which is unsubstituted or substituted by carboxyl, sulfo, carbamoyl, N-methylcarbamoyl, N-ethylcarbamoyl, N,N-dimethylcarbamoyl, N,N-diethylin which alk and T are as defined above, $R_1$ is hydrogen or $C_1$-$C_6$-alkyl, each alk' is independently either polymethylene having 2 to 6 carbon atoms or a branched isomer thereof, and m is from 1 to 6, p is from 1 to 6 and q is from 1 to 6, and, if U is —SO$_2$—, V must not be hydrogen, and the benzene or naphthalene radical A' is unsubstituted or substituted by alkyl having 1 to 4 carbon atoms, alkoxy having 1 to 4 carbon atoms, acetylamino, propionylamino, benzoylamino, amino, alkylamino having 1 to 4 carbon atoms, phenylamino, N,N-di-$\beta$-hydroxyethylamino, N,N-di-$\beta$-sulfatoethylamino, sulfobenzylamino, N,N-disulfobenzylamino, alkoxycarbonyl having 1 to 4 carbon atoms in the alkoxy radical, alkylsulfonyl having 1 to 4 carbon atoms, trifluoromethyl, nitro, cyano, halogen, carbamoyl, N-alkylcarbamoyl having 1 to 4 carbon atoms in the alkyl radical, sulfamoyl, N-alkylsulfamoyl having 1 to 4 carbon atoms, N-($\beta$-hydroxyethyl)-sulfamoyl, N,N-di-($\beta$-hydroxyethyl)-sulfamoyl, N-Phenylsulfamoyl, ureido, hydroxyl, carboxyl, sulfomethyl or sulfo, and Z is $\beta$-sulfatoethyl, $\beta$-thiosulfatoethyl, $\beta$-phosphatorethyl, $\beta$-acetoxyethyl, $\beta$-haloethyl or vinyl.

38. A reactive dye according to claim 2 in which Z is a $\beta$-sulfatoethyl, $\beta$-chloroethyl or vinyl group.

39. A reactive dye according to claim 16 wherein $D_1$, M and K are unsubstituted or substituted by hydroxyl, amino, methyl, ethyl, methoxy, ethoxy, alkanoylamino having 2 to 4 carbon atoms, benzoylamino, or halogen.

40. A reactive dye according to claim 18 wherein $D_1$, $D_2$ and K are unsubstituted or substituted by hydroxyl, amino, methyl, ethyl, methoxy, ethoxy, alkanoylamino having 2 to 4 carbon atoms, benzoylamino or halogen.

* * * * *